(12) United States Patent
Hall

(10) Patent No.: US 9,675,508 B2
(45) Date of Patent: Jun. 13, 2017

(54) APPARATUS FOR LIFTING A CHAIR

(71) Applicant: Shawn Anthony Hall, Pleasantville, NY (US)

(72) Inventor: Shawn Anthony Hall, Pleasantville, NY (US)

(*) Notice: Subject to any disclaimer, the term of this patent is extended or adjusted under 35 U.S.C. 154(b) by 56 days.

(21) Appl. No.: 14/467,371

(22) Filed: Aug. 25, 2014

(65) Prior Publication Data

US 2016/0051426 A1 Feb. 25, 2016

(51) Int. Cl.
| | |
|---|---|
| *A61G 5/14* | (2006.01) |
| *A47C 7/00* | (2006.01) |
| *F16M 11/24* | (2006.01) |
| *B66F 3/24* | (2006.01) |
| *B66F 3/35* | (2006.01) |

(52) U.S. Cl.
CPC .............. *A61G 5/14* (2013.01); *A47C 7/002* (2013.01); *B66F 3/247* (2013.01); *B66F 3/35* (2013.01); *F16M 11/24* (2013.01)

(58) Field of Classification Search
CPC .... B66F 3/00; B66F 3/24; B66F 3/247; B66F 3/30; B66F 3/32; B66F 3/35
USPC .................. 254/10 C, 2 C, 3 C, 93 HP, 93 R
See application file for complete search history.

(56) References Cited

U.S. PATENT DOCUMENTS

| | | | | |
|---|---|---|---|---|
| 880,317 | A | * | 2/1908 | Von De Marwitz .. E05D 7/0423 16/246 |
| 1,893,252 | A | * | 1/1933 | Stabler ...................... E05D 3/02 16/245 |
| 2,610,824 | A | * | 9/1952 | Grier ......................... B66F 3/35 187/250 |
| 3,015,470 | A | * | 1/1962 | Patchen .................... B66F 3/35 108/57.12 |

(Continued)

FOREIGN PATENT DOCUMENTS

| | | |
|---|---|---|
| EP | 0 261 344 B1 | 10/1991 |
| EP | 0 512 775 B1 | 12/1995 |

OTHER PUBLICATIONS

"Determinants of the Sit-to-Stand Movement: A Review", by Wim GM Janssen, Hans BJ Bussmann, and Henk J. Stam, Journal of the American Physical Therapy Association and the Dutch Royal Society for Physical Therapy, Sep. 2002; 82:866-879.

(Continued)

*Primary Examiner* — Joseph J Hail
*Assistant Examiner* — Tyrone V Hall, Jr.
(74) *Attorney, Agent, or Firm* — Leason Ellis LLP

(57) ABSTRACT

An apparatus for raising and lowering a payload, particularly a chair and its user to provide assistance with the sit-to-stand task. The apparatus comprises a base, a platform, linkages attached between base and platform to allow only vertical motion therebetween, an inflatable bag also situated between base and platform, and a source of pressurized fluid such as compressed air, whereby the bag is inflated and deflated to (Continued)

raise and lower the platform. The user may use an existing, favorite chair, including a reclining chair, which is placed upon the platform without modification. In a low position, the platform is quite close to the floor, providing comfort during sitting. In a high position, the platform is greatly elevated, to provide a full measure of sit-to-stand assistance. The apparatus is compact, doesn't interfere with reclining or rocking while sitting, and is easily deployable, movable, and storable.

24 Claims, 55 Drawing Sheets

(56) References Cited

U.S. PATENT DOCUMENTS

| | | | | |
|---|---|---|---|---|
| 3,785,669 | A | * | 1/1974 | Doheny .................. B62B 1/002 280/47.18 |
| 3,843,092 | A | * | 10/1974 | Oehler ..................... B60P 1/02 254/2 R |
| 4,083,599 | A | | 4/1978 | Gaffney |
| 4,483,224 | A | * | 11/1984 | Lee, Jr. .................... B23Q 1/76 254/93 HP |
| 4,538,854 | A | | 9/1985 | Wilson |
| 4,688,760 | A | * | 8/1987 | Garman ................... A47C 3/30 254/122 |
| 4,786,107 | A | | 11/1988 | Crockett |
| 4,946,222 | A | | 8/1990 | Matson |
| 4,993,777 | A | | 2/1991 | LaPointe |
| 5,061,010 | A | | 10/1991 | LaPointe |
| 5,165,753 | A | | 11/1992 | Henderson |
| 5,294,179 | A | | 3/1994 | Rudes et al. |
| 5,375,910 | A | | 12/1994 | Murphy |
| 5,466,046 | A | | 11/1995 | Komorowski et al. |
| 5,492,300 | A | * | 2/1996 | Riihiluoma ............... B66F 3/35 248/354.1 |
| D372,415 | S | * | 8/1996 | Guidotti ........................ D8/327 |
| 5,799,370 | A | * | 9/1998 | Davidian .............. E05D 7/0415 16/236 |
| 5,984,411 | A | | 11/1999 | Galumbeck |
| 6,431,088 | B2 | * | 8/2002 | Mahnken ................... 108/57.12 |
| 6,929,249 | B1 | * | 8/2005 | Kim .......................... B66F 3/35 254/2 B |
| D510,254 | S | * | 10/2005 | Cassidy ......................... D8/328 |
| 7,070,167 | B1 | | 7/2006 | Bacon |
| 7,926,787 | B2 | * | 4/2011 | Wieland .................. A63G 31/12 254/93 HP |
| 8,186,658 | B2 | * | 5/2012 | Lewis, II ....................... 248/562 |
| 8,267,474 | B2 | | 9/2012 | Fetisoff |
| 8,398,171 | B2 | | 3/2013 | Lin |
| 8,403,409 | B2 | | 3/2013 | Pollard |
| 9,078,796 | B1 | * | 7/2015 | Hall .......................... A61G 5/14 |
| D739,111 | S | * | 9/2015 | Arrindell ....................... D34/31 |
| 2013/0320733 | A1 | * | 12/2013 | Haller .................. B60N 2/1665 297/344.12 |

OTHER PUBLICATIONS

"Flexion reminder device to discourage recurrent posterior dislocation of a total hip replacement: a case report", by King Wong et al., Journal of Medical Case Reports, Jul. 25, 2008, 2:250.

"Revolutionary advances in adaptive seating systems for the elderly and persons with disabilities that assist sit-to-stand transfers", by Richard Edlich, Cynthia L. Heather, and Michael H. Galumbeck, appearing in the Journal of Long-Term Effects of Medical Implants, 2003, 13(1): 31:39.

"Posture for a Health Back." Cleveland Clinic. The Cleveland Clinic Foundation, n.d. Web. May 7, 2013. <http://my.clevelandclinic.org/healthy_living/back_health/hic_posture_for_a_healthy_back.aspx>.

"Sitting and Chair Design." Ergonomics of Sitting. Cornell University Ergonomics Web, n. d. Web. <http://ergo.human.cornell.edu/DEA3250Flipbook/DEA3250notes/sitting.html>. At least as of Aug. 24, 2014.

\* cited by examiner

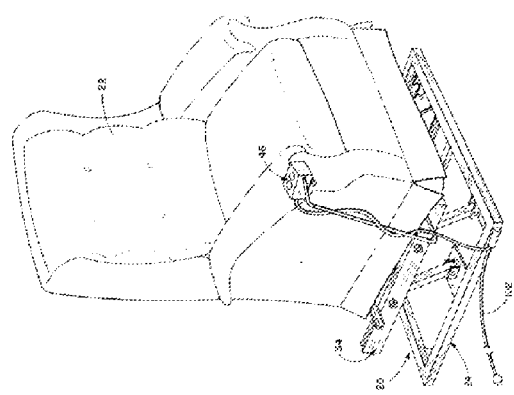
Fig. 1
(Prior Art, Crockett)
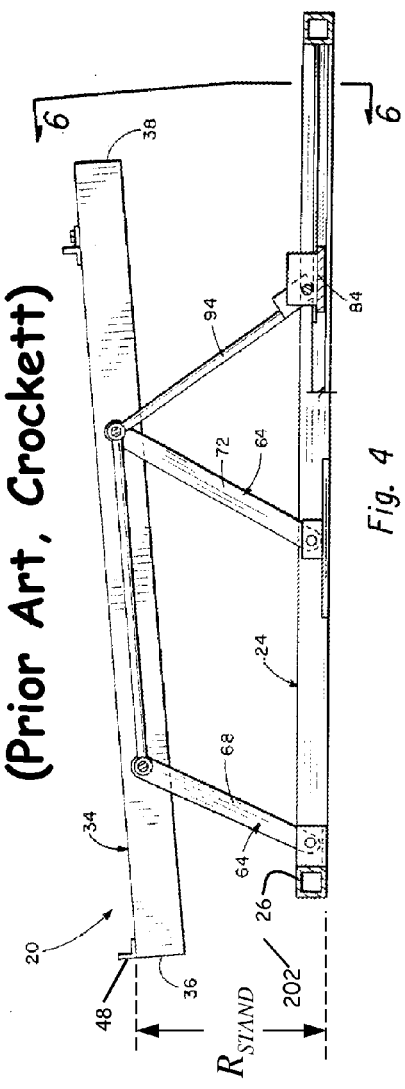
Fig. 2
(Prior Art, Crockett)
Fig. 4
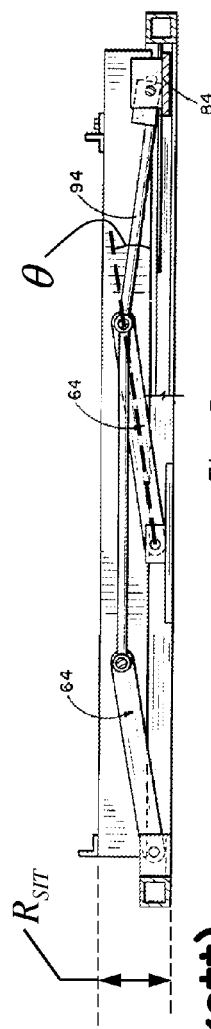
Fig. 3
(Prior Art, Crockett)
Fig. 5

(Prior Art, LaPointe)

(Prior Art, LaPointe)

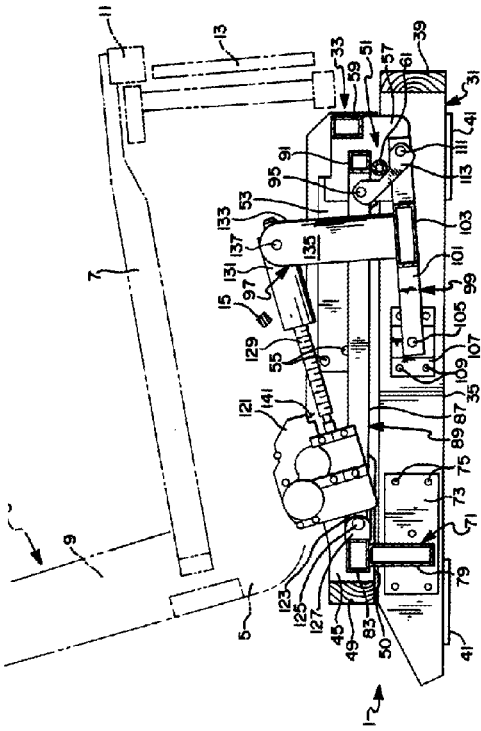
Fig. 7
(Prior Art, LaPointe)
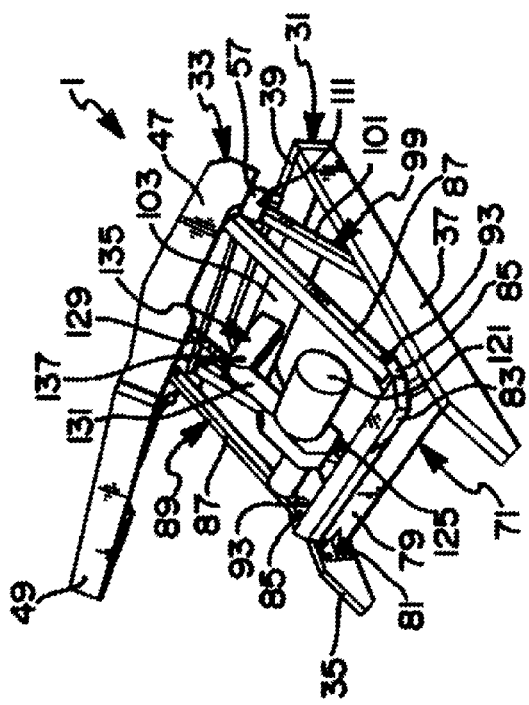
Fig 6. Prior Art (La Pointe)

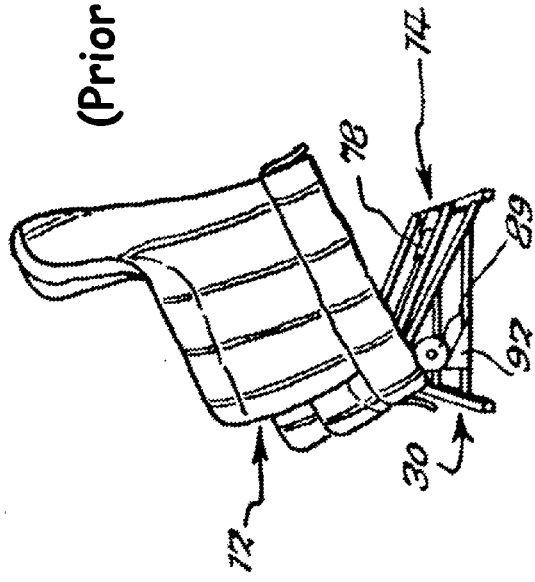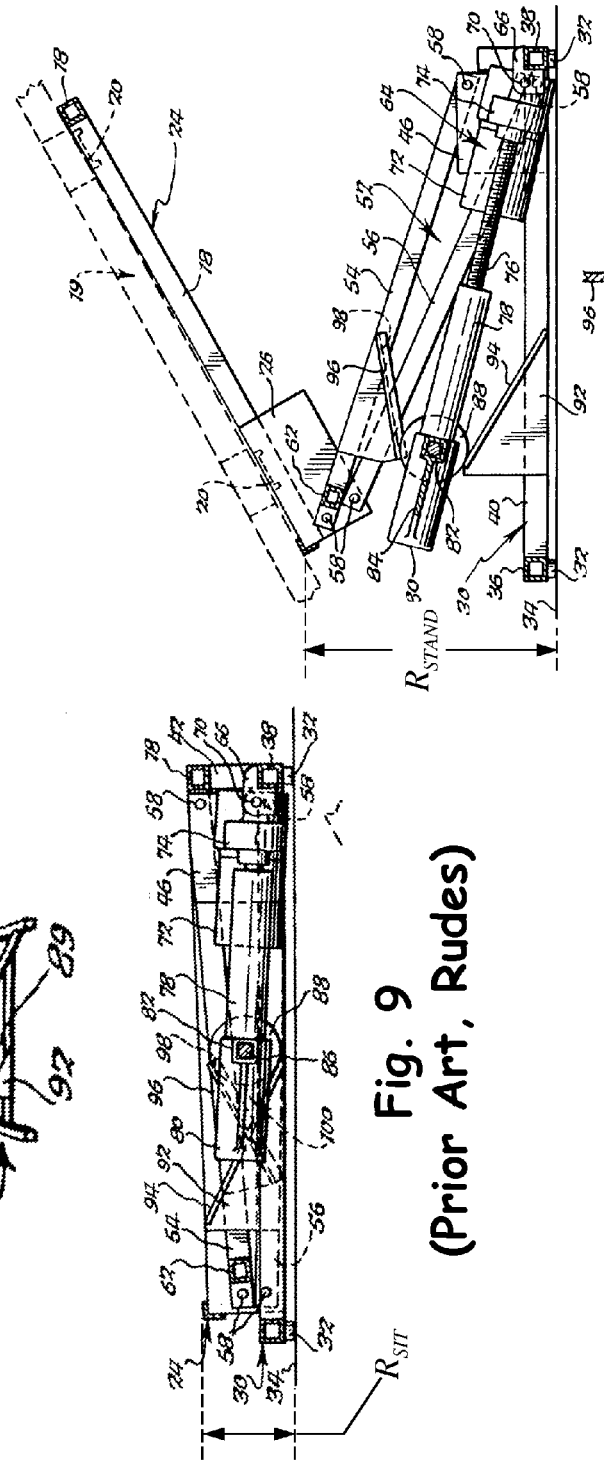

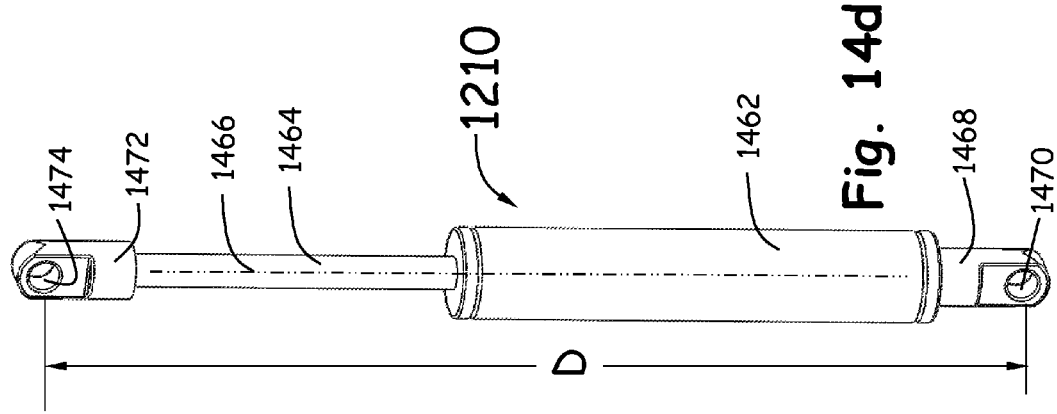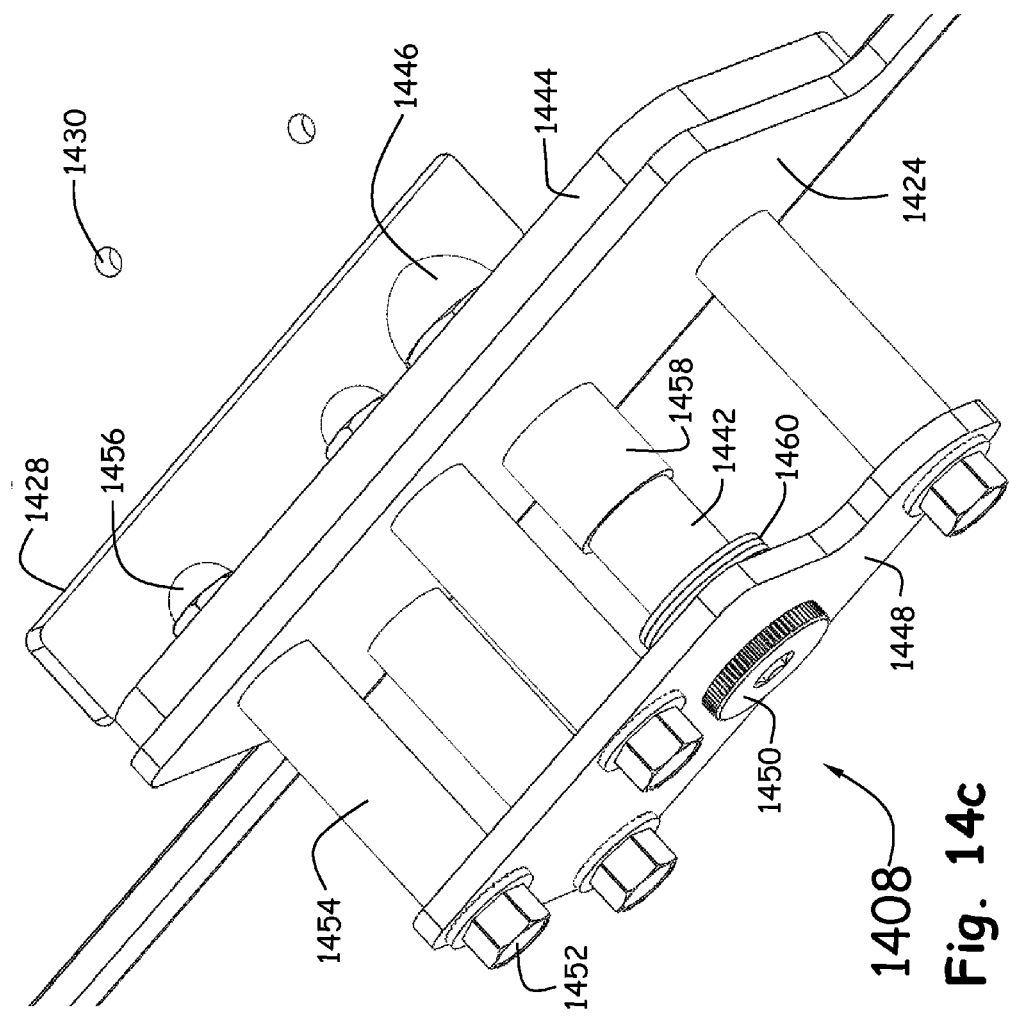

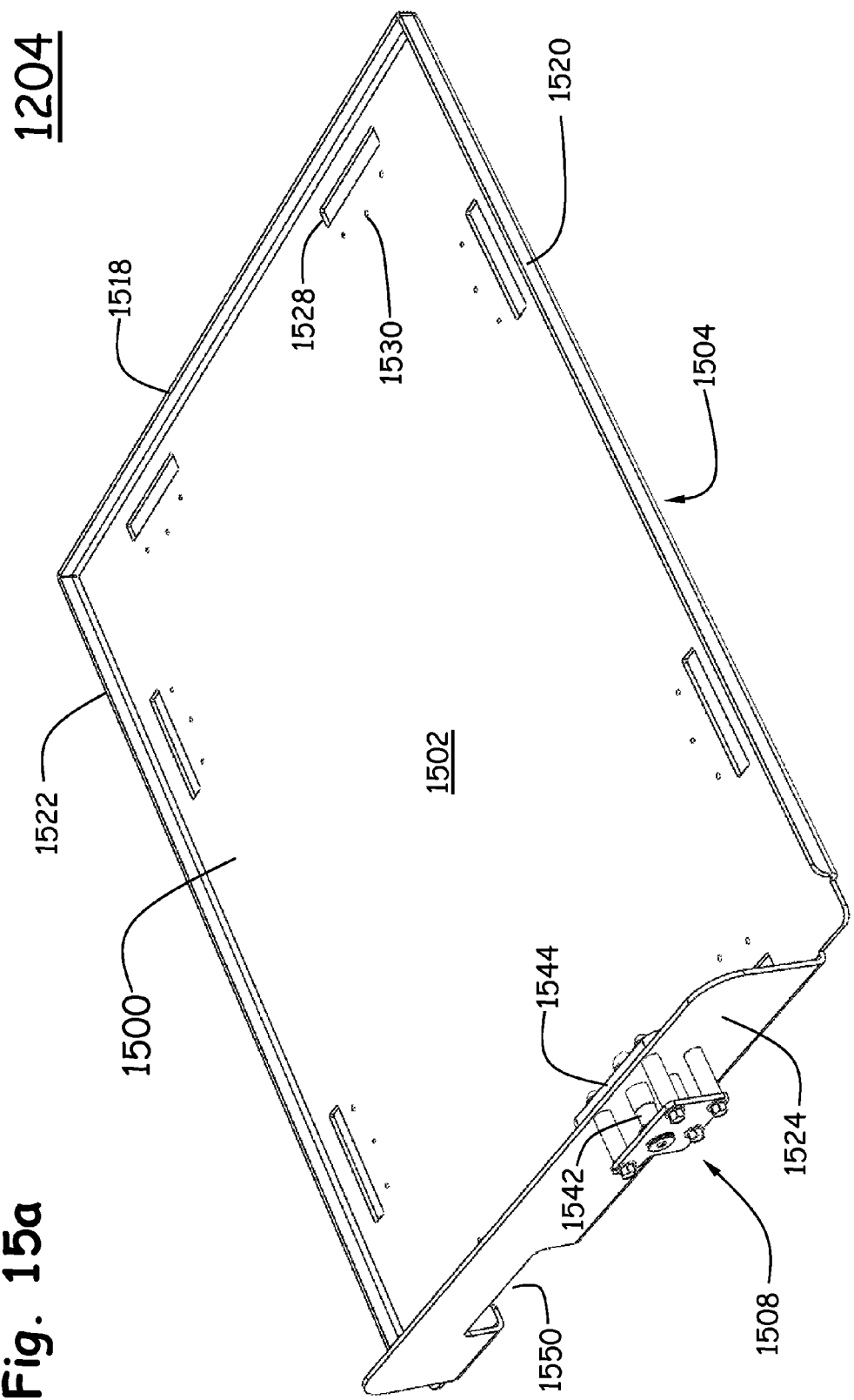

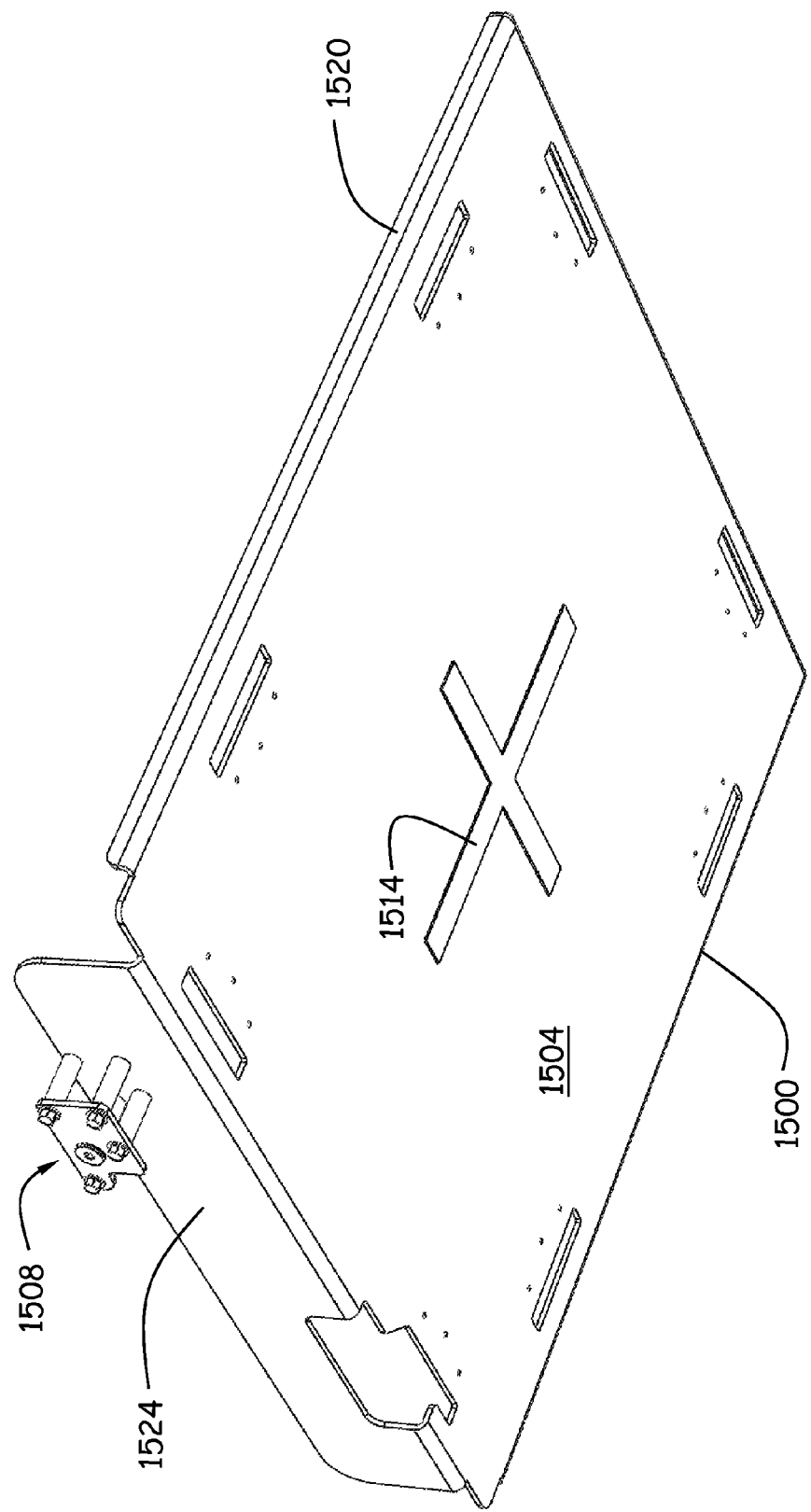

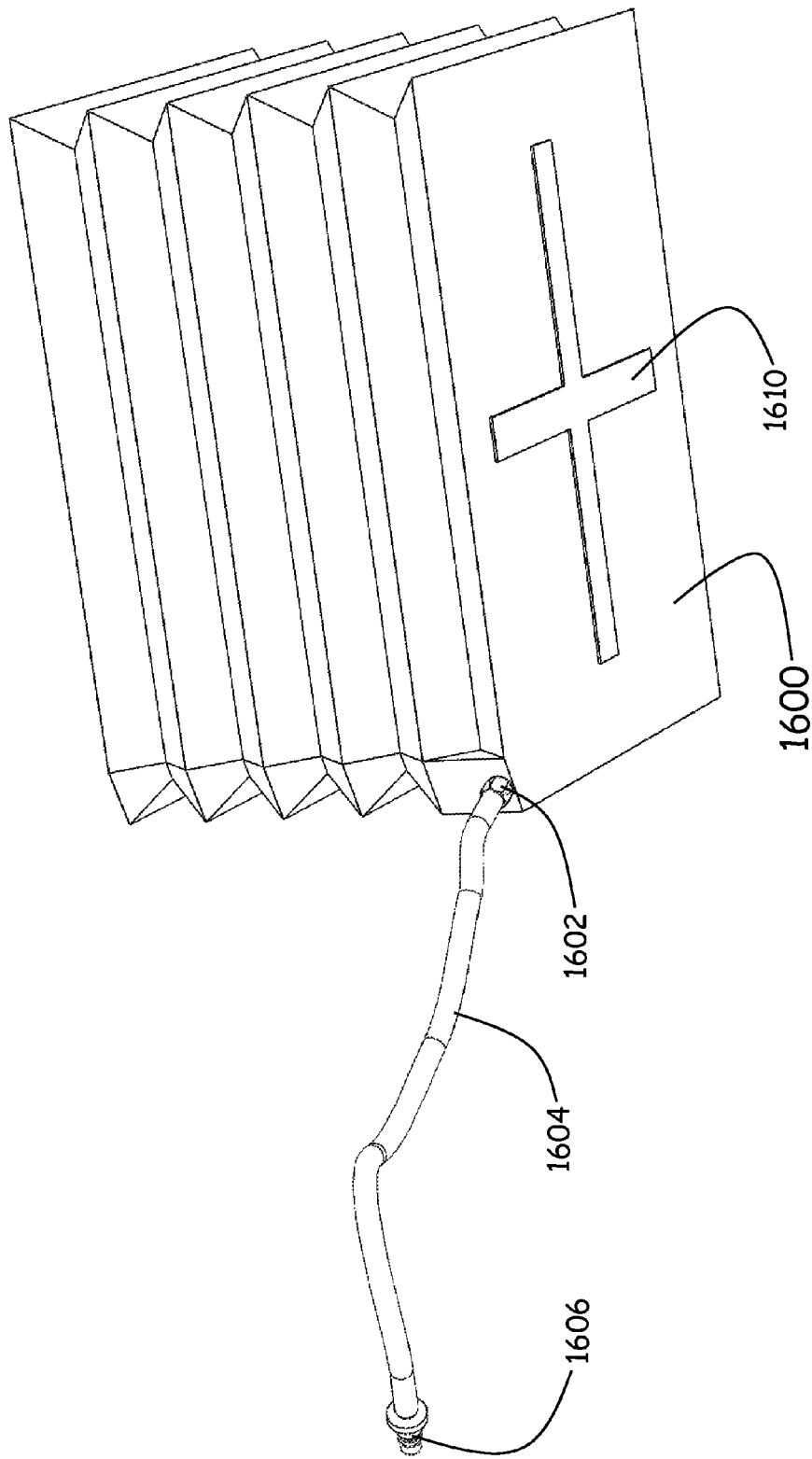

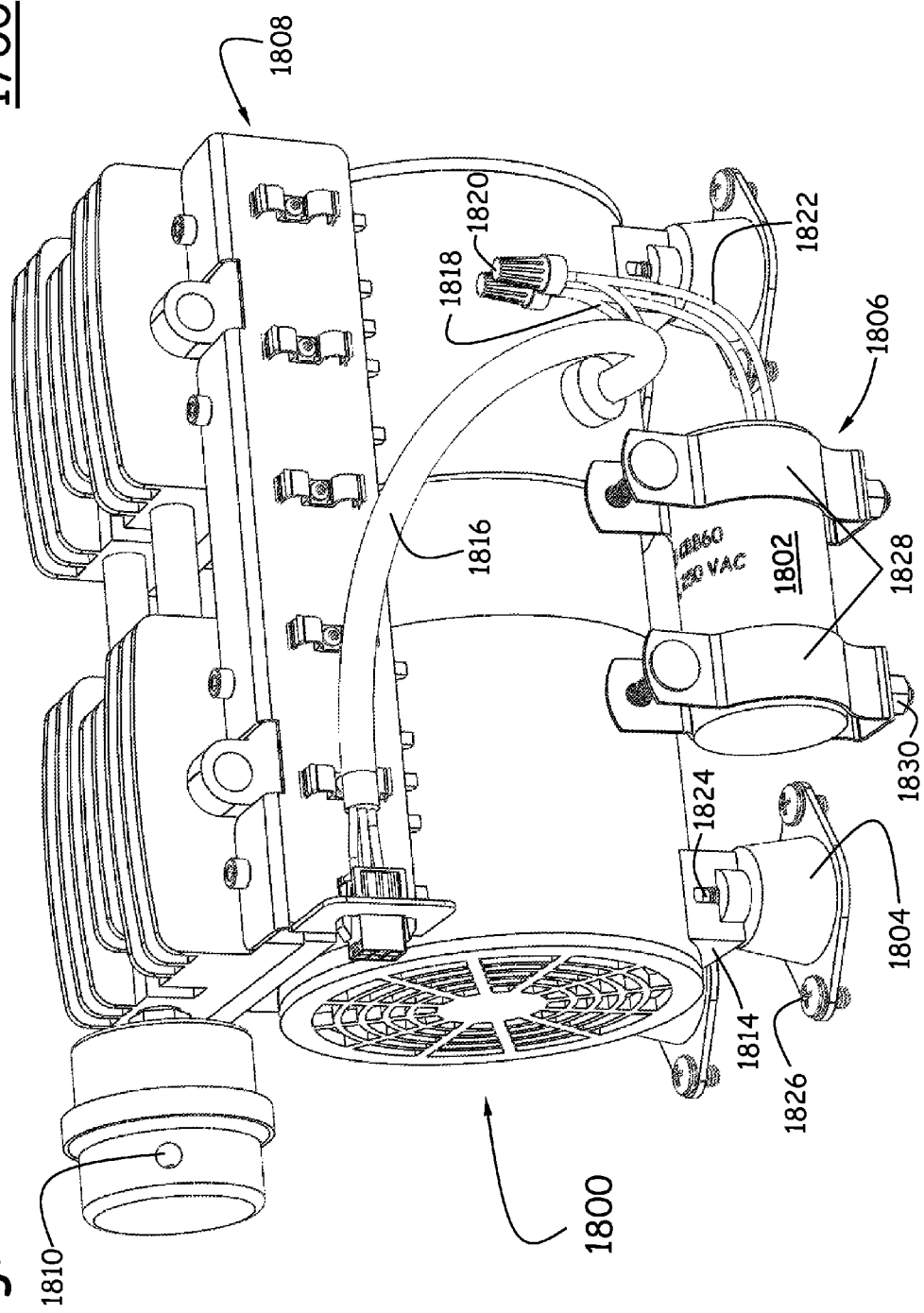

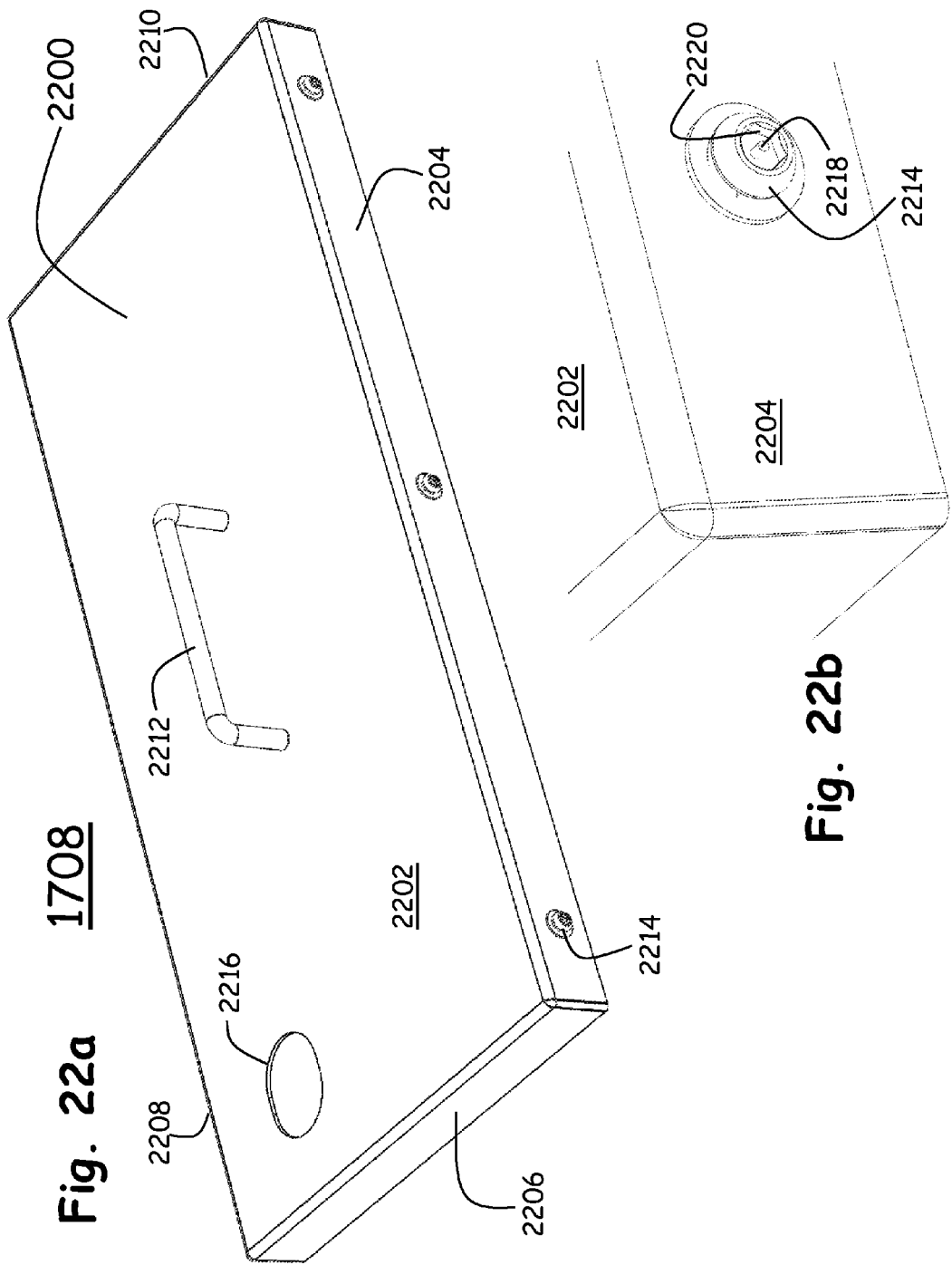

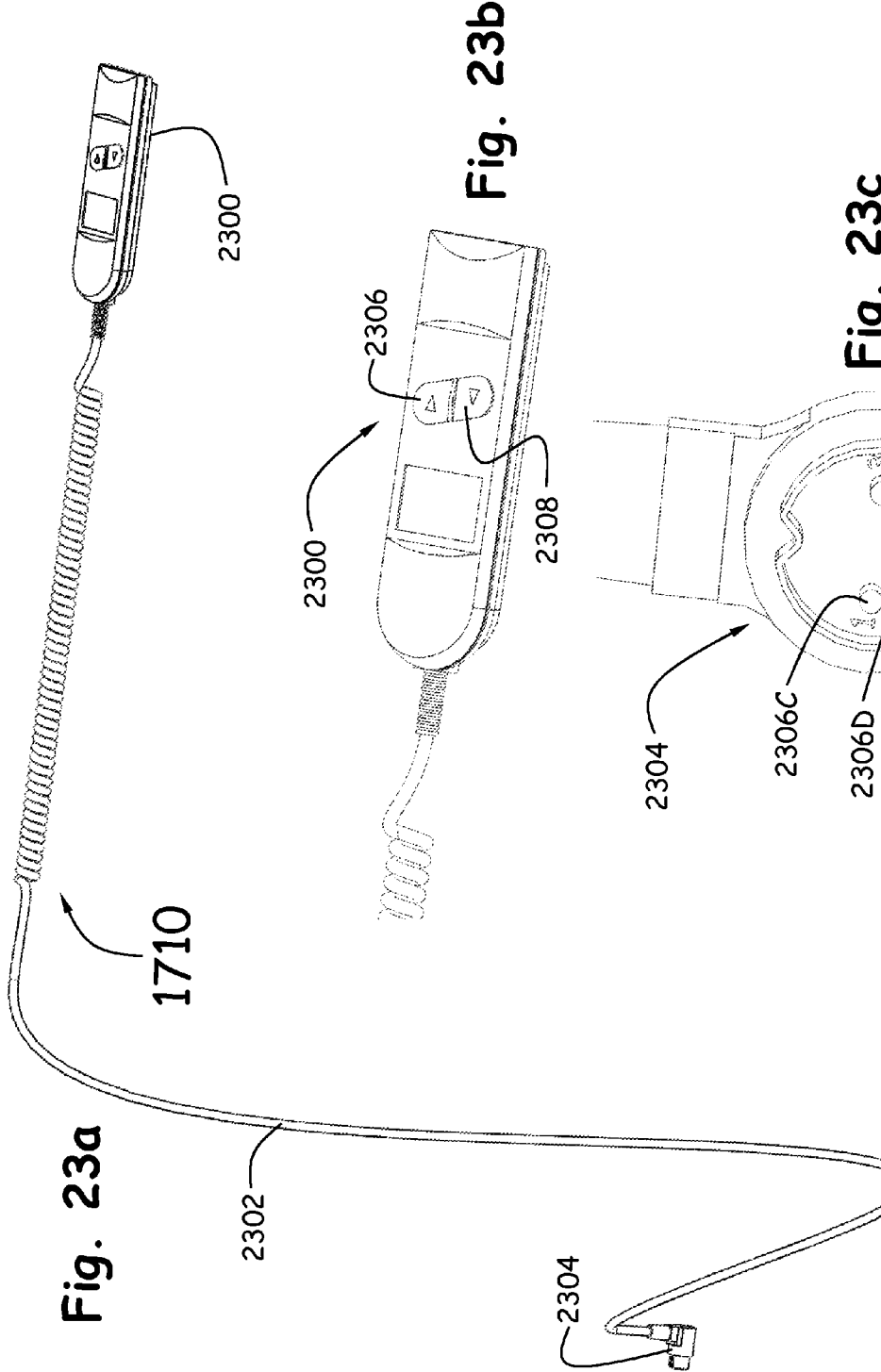

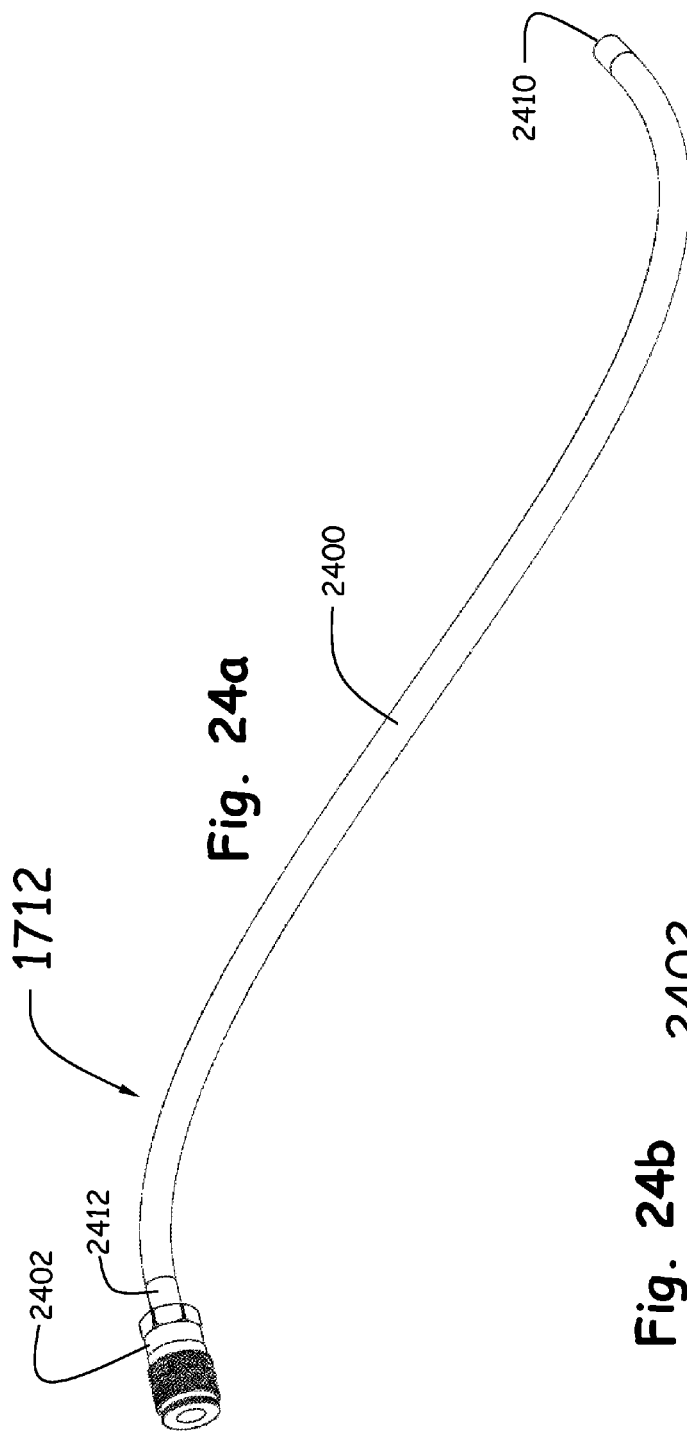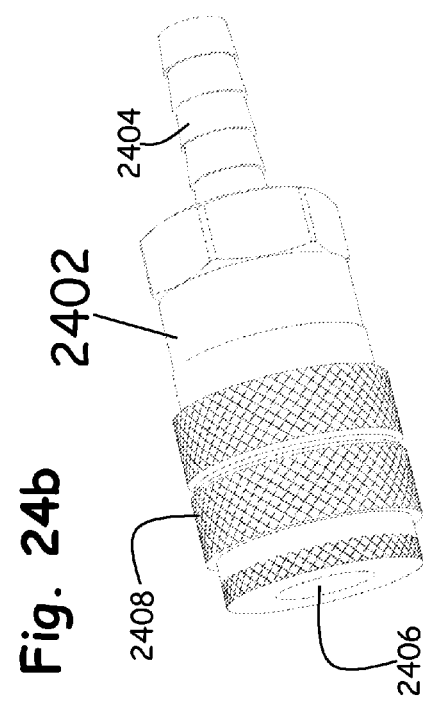

1108
θ = 20°

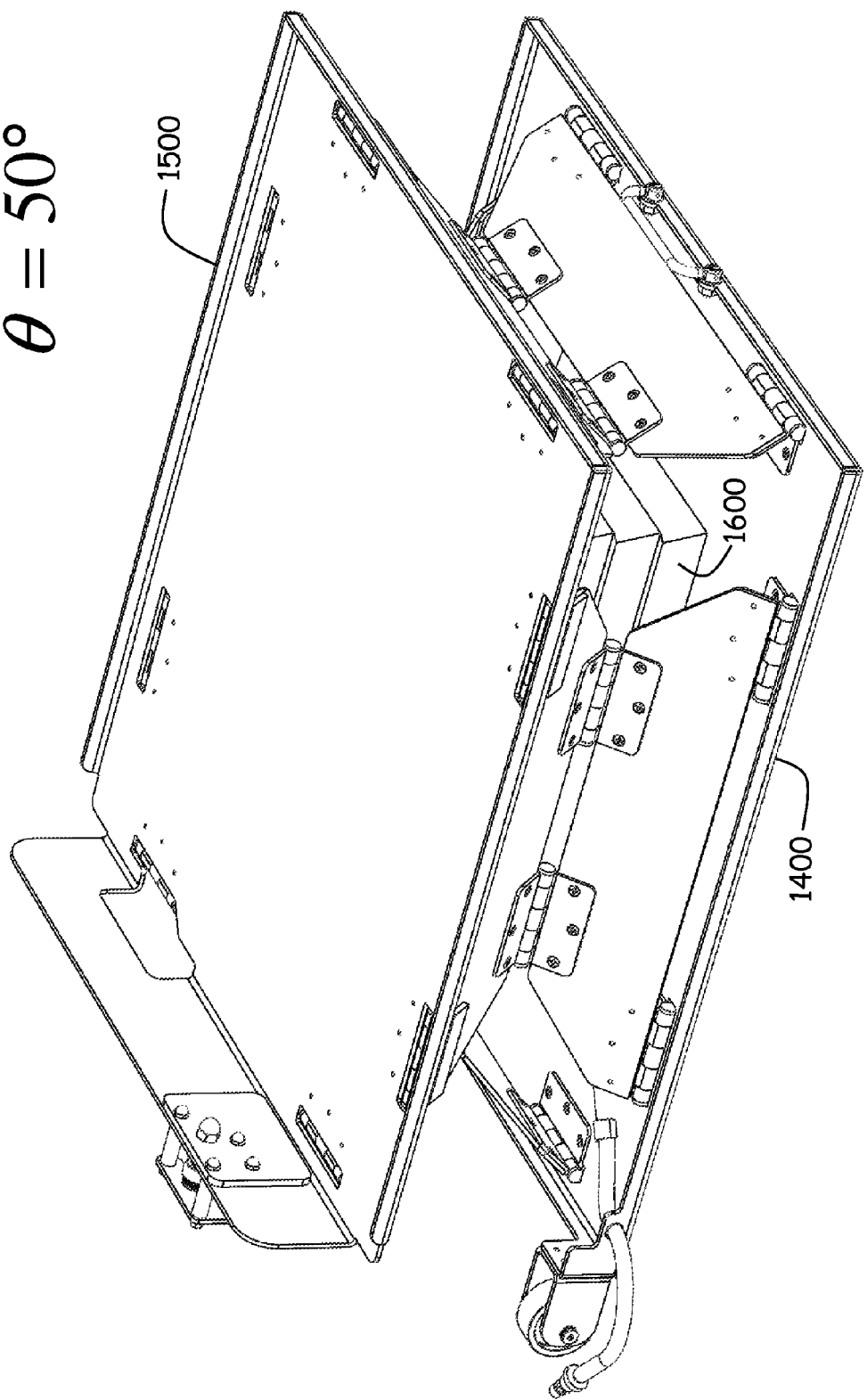

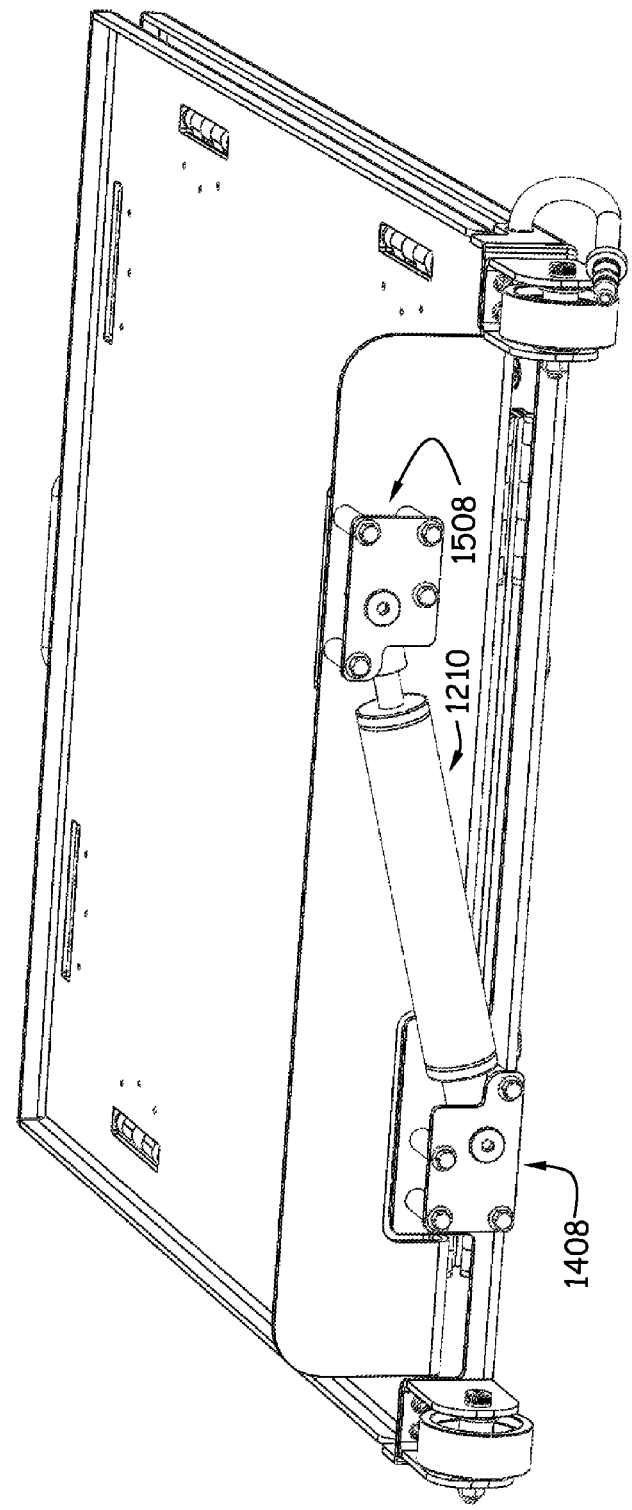
Fig. 27a  $\theta = -0.75°$ $s = \overline{AB} = \overline{BC}$

1108
θ = 20°

1108
$\theta = 50°$

1108
θ = 80°

1108
$\theta = 0°$

APPARATUS FOR LIFTING A CHAIR

1. BACKGROUND AND PRIOR ART

1.1 List and Categorization of Prior Art

The following is a tabulation of some prior art that presently appears relevant:

| Pat. No. | Kind Code | Issue Date | Patentee |
|---|---|---|---|
| U.S. Patents | | | |
| 4,083,599 | | 1978 Apr. 11 | Gaffney |
| 4,538,854 | | 1985 Sep. 3 | Wilson |
| 4,786,107 | | 1988 Nov. 22 | Crockett |
| 4,946,222 | | 1990 Aug. 7 | Matson |
| 4,993,777 | | 1991 Feb. 19 | LaPointe |
| 5,061,010 | | 1991 Oct. 29 | LaPointe |
| 5,165,753 | | 1992 Nov. 24 | Henderson |
| 5,294,179 | | 1994 Mar. 15 | Rudes, et al. |
| 5,375,910 | | 1994 Dec. 27 | Murphy |
| 5,466,046 | | 1995 Nov. 14 | Komorowski, et al. |
| 5,984,411 | | 1999 Nov. 16 | Galumbeck |
| 7,070,167 | B1 | 2006 Apr. 4 | Bacon and Robb |
| 8,398,171 | B2 | 2011 Mar. 19 | Lin and Tsai |
| 8,403,409 | B2 | 2013 Mar. 26 | Pollard and Olcheski |
| European Patents | | | |
| EP 0 261 344 B1 | | 1991 Oct. 23 | Rudolph |
| EP 0 512 775 B1 | | 1995 Dec. 27 | Stone |

A person who is infirm, either during recovery from a medical procedure, due to disease, or during old age, often has difficulty rising from a chair to a standing position upon a floor, a process known clinically as the "sit-to-stand task" or "sit-to-stand transfer", and commonly known as "standing up" or "standing".

Many prior-art devices address this problem, typically by raising the height of a chair's seat when a user of the chair wishes to stand. The effectiveness of raising a chair's seat to assist with sit-to-stand transfers is well known, as described at length in "Revolutionary advances in adaptive seating systems for the elderly and persons with disabilities that assist sit-to-stand transfers", by Richard Edlich, Cynthia L. Heather, and Michael H. Galumbeck, appearing in the *Journal of Long-Term Effects of Medical Implants*, 2003, 13(1): 31:39, which is included herein in its entirety by reference, and also in "Determinants of the Sit-to-Stand Movement: A Review", by Wim G M Janssen, Hans B J Bussmann, and Henk J. Stam, *Journal of the American Physical Therapy Association and the Dutch Royal Society for Physical Therapy,* 2002; 82:866-879, which is also included herein in its entirety by reference.

Prior-art devices for assisting with sit-to-stand transfer are separable into two categories; namely, a first category comprising specialty lift chairs that are built specifically for this purpose, and a second category comprising retrofittable devices that may be added to existing, ordinary chairs.

Prior-art examples in the first category include U.S. Pat. No. 4,538,854 (Wilson, 1985), U.S. Pat. No. 4,946,222 (Matson, 1990), U.S. Pat. No. 5,061,010 (LaPointe, 1991), U.S. Pat. No. 5,165,753 (Henderson, 1992), U.S. Pat. No. 5,375,910 (Murphy 1994), U.S. Pat. No. 5,466,046 (Komorowski, 1995), U.S. Pat. No. 5,984,411 (Galumbeck, 1999), U.S. Pat. No. 8,398,171 B2 (Lin and Tsai, 2011), U.S. Pat. No. 8,267,474 (Fetisoff, 2012), and U.S. Pat. No. 8,403,409 B2 (Pollard and Olcheski, 2013). Of these specialty lift chairs, most use mechanical linkages to perform the lifting motion, whereas U.S. Pat. No. 4,538,854 (Wilson, 1985) uses an air-inflatable bag beneath the seat, and U.S. Pat. No. 5,375,910 (Murphy 1994) uses an air-inflatable seat.

Prior-art examples in the second category include U.S. Pat. No. 4,786,107 (Crockett, 1988), U.S. Pat. No. 4,993,777 (LaPointe, 1991), U.S. Pat. No. 5,294,179 (Rudes et al., 1994). Because this second category of prior art is most germane herein, these three cases are discussed in some detail later in this section.

A third category of devices comprises retrofits to existing lift chairs that provide functions other than lifting. An example of this category is U.S. Pat. No. 4,083,599 (Gaffney, 1978), which provides rocking and wheeling functions for an existing lift chair. Devices in the third category are not germane to the current discussion because they themselves do not provide the chair-lifting function.

A fourth category of devices comprises lifting equipment designed for purposes other than lifting chairs with seated human occupants. Examples in this category include: EP 0 261 344 B1 (Rudolph (1991), EP 0 512 775 B1 (Stone, 1995), U.S. Pat. No. 7,070,167 (Bacon, 2006).

Devices in the first category—specialty lift chairs—are sold, for example, by La-Z-Boy® Incorporated of Monroe, Mich.; Pride Mobility Products of Exeter, Pa.; Golden Technologies of Old Forge, Pa.; AmeriGlide Inc. of Raleigh, N.C.; Easy Comforts of Oshkosh, Wis.; and others. Unfortunately, some infirm and older people who replace a favorite, comfortable, ordinary chair, such as a recliner, with one of the rising-and-tilting models are disappointed because of reduced comfort. Comfort in seating is highly individual; infirmity should not force a person to replace a favorite chair with a less-comfortable lifter chair, particularly if sit-to-stand assistance is needed only for a limited time, such as following a knee-replacement operation, as described in Edlich et al. previously cited, or following a posterior hip-replacement operation to avoid excessive hip flexion, as described in "Flexion reminder device to discourage recurrent posterior dislocation of a total hip replacement: a case report", by King Wong et al., *Journal of Medical Case Reports,* 2008, 2:250. Consequently, there is a need for a device that may be retrofitted to a normal chair—any chair of the user's choice—to provide sit-to-stand assistance.

Such is the motivation for devices in the second category—retrofittable devices that may be added to an existing, ordinary chair that normally rests upon a floor. Such an ordinary chair typically has a seat that is a fixed height above the floor. A typical, prior-art retrofit allows a user of the ordinary chair, when the user wishes to stand up, to increase the seat height from a low position used for sitting to a high position. This helps the user to stand. Conversely, the retrofit allows the user, when wishing to sit down, to decrease the seat height from the high position to the low position. This helps the user to sit.

1.2 Definitions

Let $H \equiv$ A vertical distance from the floor to a seat surface of the chair, also called "the seat", measured at the front of the seat. (1)

$R \equiv$ For a chair-lifting retrofit, a vertical distance from the floor to a base plane defined by a base of the chair, measured at the front of the seat. (2)

$H_0 \equiv$ The value of $H$ for a chair without a retrofit. (3)

$H_{SIT} \equiv$ The value of $H$ for a chair with the retrofit in its low position. (4)

$H_{STAND}$=The value of $H$ for a chair with the retrofit in its high position. (5)

$R_{SIT}$=The value of $R$ when the retrofit is in its low position; that is, the low-position "overhead" of the retrofit. (6)

$R_{STAND}$=The value of $R$ when the retrofit is in its high position. (7)

$\Delta R = R_{STAND} - R_{SIT}$=Amount by which the retrofit raises the base plane of the chair, measured at the front of the seat, as the retrofit moves from the low position to the high position. (8)

$\Delta H = H_{STAND} - H_{SIT}$=Amount by which the retrofit raises the seat of the chair, measured at the front of the seat, as the retrofit movies from the low position to the high position. (9)

From these definitions, it follows that $$H_{SIT} = H_0 + R_{SIT}, \quad (10)$$

$$H_{STAND} = H_0 + R_{STAND}, \quad (11)$$

$$\Delta H = \Delta R. \quad (12)$$

Note that definitions (3) through (12) above are deliberately stated in terms of the height of the chair at the front of the seat, because this is what matters most in helping the user to stand. Standing may be accomplished only when the user's center of gravity moves forward of the heels of his or her feet, as described in Edlich et al. cited earlier. Consequently, if the user's buttocks remain toward the rear of the seat, far behind the heels, standing is more difficult, because the body's center of mass is too far back, requiring a greater forward-leaning angle of the torso. Rather, the user should move his or her body's center of mass forward as much as possible, before attempting to stand, by sliding the buttocks forward toward the front of the seat. This also insures that the user's feet will remain in contact with the floor as the seat rises, as required for safety. Such a strategy is often recommended for people with bad backs and for pregnant women (e.g. http://my.clevelandclinic.org/healthy_living/back_health/hic_posture_for_a_healthy_back.aspx); in general, it is a task that many infirm people are able to accomplish easily and without assistance in typical chairs. Once the buttocks are repositioned toward the front of the chair, the height of the rear portion of the seat doesn't matter because the user is no longer in contact with the rear of the seat. Moreover, once the buttocks are repositioned toward the front, the forward tilt of the seat (provided by many specialty lifter chairs as well as prior-art retrofits) doesn't substantially matter either, for the same reason. Only the height of the front portion of the seat matters.

1.3 Desirable Attributes

1.3.1 First Desirable Attribute

Consequently, a first desirable attribute of a chair-lifting retrofit is that the amount of seat rise provided, measured at the front of the seat, be large. That is, $\Delta R$ ($=\Delta H$) should be large. If not-so-demanding users requires less change in seat height than the amount $\Delta H$ provided by the retrofit, they are free to use less, because a retrofit chair lifter typically can move to any position within its range and stop on demand. To determine how large $\Delta H$ should be for the most demanding users, consider results reported by Edlich et al., previously cited: for normal chairs, average seat heights vary from $$H_0 = 381 \text{ mm} = 15'' \text{ for living rooms} \quad (13)$$

to $$H_0 = 422 \text{ mm} = 16.6'' \text{ for nursing homes,} \quad (14)$$

whereas sit-to-stand performance is aided by lifting the seat height to as much as $$H_{STAND} = 610 \text{ mm} = 24''. \quad (15)$$

An adequate value for $\Delta H$ may be computed from $$\Delta H = \Delta R = H_{STAND} - H_{SIT} = H_{STAND} - (H_0 + R_{SIT}), \quad (16)$$

where the latter equality uses equation (10). Thus, for an ideal retrofit in which the low-position "overhead" $R_{SIT}$ is zero (see "Second Desirable Attribute", below), $$\Delta H = H_{STAND} - H_0 \text{ (for ideal case } R_{SIT} = 0), \quad (17)$$

whence, using the values in equations (15) and (13), an adequate amount of seat rise is $$\Delta H = \Delta R = (610 - 381) \text{ mm} = 229 \text{ mm} = 9.0''. \quad (18)$$

Consequently, prior-art retrofits that fail to raise the front portion of the seat at least this much are deficient.

1.3.2 Second Desirable Attribute

A second desirable attribute of a chair-lifting retrofit is that the low-position "overhead" imposed by the retrofit, $R_{SIT}$, defined by equation (6), be as close to zero as possible, because the user, sitting for extended periods of time with the retrofit in the low position, is likely to be very uncomfortable when $R_{SIT}$ is considerably larger than zero, inasmuch as his or her feet may be unsupported, or only partially supported, on the floor, particularly if his or her lower legs are short.

Consider how large a value of $R_{SIT}$ is acceptable. Although seat heights vary considerably from person to person, the presumption in designing a chair-lifting retrofit must be that the user's own chair is comfortable for the user; that is, the seat height $H_0$ is comfortable. Thus, when in the low position, the retrofit should alter $H_0$ as little as possible, because the user's comfort is indeed quite sensitive to the value of $H_{SIT}$.

As stated by ergonomics experts (http://ergo.human.cornell.edu/dea3250notes/sitting.html): "Minimum height [of a seat] should be 15" (38 cm) . . . . Fixed height should be 17" (43 cm). This is a compromise. A chair that is too high leads to increased pressure at the popliteal fold (underside of knees), decreasing blood circulation and increasing pressure on the nerve. A chair that is too low increases weight on the ischial tuberosities [the sitting bones]". Note how closely the values stated in this passage agree with equations (13) and (14). It is concluded that variation beyond the 50-mm (2-inch) range sited by these sources is unacceptable. Thus, a chair-lifting retrofit must be limited to at most $$R_{SIT} \leq 50 \text{ mm}(2'') \quad (19)$$

and the closer $R_{SIT}$ is to zero, the better.

1.3.3 Third, Fourth, and Fifth Desirable Attributes

A third desirable attribute of a chair-lifting retrofit is that it be universally applicable to all types of chairs without custom engineering, and without modifying the chair.

A fourth desirable attribute of a chair-lifting retrofit is that its mechanism should avoid occupying space between the base of the chair and the underside of its seat. A retrofit lacking this attribute lacks general usefulness, because for many chairs, including most popular recliner models, no such space is available—the mechanism of the chair itself already occupies virtually all the space between its base and its seat.

A fifth desirable attribute of a chair-lifting retrofit is that it should be easily transported, deployed, and easily un-deployed. This is important, for example, if the retrofit is used with a given chair only for a short time, on a rental basis for example, implying that the retrofit must be redeployed repeatedly with different chairs. Consequently, as for the third desirable attribute, deployment should not involve modifying the chair, such as penetrating its members with fasteners. Moreover, the retrofit should disassemble easily into a small number of pieces, each of which is compact and easily transportable.

1.4 Shortcomings of Prior Art

Every prior-art chair-lifting retrofit suffers from one or more of the following shortcomings:

(a) It fails to have the first desirable attribute; that is, $\Delta R$ is too small. Thus the prior-art retrofit fails to provide sufficient sit-to-stand assistance, the very task it purports to accomplish.

(b) It fails to have the second desirable attribute; that is, $R_{SIT}$ is too large. Thus the prior-art retrofit makes sitting uncomfortable.

(c) It fails to have the third desirable attribute; that is, it requires custom adaptation to be effectively and safely used with different types of chairs. For example, some prior-art retrofits, as will be shown, cause the chair to tilt forward. To avoid danger in such cases, the chair must be well secured to the retrofit. Yet each chair is different, so a custom scheme must be developed to secure it to the retrofit. Consequently, prior-art retrofits that tilt forward lack general usefulness, because they cannot be adapted to a wide variety of chairs without costly and time-consuming custom engineering. Moreover, in most cases, the chair must be modified to achieve safe retrofit-to-chair attachment; for example, the chair's frame members must be penetrated by fasteners such as screws, which is undesirable.

(d) It fails to have the fourth desirable attribute; that is, its mechanism fails to avoid occupying some of the space between the base of the chair and the underside of the seat. Such a retrofit lacks general usefulness, because for many chairs, including most popular recliner models, no such space is available—the mechanism of the chair itself already occupies virtually all the space between floor and seat. Typically, prior-art retrofits suffer from shortcoming (d) because they attempt thereby to avoid shortcoming (b).

(e) It fails to have the fifth desirable attribute; that is, it cannot be easily transported, deployed and un-deployed, for one or more reasons. It may require modification of the chair, or otherwise involve difficult and time-consuming assembly. It may be monolithic and therefore be too cumbersome and heavy to move easily. Conversely, it may disassemble into too many pieces, and therefore be difficult to manage.

With regard to these five shortcomings (a) through (e), consider specifically each piece of previously cited prior art in the second category (i.e. retrofits), including U.S. Pat. No. 4,786,107 (Crockett, 1988), U.S. Pat. No. 4,993,777 (LaPointe, 1991), and U.S. Pat. No. 5,294,179 (Rudes et al., 1994). To summarize, Crockett's retrofit suffers from shortcomings (a), (b), (c) and (e); LaPointe's retrofit suffers from shortcomings (a), (d), (e) and to some extent from (b); and Rudes's retrofit suffers from shortcomings (a), (b), (c), and (e).

1.4.1 Specific Prior Art: Crockett (U.S. Pat. No. 4,786,107) (FIGS. 1 Through 3)

Crockett's chair-lifting retrofit suffers from shortcoming (b): $R_{SIT}$ is too large. Consider Crockett's FIGS. 1, 4 and 5, duplicated here with annotations as FIGS. 1, 2, and 3, respectively. FIGS. 2 and 3 illustrate side views of Crockett's retrofit: FIG. 2 shows the retrofit in a high position; FIG. 3 shows it in a low position. In the low position, the mechanism adds seat-height overhead $R_{SIT}$ to the normal seat-height of the chair seat. Crockett does not state a value for $R_{SIT}$, but it must be large enough to accommodate a certain minimum angle of the riser arm (Crockett's reference numeral 64), this angle being denoted $\theta$ on FIG. 3; otherwise, the force required from Crockett's power means (reference numeral 44 of Crockett's FIG. 2, not shown here), would become so large that no practical power means could deliver it, inasmuch as the required force varies as the cotangent of angle $\theta$, which rises to infinity as $\theta$ approaches zero. Moreover, Crockett's value of $R_{SIT}$ must be large enough to accommodate the power means itself. For both these reasons, Crockett's value of $R_{SIT}$ is estimated to be 75 mm or more, which violates the requirement (19), which states that $R_{SIT}$ should be limited to 50 mm, and preferably be smaller. Consequently, Crockett's retrofit fails to provide comfortable sitting for the user.

Crockett's retrofit further suffers from shortcoming (a); that is, $\Delta R$ is too small. Crockett does not state a typical value of $\Delta R$ achieved by his apparatus, but scaling in FIGS. 2 and 3 shows $$\frac{\Delta R}{R_{SIT}} = \frac{R_{STAND} - R_{SIT}}{R_{SIT}} = 1.59 \text{ (Crockett)}. \qquad (20)$$

Assuming the value $R_{SIT}$=75 mm estimated in the previous paragraph implies $$\Delta R = 119 \text{ mm} = 11.9 \text{ cm} = 4.7'' \text{ (Crockett)}. \qquad (21)$$

This value of $\Delta R$ is far less than the desired value of 229 mm (9.0") stated in equation (18). Consequently, Crockett's retrofit provides insufficient sit-to-stand assistance for many users.

Crockett's retrofit also suffers from shortcoming (c). As stated in Crockett's column 2, lines 54-57: "The attachment means . . . may be replaced with clips, straps, bands, bolts, screws, etc. to accommodate a particular seating structure's . . . or user's requirements." That is, deploying the retrofit safely requires a varied array of attachment solutions that must be separately engineered for various types of chairs, and likely involves altering the chair by penetration of fasteners and the like. The general usefulness of Crockett's retrofit is thereby compromised.

Finally, Crockett's retrofit suffers from shortcoming (e), not only because it may require modification of the chair, as already mentioned, but also because it is a monolithic structure which is likely to be too heavy and cumbersome to be easily transported and stored.

1.4.2 Specific Prior Art: La Pointe (U.S. Pat. No. 4,993,777) (FIGS. 4 Through 7)

LaPointe's chair-lifting retrofit suffers from shortcoming (a). Consider LaPointe's FIGS. 1 and 2, which are reproduced here as FIGS. 4 and 5 respectively. Referring to these figures, La Pointe states the following at column 2, lines 55-58: "the height 21 of the seat 11 above the floor is about 17 inches in the seated position of [FIG. 5] and about 18 inches in the fully elevated position of [FIG. 4]." That is, the important portion of the seat—the front—is raised only by $$\Delta R = 1'' = 25 \text{ mm (LaPointe)}. \qquad (22)$$

This is far less than the required value of 229 mm stated in equation (18). To be sure, because of the forward tilt angle that LaPointe provides (29°), the rear of the seat is raised much more, but this is largely ineffective in helping the user to stand, because, as previously explained following equation (12), to be in contact with the rear portion of the seat, the user's center of gravity must be so far back that it cannot possibly be forward of the heels, which is required to achieve the sit-to-stand task. Thus, LaPointe's retrofit provides far too little seat rise to help appreciably with the sit-to-stand process.

LaPointe's retrofit further suffers from shortcoming (d), and to some extent from (b), as stated in column 3, lines 15-19: "The mechanism to be described nests inside of the wooden frame member and the bottom of the chair and . . . the assembly 1 is of low profile and increases the seat height by only about 2 inches." That is, LaPointe tries to minimize shortcoming (b), achieving $R_{SIT}=2$ inches (and thus barely satisfying requirement (19), but he does so by introducing shortcoming (d), assuming unrealistically, as shown in his FIG. 6 (FIG. 7 herein), that his mechanism can protrude into space beneath the chair's seat. Although this assumption was apparently valid for the particular type of chair he was considering, as described (per LaPointe) in U.S. Pat. No. 4,367,895, it is not valid for most chairs, particularly popular modern recliners, whose internal mechanisms already fill this space. Consequently, LaPointe's retrofit can only be used with a very limited subset of chairs.

Finally, LaPointe's retrofit suffers from shortcoming (e), not only because it requires modification of the chair, as already mentioned, but also because it is a monolithic structure which is likely to be too heavy and cumbersome to be easily transported and stored.

1.4.3 Specific Prior Art: Rudes et al. (U.S. Pat. No. 5,294, 179) (FIGS. 8 Through 10)

Rudes's chair-lifting retrofit suffers from shortcoming (a). Consider Rudes's FIGS. 1, 5, and 3, which are reproduced here as FIGS. 8, 9, and 10 respectively, annotated to show $R_{SIT}$ on FIG. 9 and $R_{STAND}$ on FIG. 10. Scaling shows that $$\frac{R_{STAND}}{R_{SIT}} = 2.73 \text{ (Rudes)}, \tag{23}$$

whence $$\Delta R = R_{SIT}\left(\frac{R_{STAND} - R_{SIT}}{R_{SIT}}\right) \tag{24}$$

$$= R_{SIT}\left(\frac{R_{STAND}}{R_{SIT}} - 1\right)$$

$$= 1.73 \ R_{SIT} \text{ (Rudes)}.$$

At column 2, lines 27-37, Rudes states that "the present invention . . . [has] the advantage of an unusually compact lifting and tilting device with a retracted height of only about 4.5 inches." In other words, $$R_{SIT}4.5''=114 \text{ mm (Rudes)}. \tag{25}$$

Substituting equation (25) into equation (24), $$\Delta R=197 \text{ mm}=7.8'' \text{ (Rudes)}. \tag{26}$$

This violates the requirement (18). Consequently, Rudes's retrofit provides insufficient sit-to-stand assistance for certain users.

Rudes's chair-lifting retrofit further suffers from shortcoming (b) as revealed by the same passage just cited, at column 2, lines 27-37, which is expressed as equation (25). Although Rudes describes his seat-height overhead of 4.5 inches as "unusually compact", this overhead is actually very large, being seriously in violation of requirement (19). Consequently, Rudes retrofit will produce great discomfort while the user is sitting.

Rudes's retrofit further suffers from shortcoming (c), in that it causes the chair to tilt forward, and, as previously mentioned, a retrofit providing forward tilting requires, for safety reasons, means to secure the chair to the retrofit. This makes it highly unlikely that such a retrofit can be universally adapted to a wide variety of chairs. Indeed, although Rudes contends, in column 1, lines 45-46, that his retrofit is "universally adaptable to most previously manufactured chairs", the scheme he actually describes is hardly universally adaptable. That is, at column 4, lines 4-8, he states that "The peripheral edge of the bottommost part of chair frame 19 [FIG. 10 herein], shown in partial view by broken lines, is bolted to platform 16 through multiple mounting flanges 20 having expanded openings 22 for threaded connectors". This is not adaptable, for example, to chairs with four legs rather than a base frame. Nor is it adaptable to rocker-style recliners with round bases. Even upholstered chairs with rectangular base frames—the type of chair Rudes attempts to accommodate—are unlikely to have frame members that line up with the "expanded openings" of a particular platform design; to accommodate the large number of base-frame sizes in the marketplace, many platform variations would have to be manufactured. Thus, much custom engineering and expense is required to adapt Rudes retrofit to a wide variety of chairs, thereby compromising its general usefulness. Moreover, even if a chair happens to accommodate Rudes attachment scheme, alteration of the chair itself is still required, in the form of the "threaded connectors" that must be driven into the wooden frame of the chair. This is undesirable; it is preferable not to alter the chair at all.

Finally, Rudes's retrofit suffers from shortcoming (e), not only because it requires modification of the chair, as just mentioned, but also because it is a monolithic structure that is likely to be too heavy and cumbersome to be easily transported and stored.

1.4.4 Prior Art Aimed at Other Applications

The fourth category of lifting devices defined earlier—equipment designed for purposes other than lifting chairs with seated occupants—is found also to possess one or more shortcomings (a) through (e) listed above, particularly shortcoming (b). That is, devices designed for other applications, despite being often entitled "low profile", are typically far too cumbersome to permit comfortable sitting; that is, the minimum height from floor to platform, defined by equation (6) as $R_{SIT}$, is too large to satisfy equation (19), which states that $R_{SIT}$ should be less than 50 mm (the smaller the better) for comfortable sitting. For realistic embodiments cited in the prior art: $R_{SIT}=135$ mm for EP 0 261 344 B1 (Rudolph, 1991, column 10, lines 41-43); $R_{SIT}=159$ mm for EP 0 512 775 B1 (Stone, 1995, column 8, lines 13-14), and $R_{SIT}>69$ mm for U.S. Pat. No. 7,070,167 (Bacon, 2006, column 5, lines 6-7). The latter inequality arises because Bacon's 69 mm includes only the height of an air spring (the lifting element), but not the associated structure.

2. SUMMARY

In one or more embodiments, a lifting apparatus for raising and lowering a payload along an imaginary z axis of an imaginary, right-handed Cartesian xyz coordinate system comprising an imaginary x axis defining a +x direction and a −x direction, an imaginary y axis defining a +y direction and a −y direction, and the imaginary z axis defining a +z direction denoted "upward" and a −z direction denoted "downward", these axes also defining an imaginary xy plane spanned by the x and y axes, in which context the lifting apparatus comprises:
  a. a base having an upward-facing surface $S_1$ substantially parallel to the xy plane at a first z coordinate $z_1$
  b. a platform having an upward-facing surface $S_2$ substantially parallel to the xy plane at a second z coordinate $z_2$ and a downward-facing surface $S_3$ substantially parallel to the xy plane,
  c. a plurality of linkage assemblies, each comprising
    i. at least one lower hinge, at least one center hinge, and at least one upper hinge, where each hinge comprises a first leaf, a second leaf, and an axis of rotation about which the second leaf rotates with respect to the first leaf,
    ii. a lower plate and an upper plate, where each plate comprises an inside surface, an opposing outside surface, a lower edge, and an upper edge opposite the lower edge,
    iii. a first fastening means to affix the first leaf of each lower hinge to the upward-facing surface of the base,
    iv. a second fastening means to affix the second leaf of each lower hinge to the inside surface of the lower plate near the lower edge thereof,
    v. a third fastening means to affix the first leaf of each center hinge to the outside surface of the lower plate near the upper edge thereof,
    vi. a fourth fastening means to affix the second leaf of each center hinge to the outside surface of the upper plate near the lower edge thereof,
    vii. a fifth fastening means to affix the first leaf of each upper hinge to the inside surface of the upper plate near the upper edge thereof,
    viii. a sixth fastening means to affix the second leaf of each upper hinge to the downward-facing surface of the platform,
  d. a collection of at least one inflatable bag, the collection encompassing a collective bag footprint upon the xy plane, each bag comprising a downward-facing surface $B_1$, an upward-facing surface $B_2$, a set of lateral surfaces between surfaces $B_1$ and $B_2$, and a fluid-entry port, the fluid-entry port being the only means by which a pressurized fluid can enter or exit the bag, which is otherwise enclosed, and which is designed so that a distance between $B_1$ and $B_2$ increases when the pressurized fluid is delivered to the bag through the fluid-entry port, and decreases when pressurized fluid in the bag is exhausted therefrom,
  e. a seventh fastening means to affix the downward-facing surface $B_1$ of each bag to the upward-facing surface $S_1$ of the base,
  f. an eighth fastening means to affix the upward-facing surface $B_2$ of each bag to the downward-facing surface $S_3$ of the platform,
  g. a fluid-delivery means for delivering the pressurized fluid to the fluid-entry port of each bag,
  whereby,
    as each bag is gradually filled with pressurized fluid, its internal volume gradually increases such that a distance $R \equiv z_2 - z_1$ between the base and the platform is gradually increased from $R = R_{SIT}$ $R = R_{STAND}$ despite a payload resting on surface $S_2$, whence the payload is raised, in a gradual upward motion, by an amount $\Delta R \equiv R_{STAND} - R_{SIT}$,
    as each bag is gradually emptied of pressurized fluid, its internal volume gradually decreases such that distance R is gradually decreased from $R_{STAND}$ to $R_{SIT}$, whence the payload is lowered, in a gradual downward motion, by the amount $\Delta R$, and
    throughout the upward and downward motions, platform surface $S_2$ is, by virtue of the linkage assemblies, maintained substantially parallel to base surface $S_1$, and the platform is, moreover, substantially constrained by the linkage assemblies from movement with respect to the base in both the x and the y directions.

In an embodiment described herein, for example, the number of linkage assemblies is four. These four linkage assemblies, denoted $A_1$, $A_2$, $A_3$, and $A_4$, are arranged around the perimeter of an outer rectangle lying in the xy plane, with the outer rectangle's center at $(x,y)=(0,0)$ and the outer rectangle's x and y dimensions being $a_x$ and $a_y$ respectively, such that, to within mechanical tolerances,
  an x coordinate of the lower-hinge axis of $A_1$, denoted $x_{1L}$, satisfies $x_{1L} = +\frac{1}{2}a_x$,
  an x coordinate of the lower-hinge axis of $A_2$, denoted $x_{2L}$, satisfies $x_{2L} = -\frac{1}{2}+a_x$,
  a y coordinate of the lower-hinge axis of $A_3$, denoted $y_{3L}$, satisfies $y_{3L} = +\frac{1}{2}a_y$, and
  a y coordinate of the lower-hinge axis of $A_4$, denoted $y_{4L}$, satisfies $y_{4L} = -\frac{1}{2}a_y$.

In the embodiment described herein, the plates of each linkage fold inward, toward the outer rectangle's center at $(x,y)=(0,0)$, whereby, throughout the upward and downward motions, the axis of the center hinges of each linkage assembly lies between the outer rectangle and a concentric inner rectangle having x and y dimensions $b_x$ and $b_y$ respectively, where $b_x < a_x$ and $b_y < a_y$, such that, throughout the upward and downward motions, to within mechanical tolerances,
  an x coordinate of the center-hinge axis of $A_1$, denoted $x_{1C}$, satisfies $+\frac{1}{2}b_x \leq x_{1C} < +\frac{1}{2}a_x$,
  an x coordinate of the center-hinge axis of $A_2$, denoted $x_{2C}$, satisfies a $-\frac{1}{2} < x_{2C} \leq -\frac{1}{2}b_x$,
  a y coordinate of the center-hinge axis of $A_3$ denoted $y_{3C}$, satisfies $+\frac{1}{2}b_y \leq y_{3C} < +\frac{1}{2}a_y$,
  a y coordinate of the center-hinge axis of $A_4$, denoted $y_{4C}$, satisfies $-\frac{1}{2}a_y < y_{4C} \leq -\frac{1}{2}b_y$.

Moreover, in the embodiment described herein,
  the collection of bags comprises just one bag, whose footprint lies within the inner rectangle
  a damper is connected, for safety purposes, between the base and the platform for the purpose of providing a resistance to potentially dangerous, fast, downward motion, the resistance being a substantially non-decreasing function of the time rate of change of R, whereby sudden downward motion that may be caused, by example, by bag failure, are prevented.
  the pressurized fluid is compressed air.
  The fluid delivery means comprises a pressure-limiting device to limit the maximum pressure of compressed air therein, thereby to reduce the likelihood that water vapor within the air will condense to form liquid water within the fluid-delivery means and within the collection of bags.

The embodiment described herein has been reduced to practice as a working prototype, and has been designed for applications where the payload is a chair plus a person seated therein.

3. ADVANTAGES

Accordingly, when the lifting apparatus is employed as a chair lifter retrofitted to an existing chair or other seating device, several advantages of one or more aspects are as follows; these advantages address item-for-item the prior-art shortcomings (a) through (e) described in Section 1.4:

(a) In the high position, the important part of the chair seat—the front, as explained in Section 1.2 above—is raised by an amount sufficient to allow even a demanding user to accomplish the sit-to-stand task. For example, in the prototype embodiment, the chair seat is lifted by $\Delta H \approx 236$ mm. This more than satisfies the requirement expressed by equation (18), namely $\Delta H \geq 229$ mm. Consequently, unlike all prior-art retrofittable chair lifters known, the lifting apparatus provides adequate seat rise $\Delta H$ even for demanding users.

(b) In the low position, where the user of the chair must sit for extended periods, the lifter assembly produces a seat height that is only modestly higher than normal, by an amount $R_{SIT} \approx 39$ mm. This easily meets the requirement expressed by equation (19), namely $R_{SIT} \leq 50$ mm. Consequently, unlike all prior-art retrofittable chair lifters known—except for those that side-step the issue by introducing shortcoming (d), thereby ruling out applicability to many existing chairs—the lifting apparatus described herein causes no sitting discomfort because $R_{SIT}$ is small.

(c) The lifting apparatus is universally retrofittable to all types of chairs, because the platform is simply placed on the platform. The top surface of the platform is substantially planar, so it acts as a surrogate floor for the chair. No additional, chair-specific engineering is necessary. Because the lifting apparatus does not cause the chair to tilt, the chair does not have to be secured to the platform, so again, no chair-specific engineering is required; at most, shifting of the chair on the platform may be eliminated by simple adhesive pads affixed to the platform. The chair is not altered in any way.

(d) The lifting apparatus does not use any space between the base of the chair and the seat, because the platform on which the chair rests is substantially flat over the entire footprint of the chair. Nothing projects upward from the platform; consequently, it creates no interference with any structure or mechanism of the chair.

(e) The lifting apparatus is easily deployable, movable and storable, for two reasons. First, it does not require any attachment to the chair or modification thereof. Second, it separates into just a few relatively light, compact, manageable pieces that may be easily move and stored.

An additional advantage of the lifter apparatus is that it is compact. The width of the lifting apparatus is no wider than typical, comfortable chairs, and no deeper than the reclined depth of typical recliner chairs. Consequently, it is easily accommodated in typical living spaces. Moreover, it is easily passable through residential doors.

Other advantages of one or more aspects will be apparent from a consideration of the drawings and the ensuing description.

4. BRIEF DESCRIPTION OF THE DRAWINGS

FIG. 1 illustrates a perspective view of a prior-art, retrofittable chair-lifting device described by Crockett, together with a chair.

FIG. 2 illustrates a side view of the prior-art, retrofittable chair-lifting device described by Crockett, shown in a high position.

FIG. 3 illustrates a side view of the prior-art, retrofittable chair-lifting device described by Crockett, shown in a low position.

FIG. 6 illustrates a perspective view of the prior-art, retrofittable chair-lifting device described by LaPointe, shown in the high position.

FIG. 7 illustrates a vertical section through the prior-art, retrofittable chair-lifting device described by LaPointe, shown in the low position, together with the chair.

FIG. 8 illustrates a perspective view of a prior-art, retrofittable chair-lifting device described by Rudes et al., shown in a high position, together with the chair.

FIG. 9 illustrates a side view of the prior-art, retrofittable chair-lifting device described by Rudes et al., shown in a low position.

FIG. 10 illustrates a side view of the prior-art, retrofittable chair-lifting device described by Rudes et al., shown in the high position.

Figure 4:
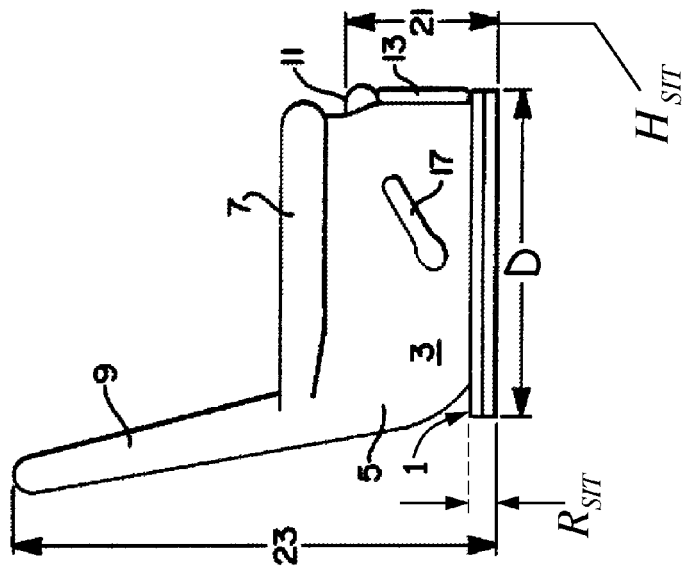
FIG. 4 illustrates a side view of a prior-art, retrofittable chair-lifting device described by LaPointe, shown in a high position, together with the chair.
Figure 5:
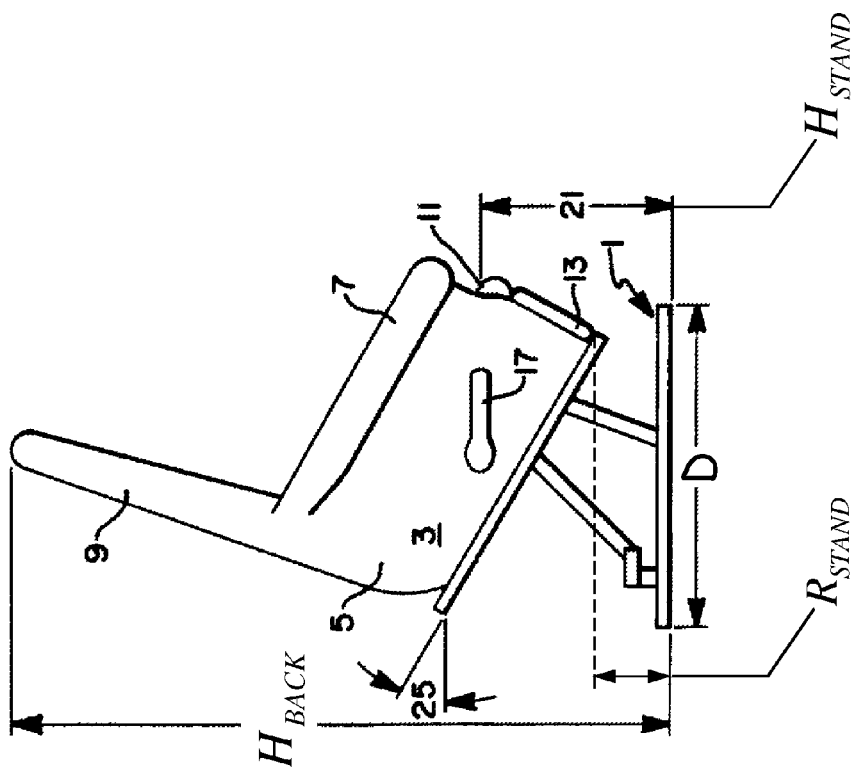
FIG. 5 illustrates a side view of the prior-art, retrofittable chair-lifting device described by LaPointe, shown in a low position, together with the chair.
Figure 11A:
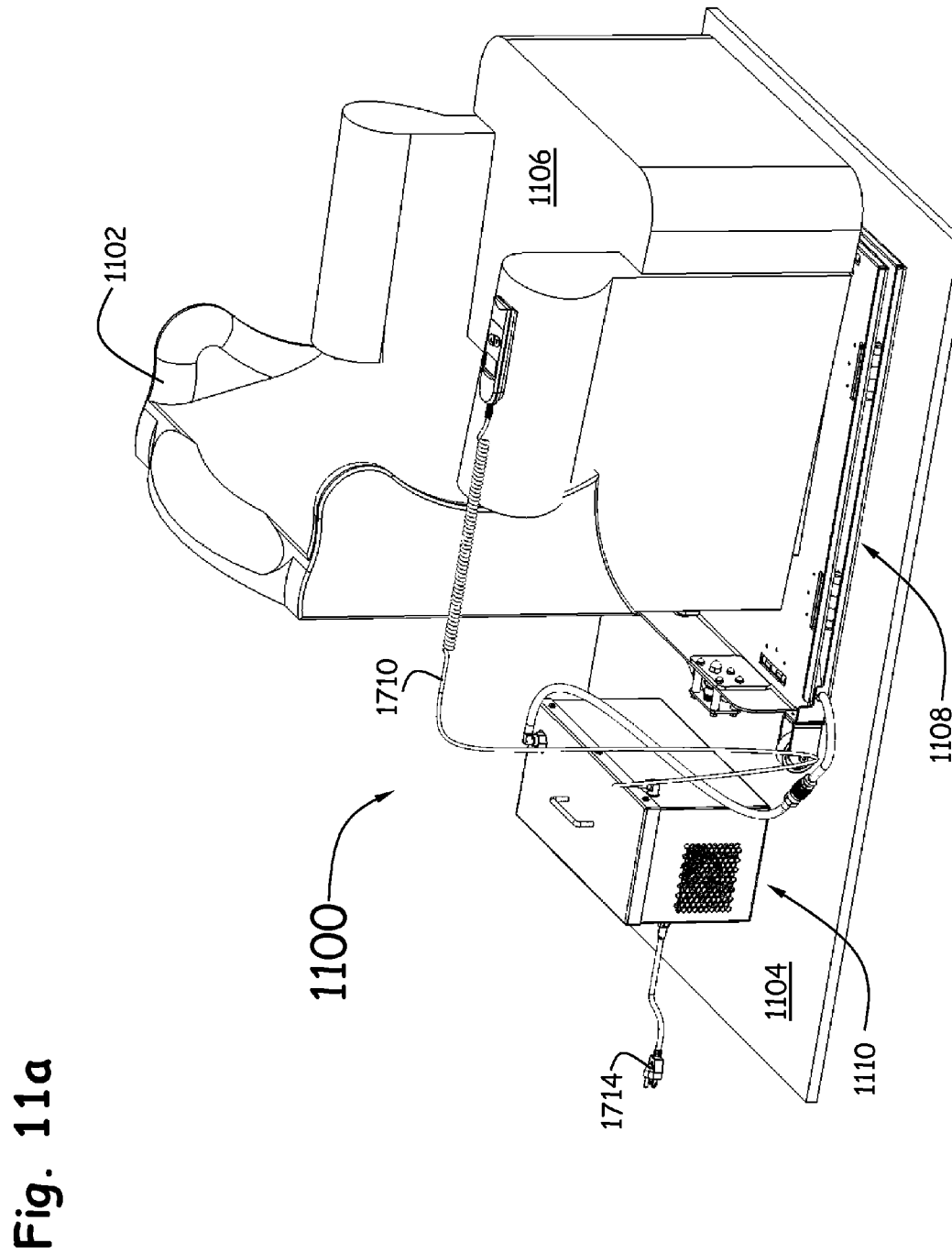

FIG. 11*a* illustrates a perspective view of lifting apparatus 1100 according to a described embodiment, shown resting on floor 1104 in a low position, with chair 1102 as payload.

Figure 11B:
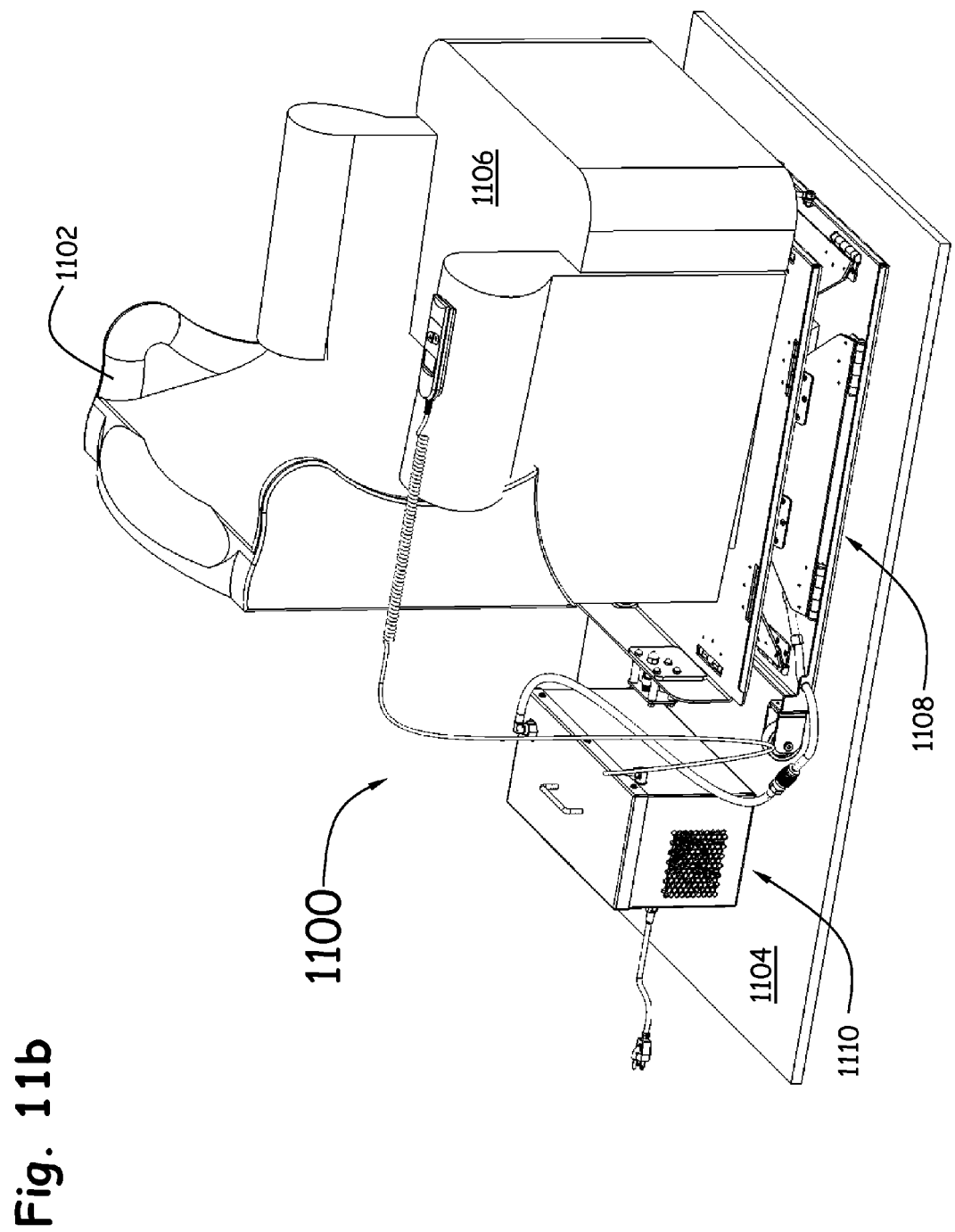

FIG. 11*b* illustrates a perspective view of lifting apparatus 1100 according to the described embodiment, shown resting on floor 1104 in a first intermediate position, with chair 1102 as payload.

Figure 11C:
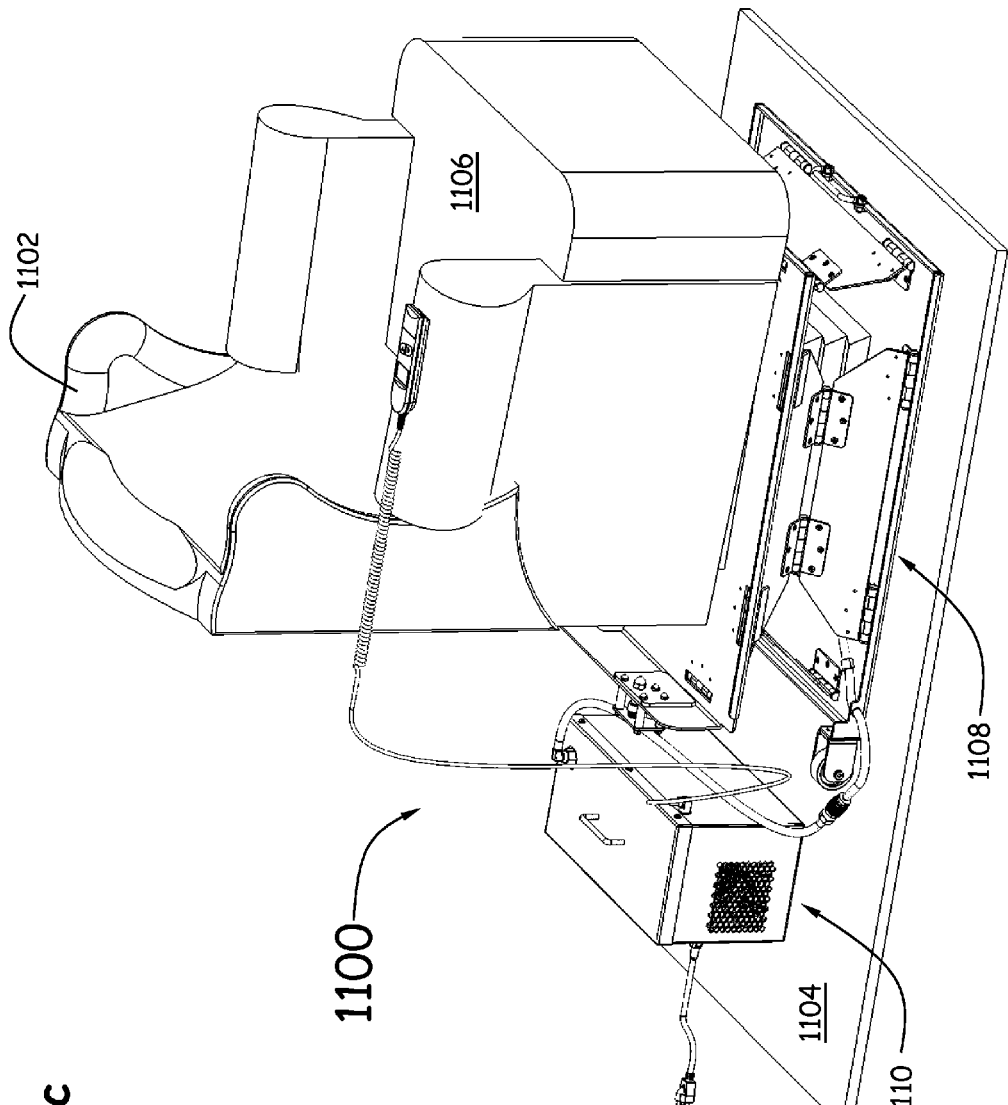

FIG. 11*c* illustrates a perspective view of lifting apparatus 1100 according to the described embodiment, shown resting on floor 1104 in a second intermediate position, with chair 1102 as payload.

Figure 11D:
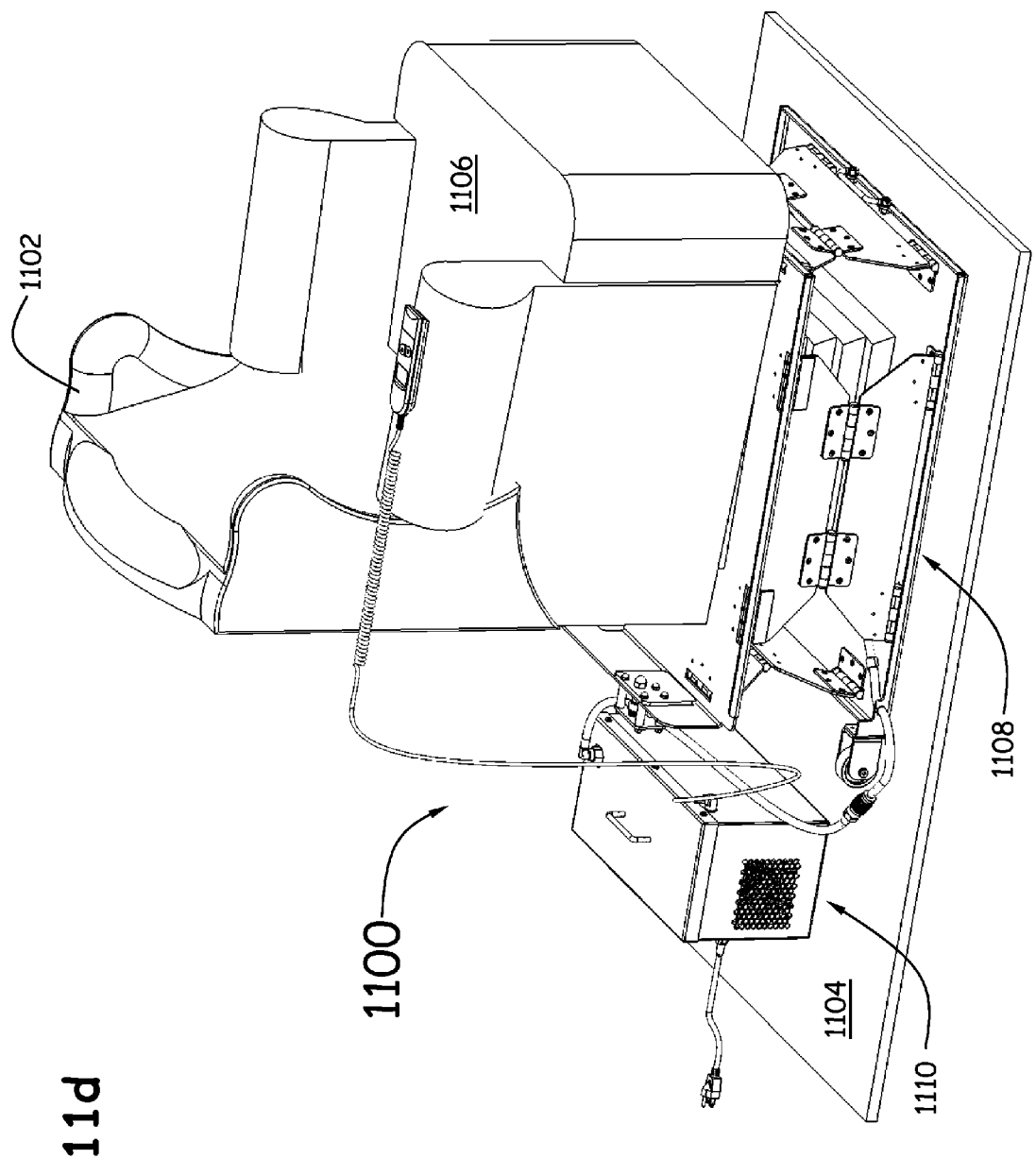

FIG. 11*d* illustrates a perspective view of lifting apparatus 1100 according to the described embodiment, shown resting on floor 1104 in a high position, with chair 1102 as payload.

Figure 12A:
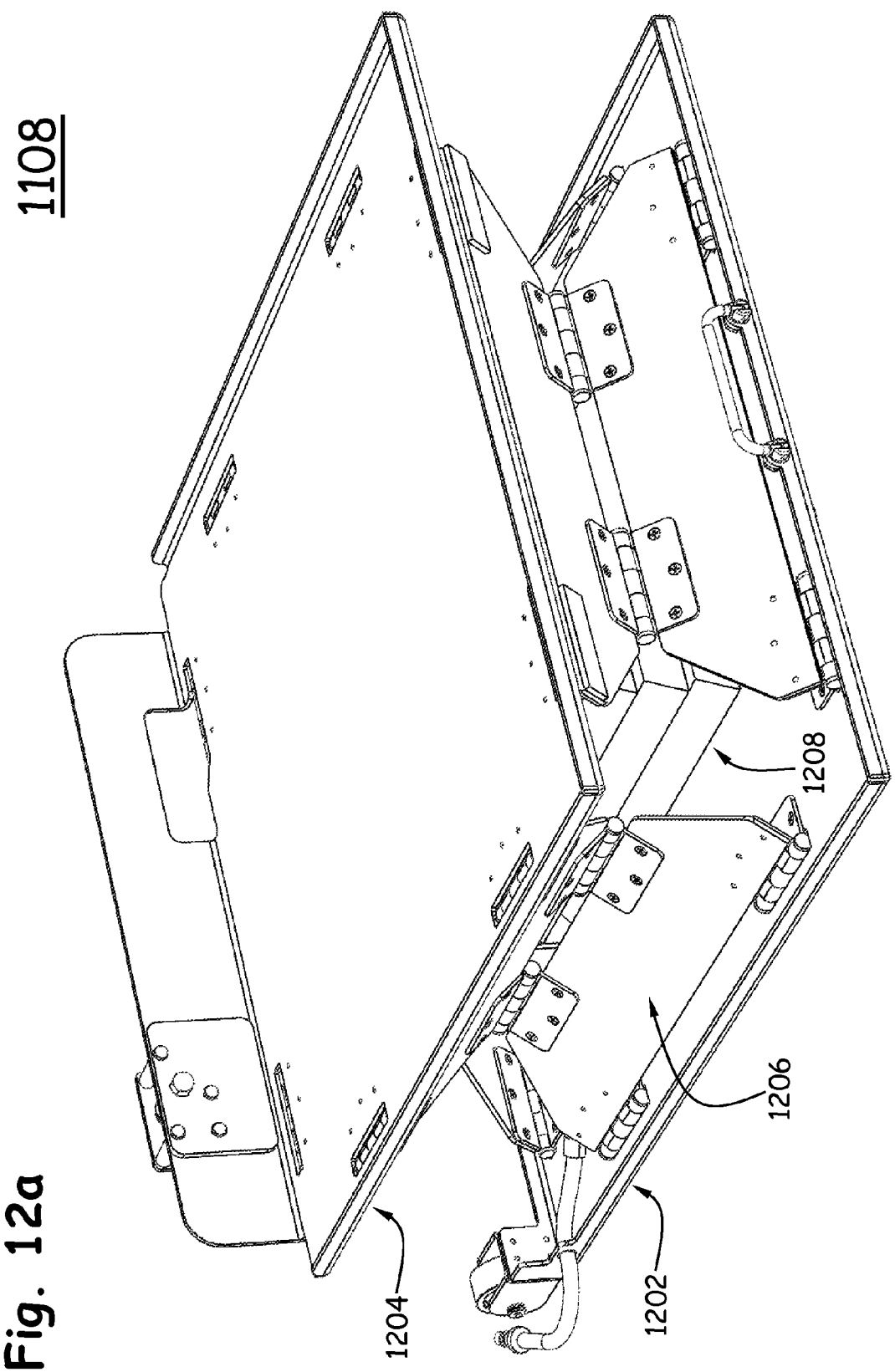

FIG. 12*a* illustrates a front perspective view of lifter assembly 1108 in the second intermediate position.

Figure 12B:
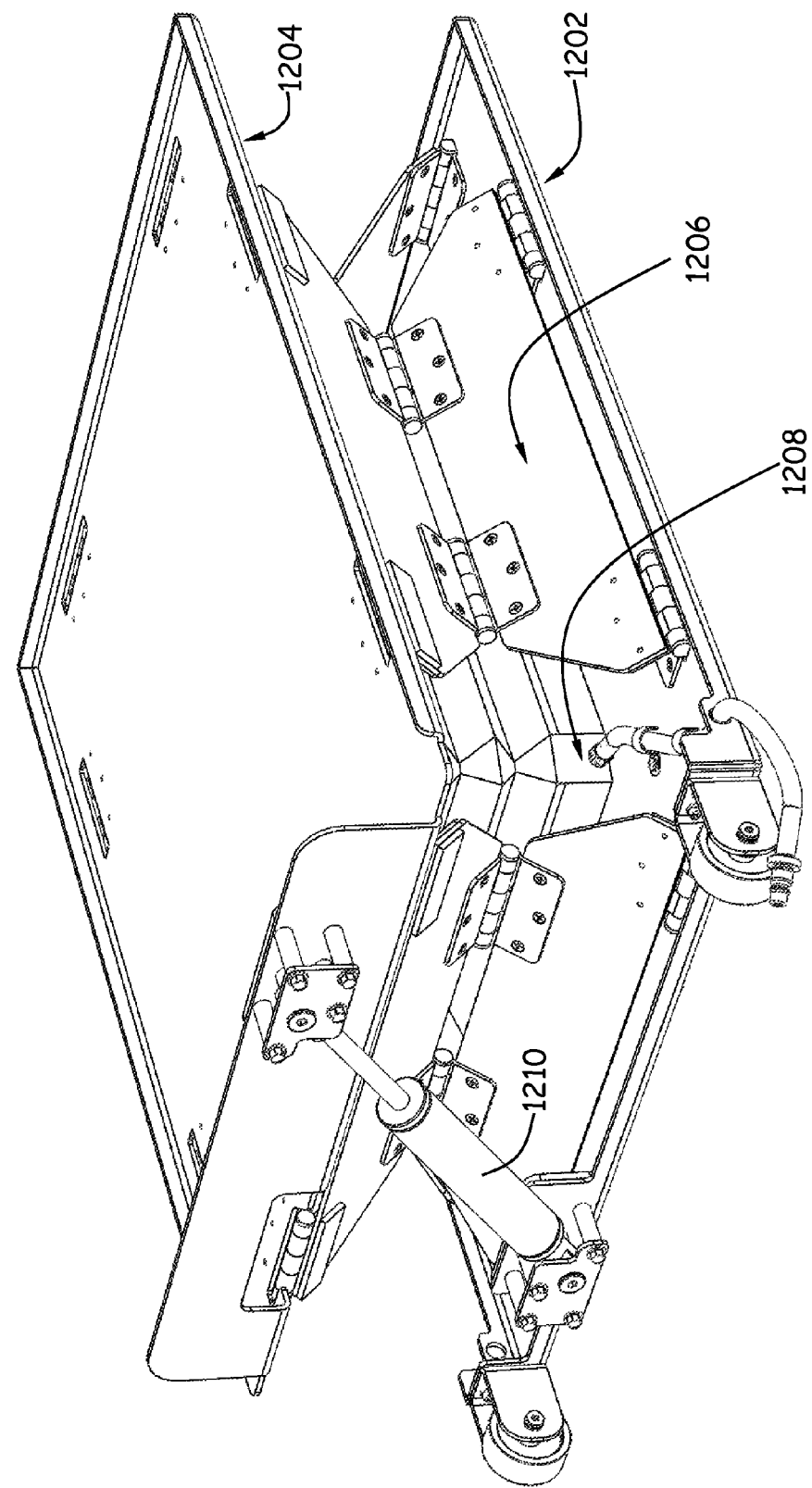

FIG. 12*b* illustrates a rear perspective view of lifter assembly 1108 in the second intermediate position.

Figure 12C:
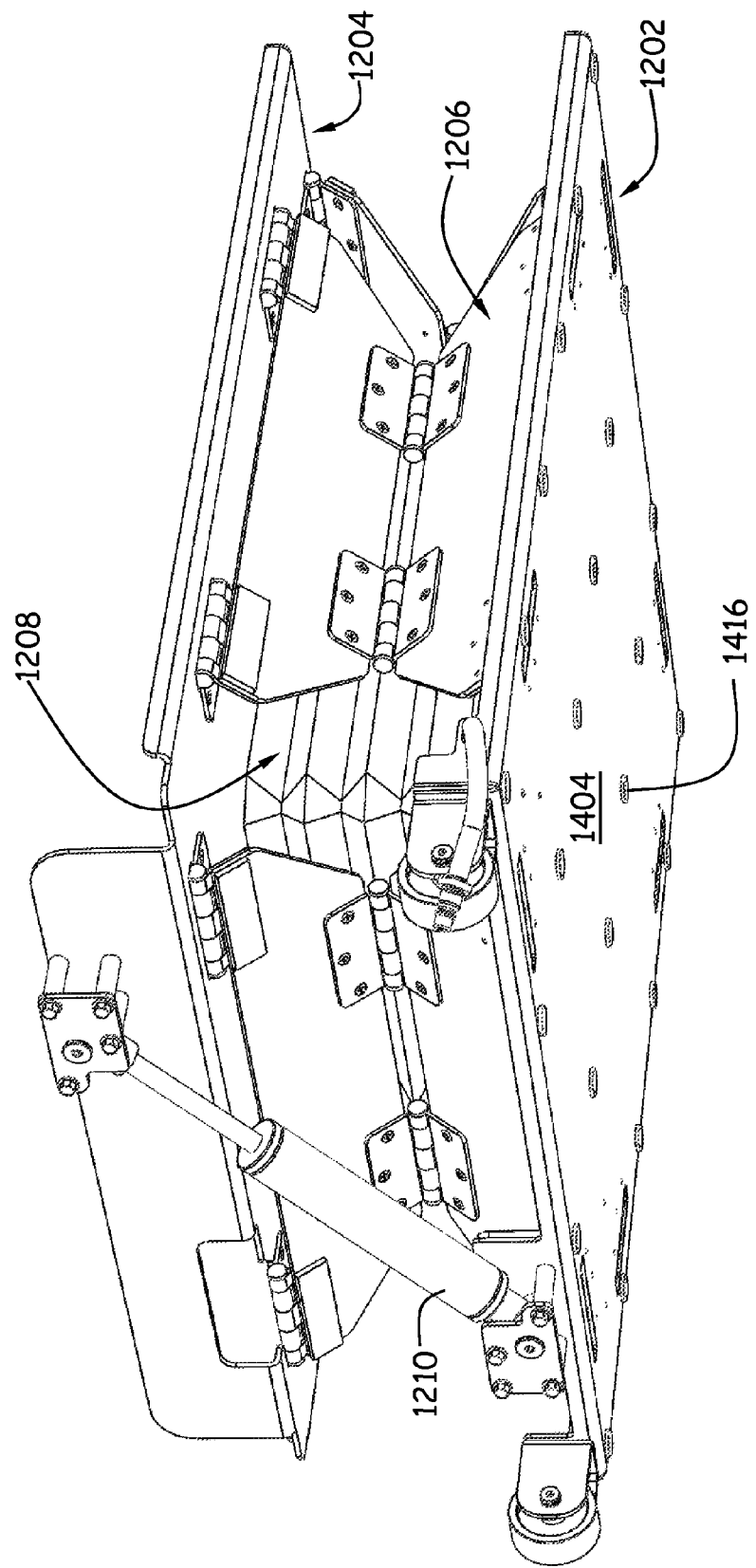

FIG. 12*c* illustrates a rear-and-bottom perspective view of lifter assembly 1108 in the second intermediate position.

Figure 13:
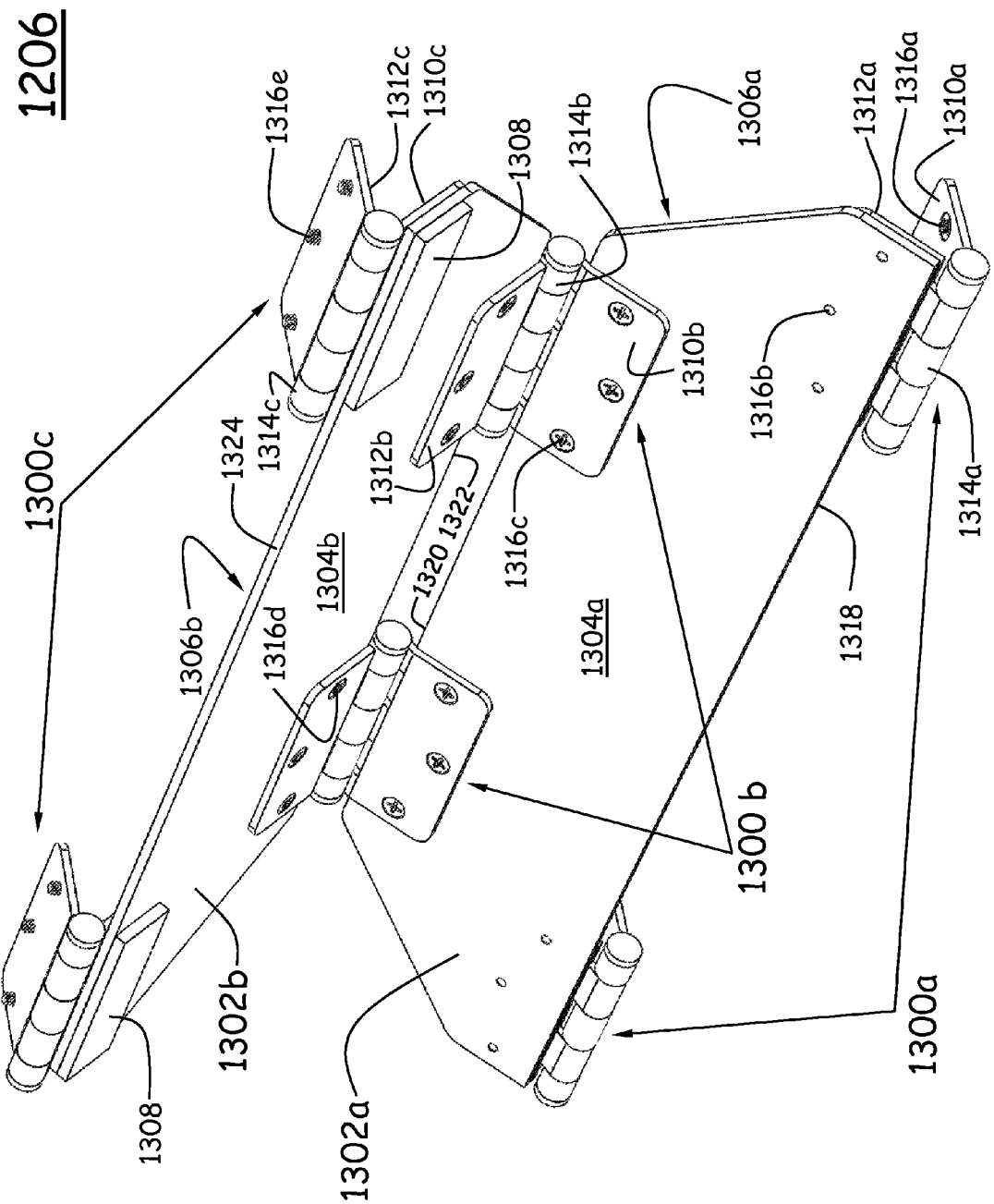

FIG. 13 illustrates linkage assembly 1206.

Figure 14A:
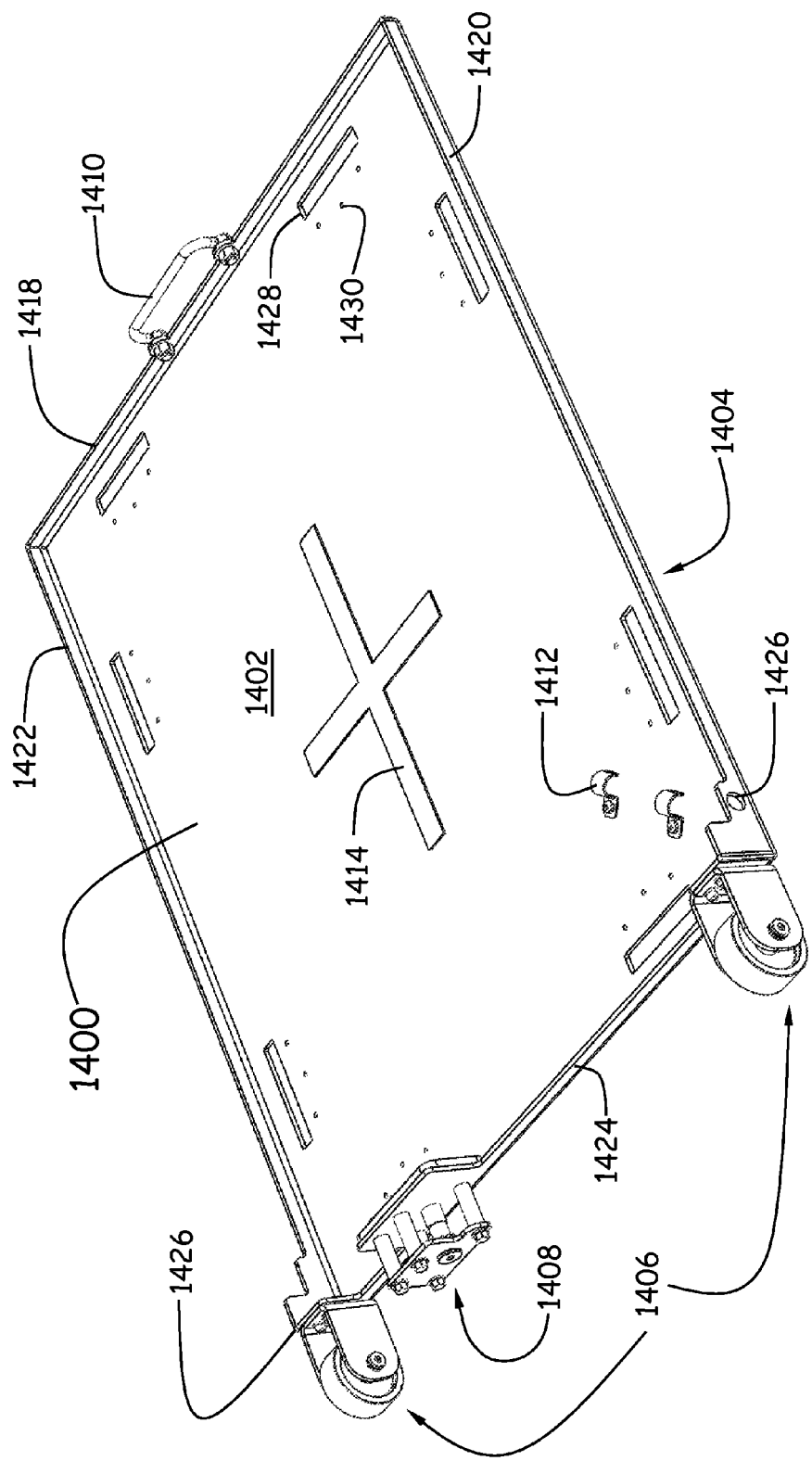

FIG. 14*a* illustrates a perspective view of base assembly 1202.

Figure 14B:
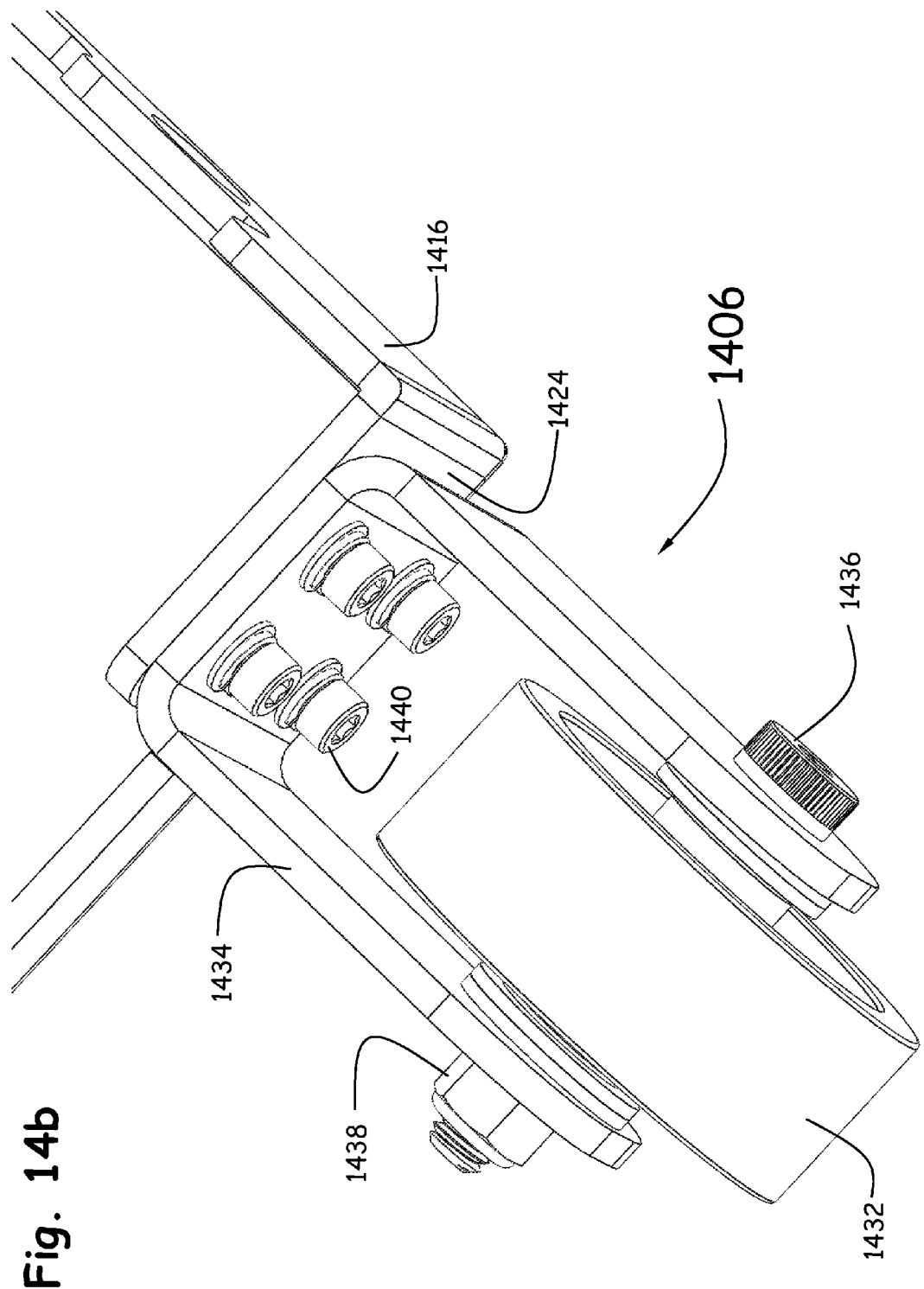

FIG. 14*b* illustrates a perspective view of wheel assembly 1406.

FIG. 14*c* illustrates a perspective view of clevis-pin assembly 1408.

FIG. 14*d* illustrates a perspective view of hydraulic damper 1210.

FIG. 15*a* illustrates a top perspective view of platform assembly 1204.

FIG. 15*b* illustrates a bottom perspective view of platform assembly 1204.

Figure 16A:
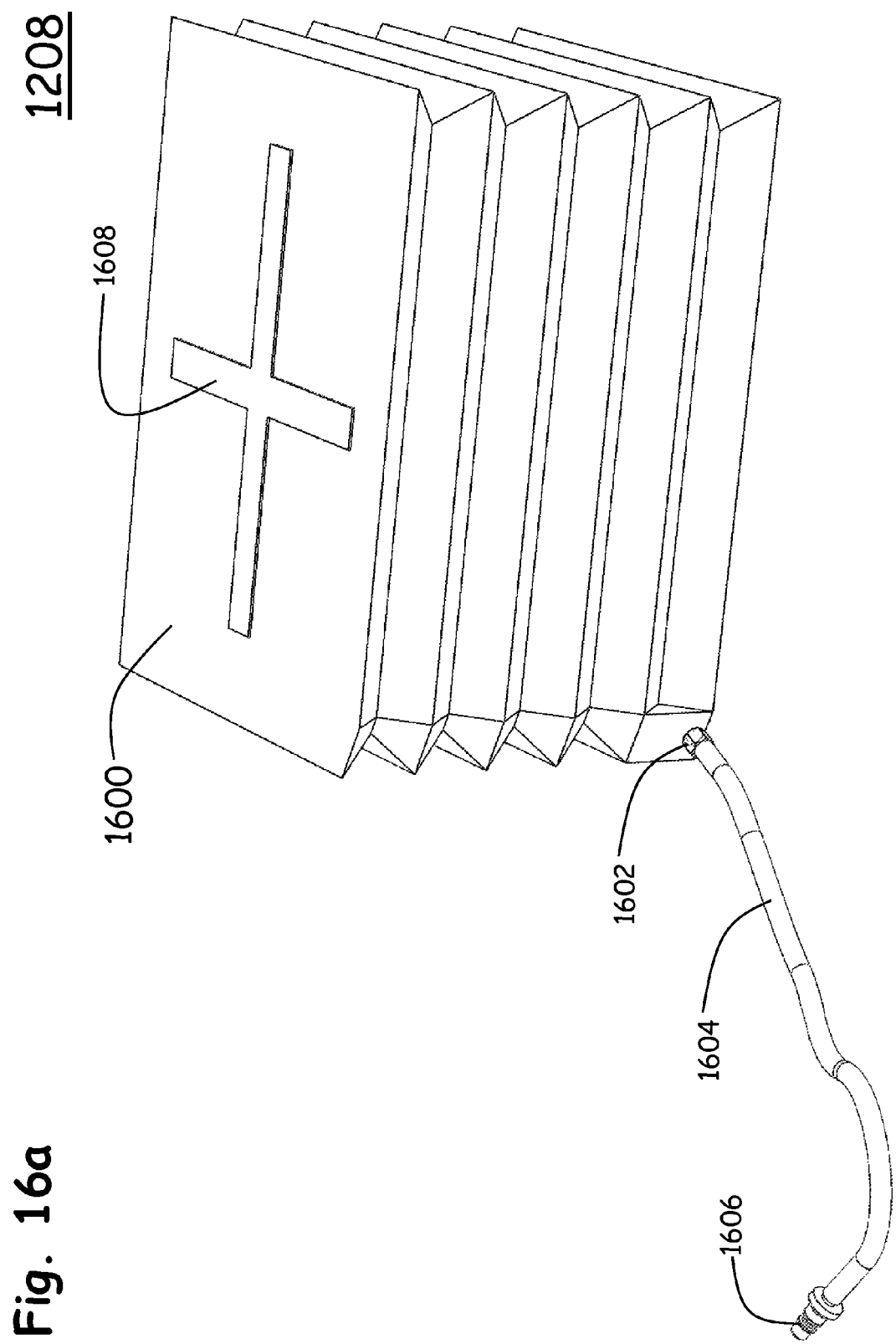

FIG. 16*a* illustrates a top perspective view of inflatable-bag assembly 1208 in its fully inflated state.

FIG. 16*b* illustrates a bottom perspective view of inflatable-bag assembly 1208 in its fully inflated state.

FIG. 16*b* illustrates a top perspective view of inflatable-bag assembly 1208 in its fully deflated state.

Figure 17A:
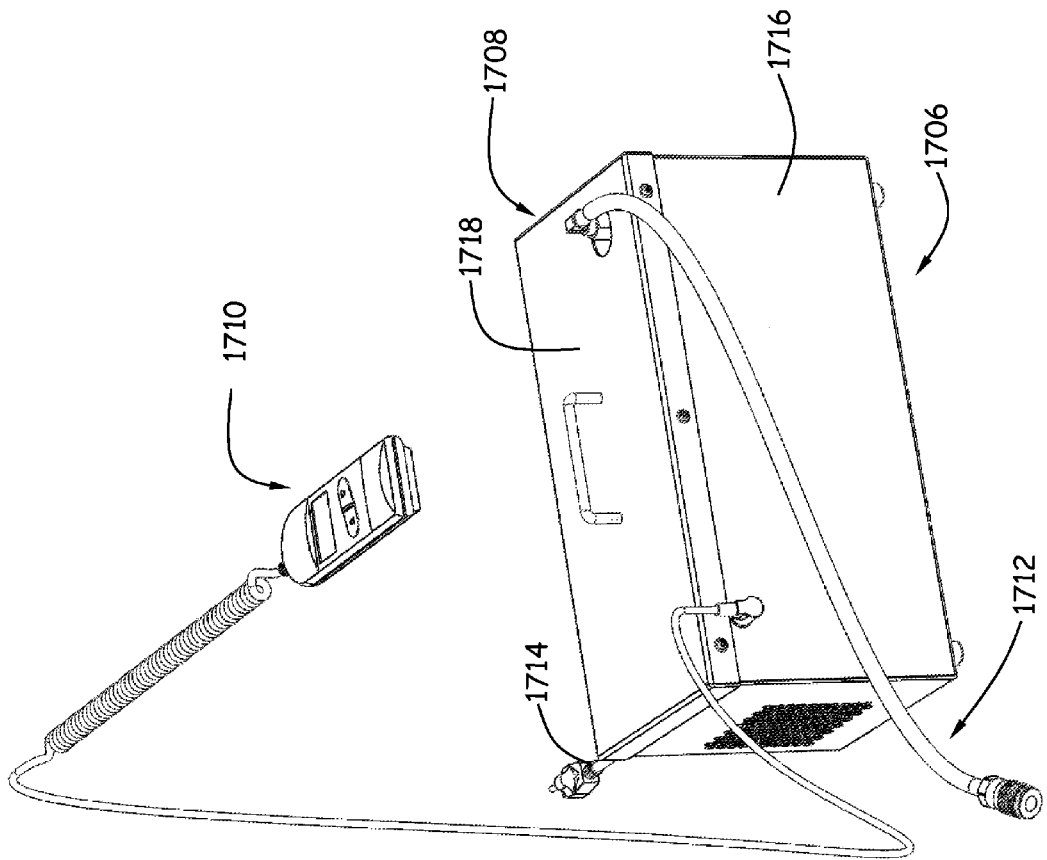

FIG. 17*a* illustrates a perspective view of fluid-delivery assembly 1110.

Figure 17B:
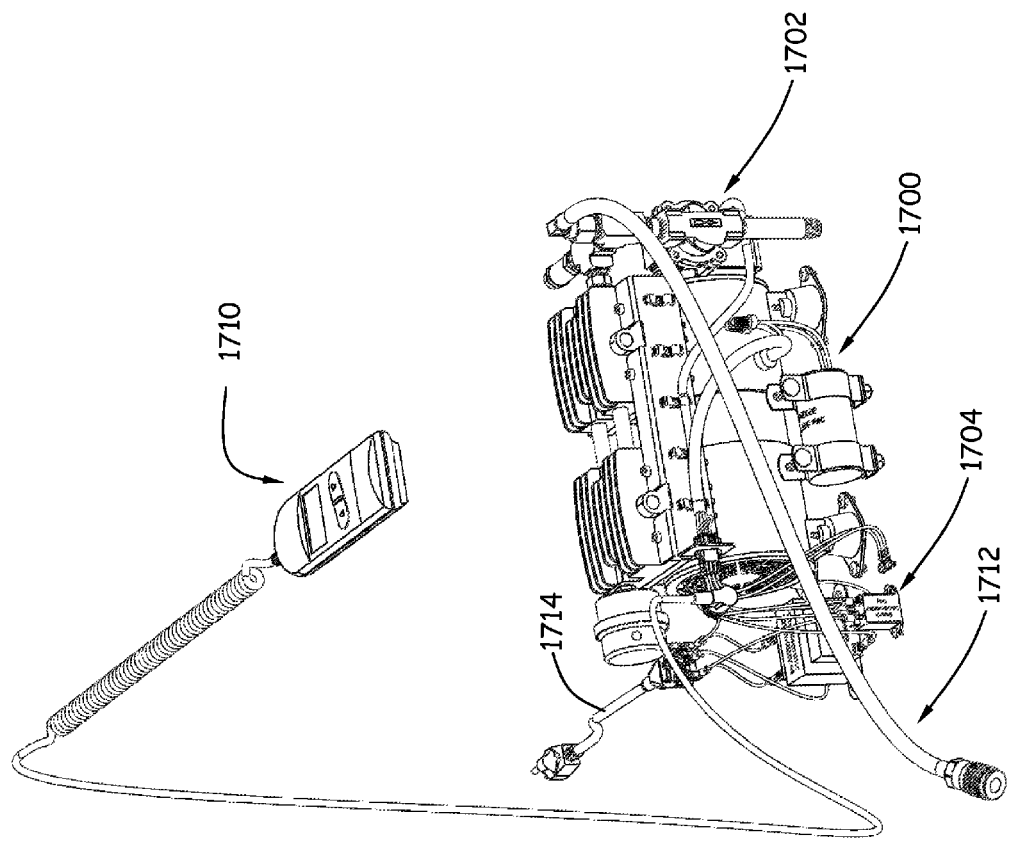

FIG. 17*b* illustrates a perspective view of fluid-delivery assembly 1110 with box assembly 1706 and lid assembly 1708 hidden.

Figure 17C:
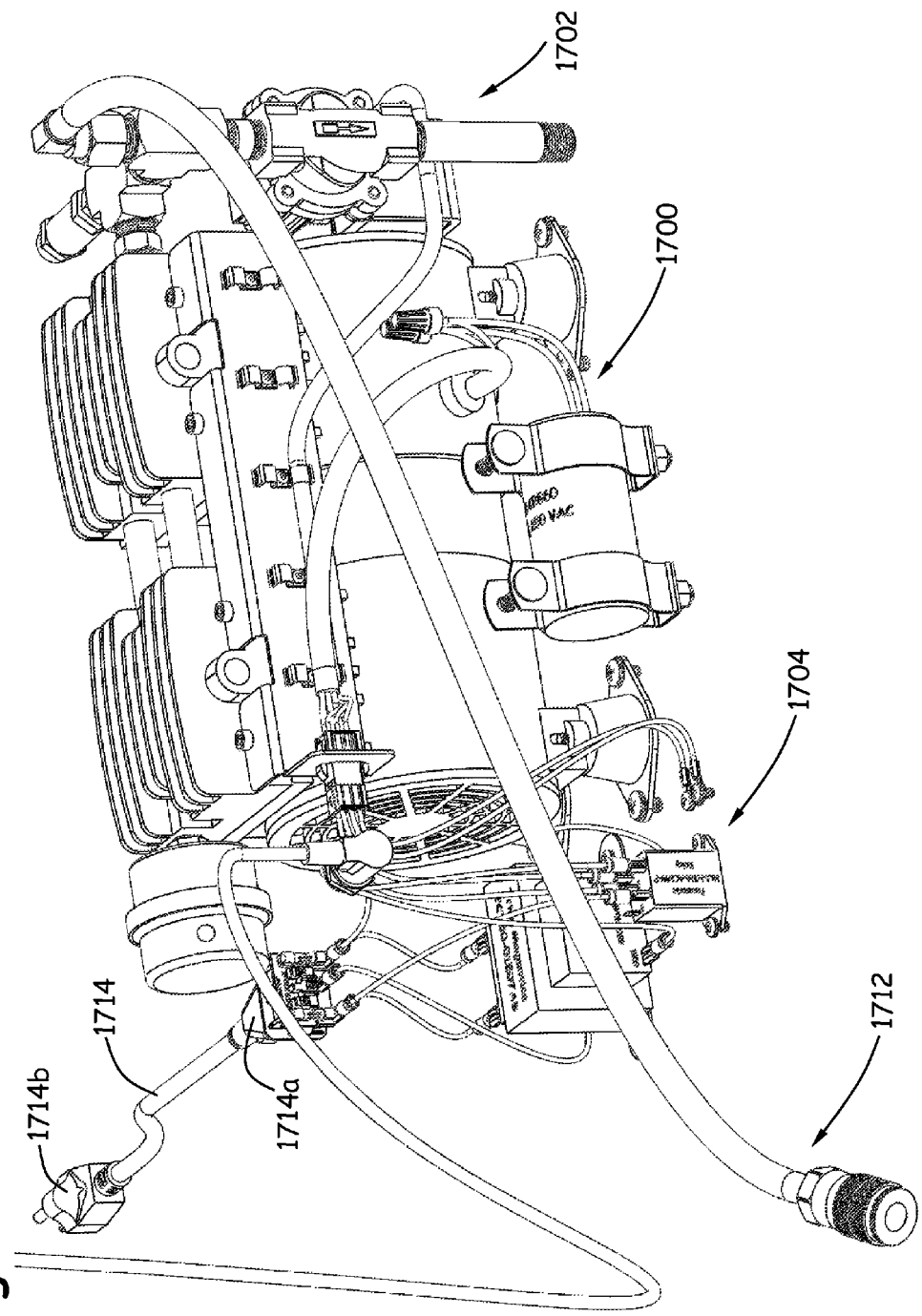

FIG. 17c illustrates a close-up perspective view of fluid-delivery assembly 1110 with box assembly 1706 and lid assembly 1708 hidden.

FIG. 18a illustrates a first perspective view of compressor assembly 1700.

Figure 18B:
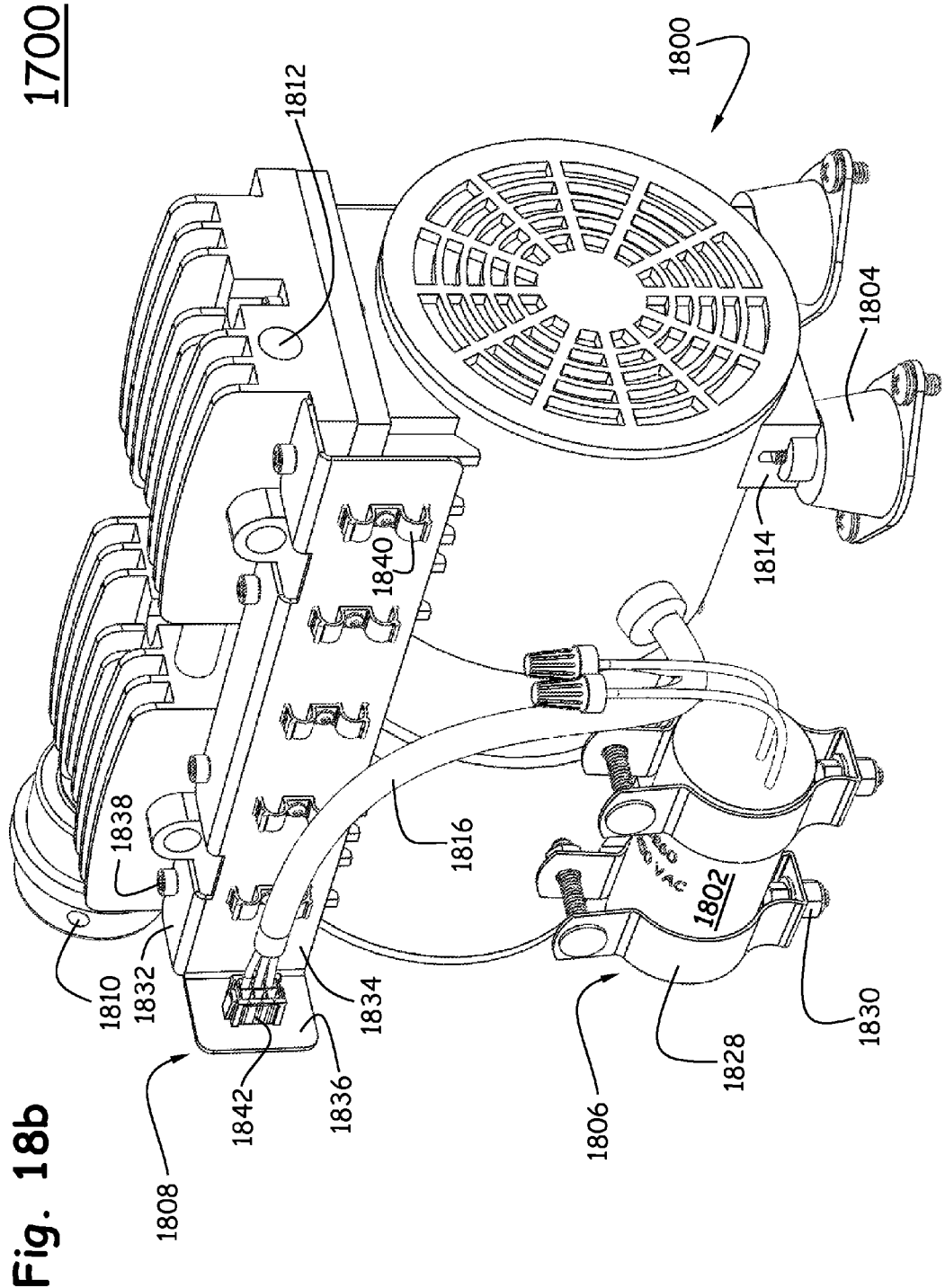

FIG. 18b illustrates a second perspective view of compressor assembly 1700.

Figure 19A:
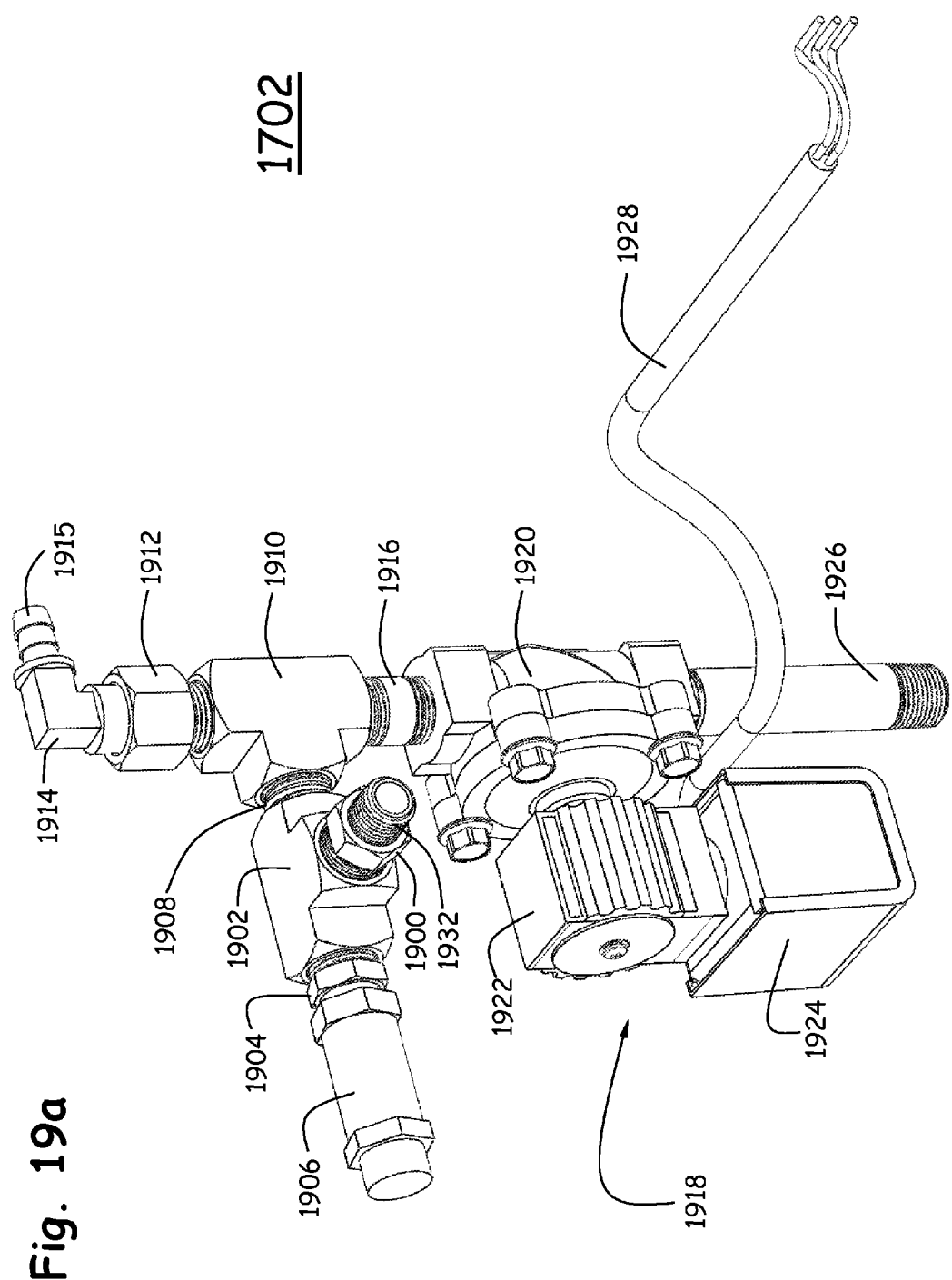

FIG. 19a illustrates a first perspective view of plumbing assembly 1702.

Figure 19B:
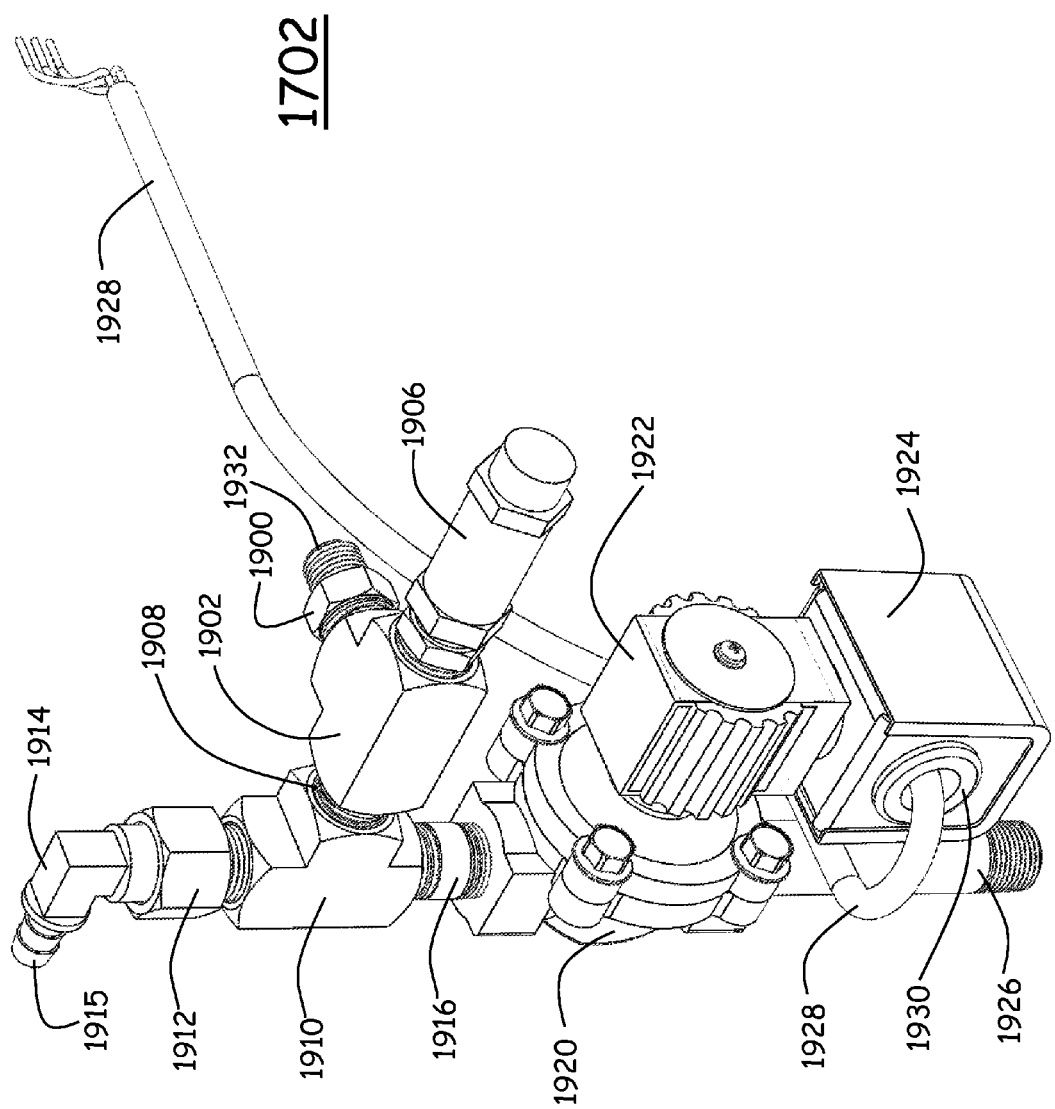

FIG. 19b illustrates a second perspective view of plumbing assembly 1702.

Figure 20A:
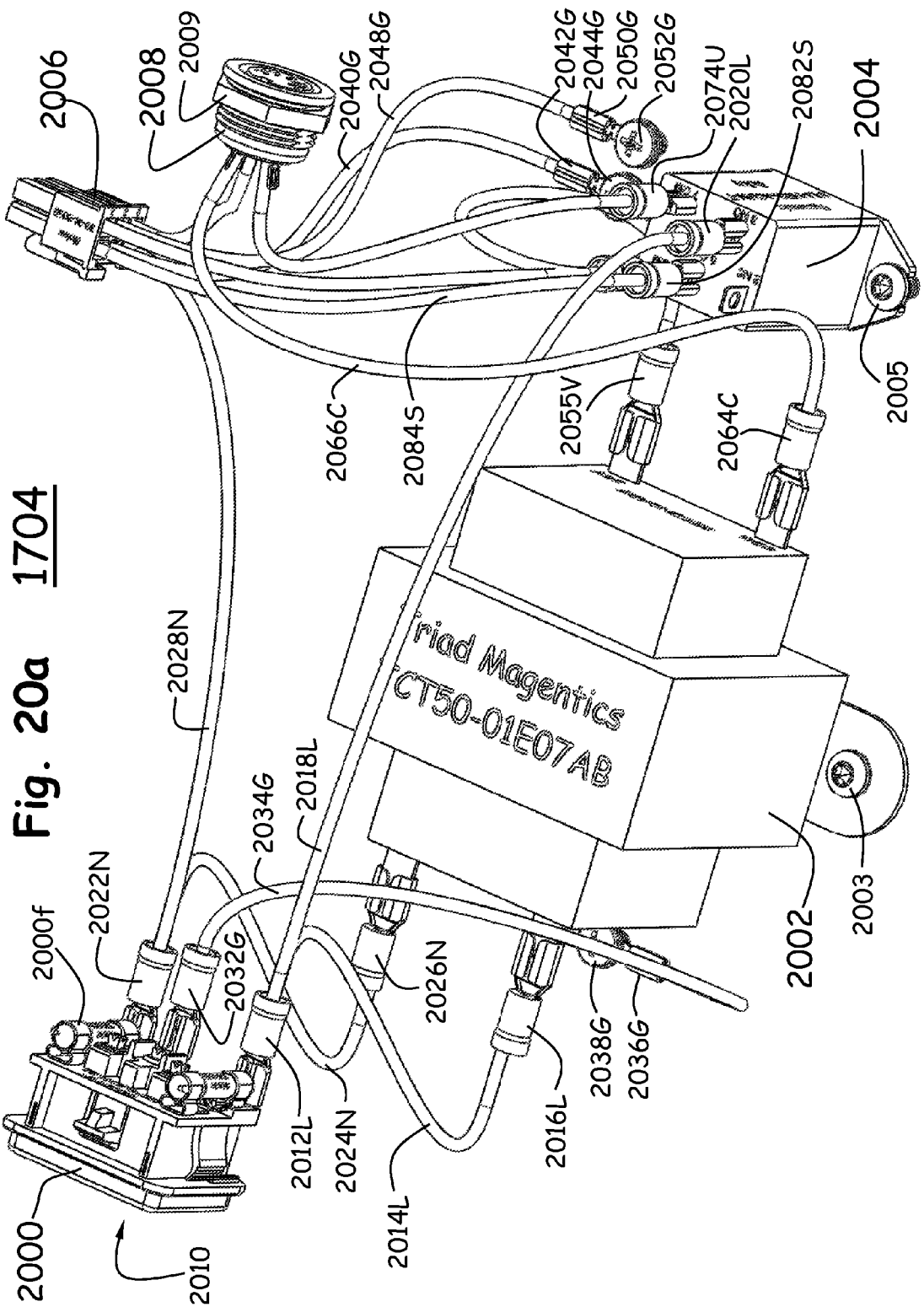

FIG. 20a illustrates a perspective view of electrical assembly 1704.

Figure 20B:
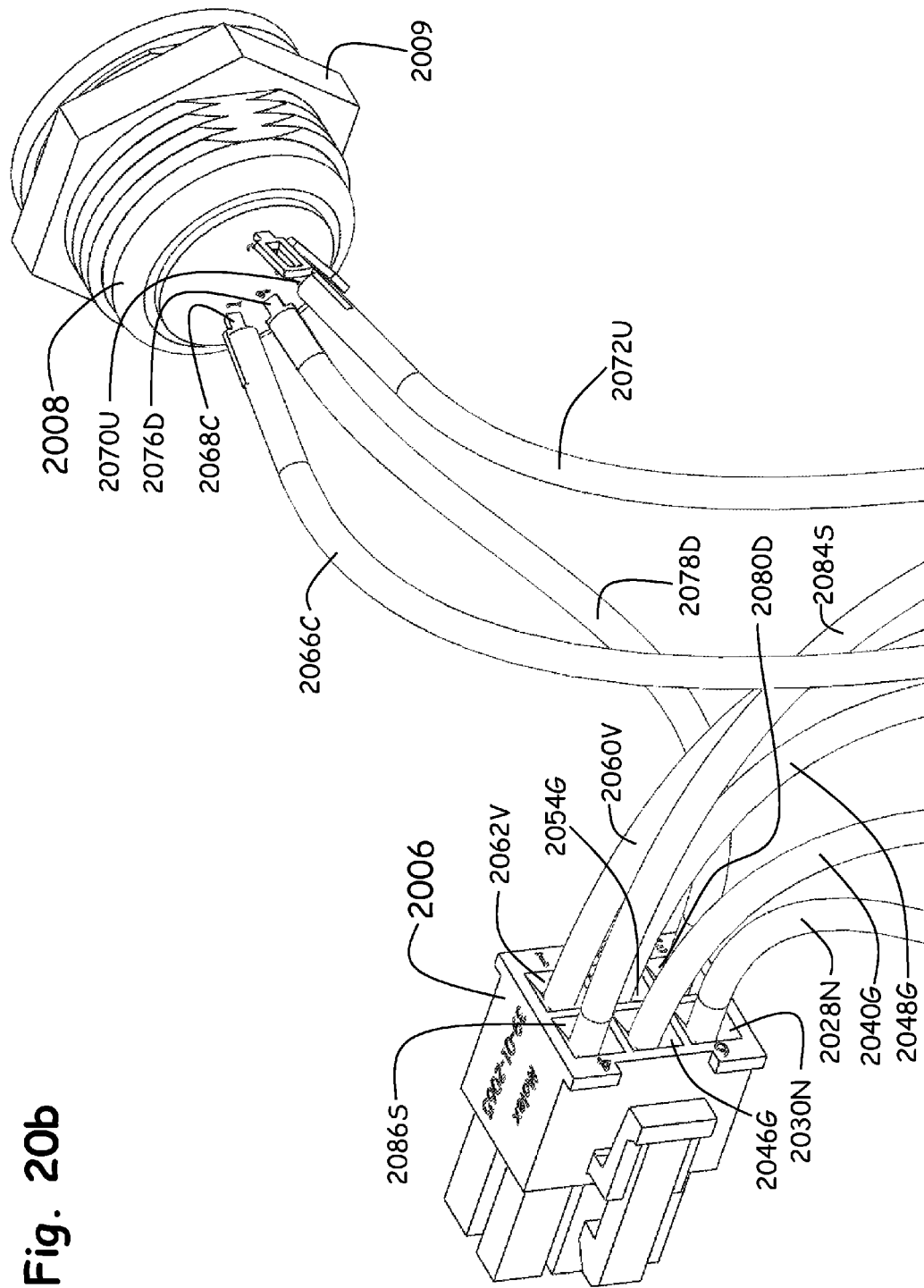

FIG. 20b illustrates a first partial perspective view of electrical assembly 1704.

Figure 20C:
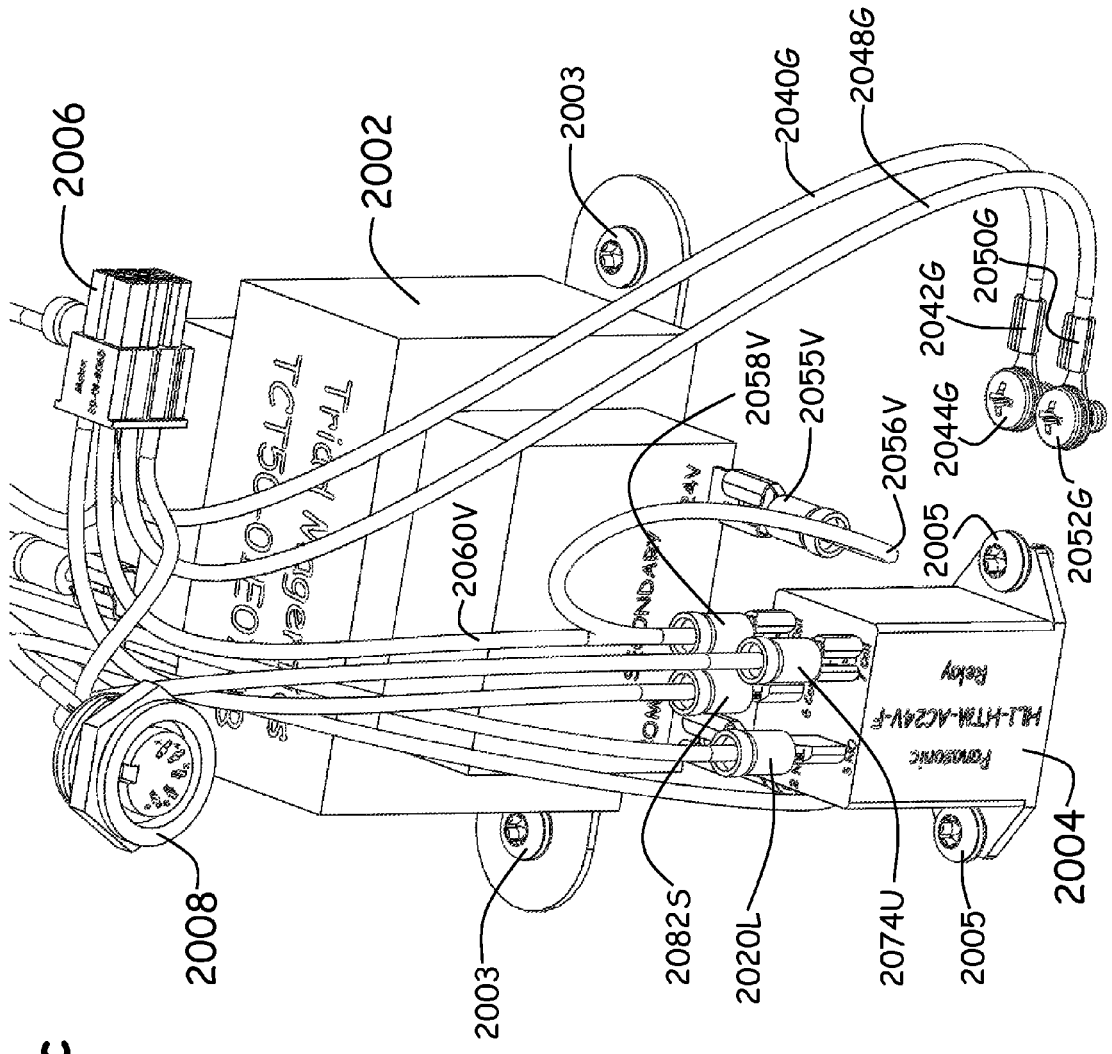

FIG. 20c illustrates a second partial perspective view of electrical assembly 1704.

Figure 21A:
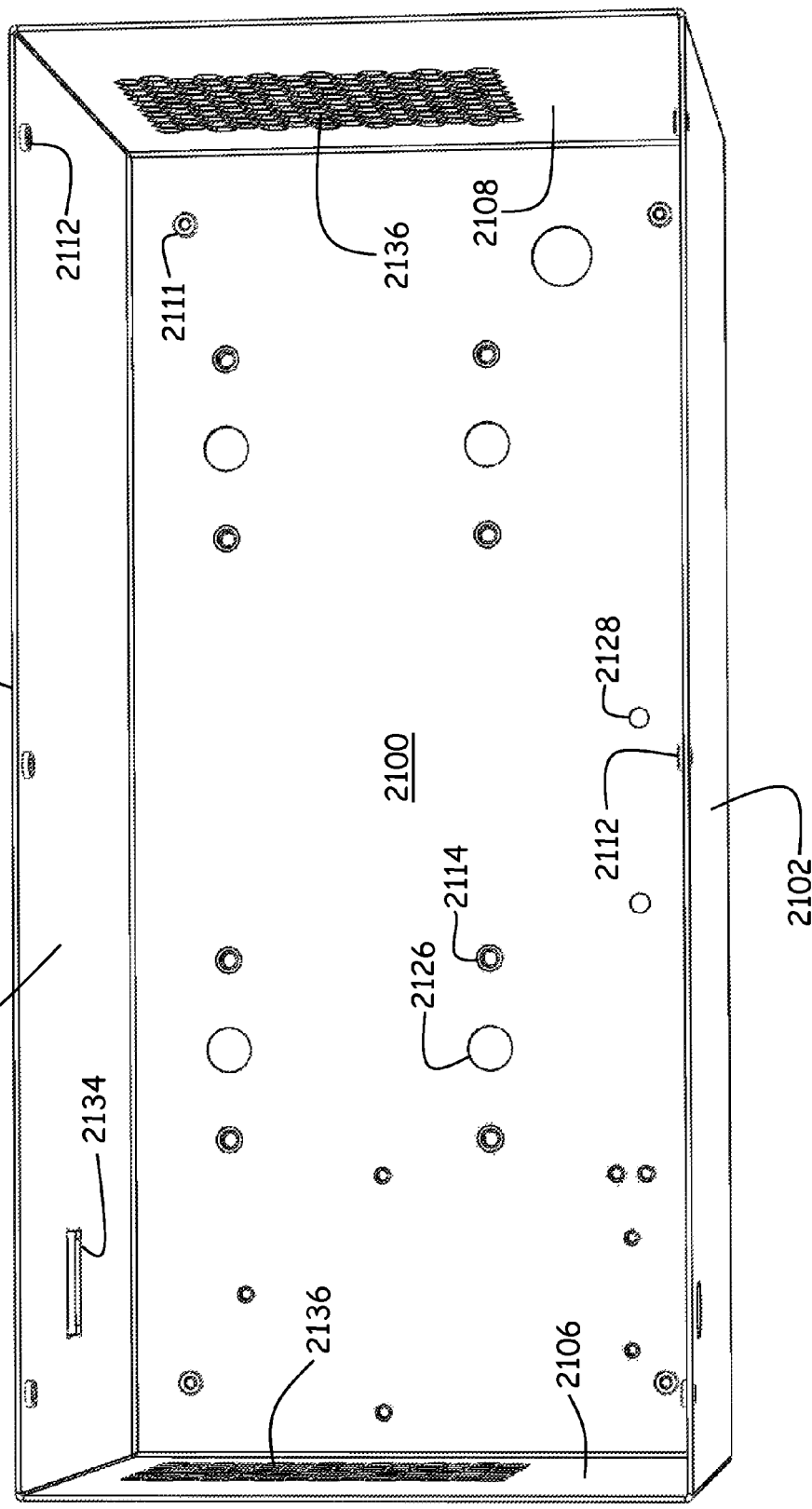

FIG. 21a illustrates a first perspective view of box assembly 1706.

Figure 21B:
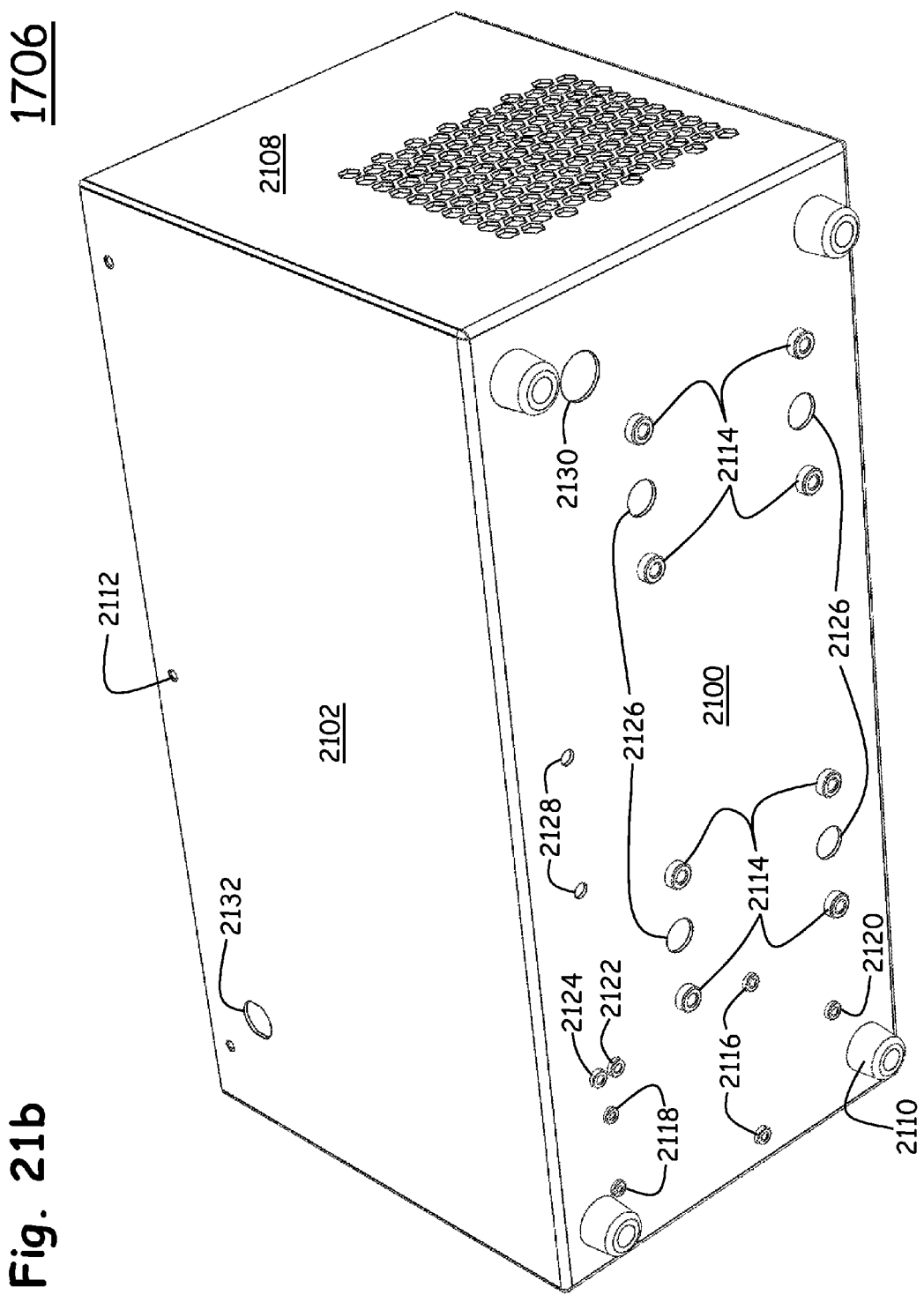

FIG. 21b illustrates a second perspective view of box assembly 1706.

FIG. 22a illustrates a first perspective view of lid assembly 1708.

FIG. 22b illustrates a partial perspective view of lid assembly 1708.

FIG. 23a illustrates a perspective view of manually operated controller 1710.

FIG. 23b illustrates a first partial perspective view of manually operated controller 1710.

FIG. 23c illustrates a second partial perspective view of manually operated controller 1710.

FIG. 24a illustrates a perspective view of compressor-side hose assembly 1712.

FIG. 24b illustrates a perspective view of female quick-connect 2402.

Figure 25:
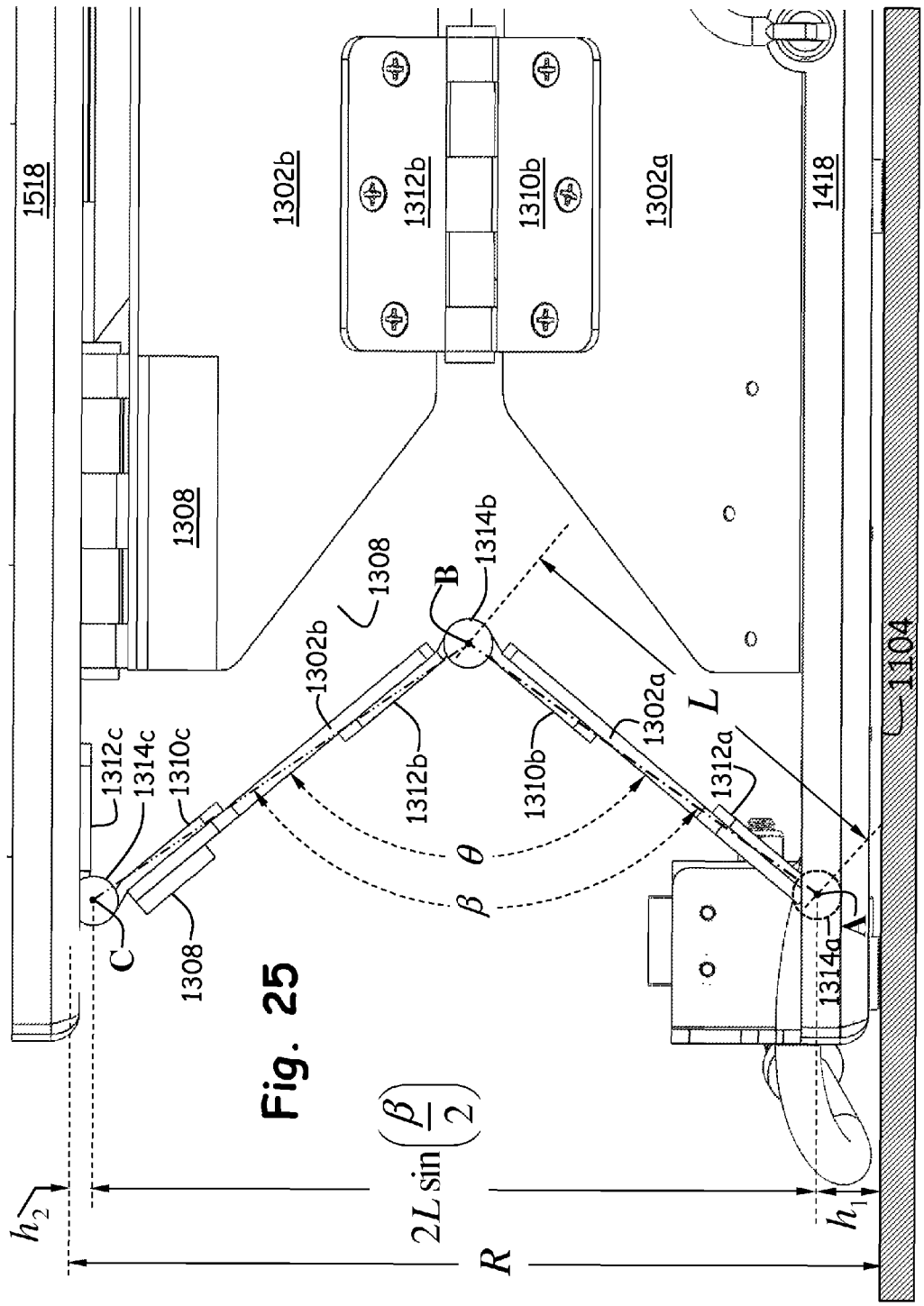

FIG. 25 illustrates a partial front view of lifter assembly 1108, used for mathematical analysis.

Figure 26A:
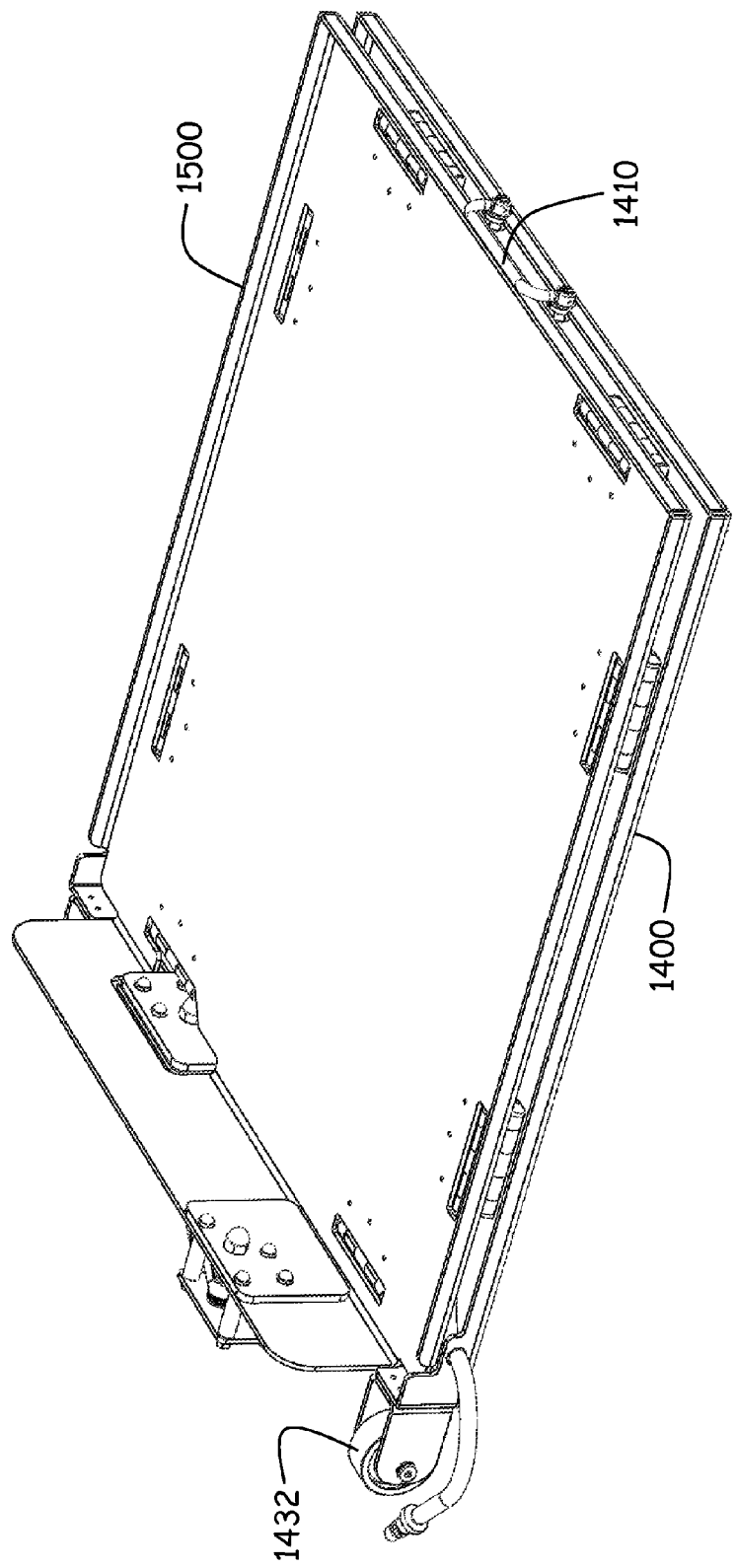

FIG. 26a illustrates a front perspective view of lifter assembly 1108 for the low position, described mathematically as $\theta=-0.75°$.

Figure 26B:
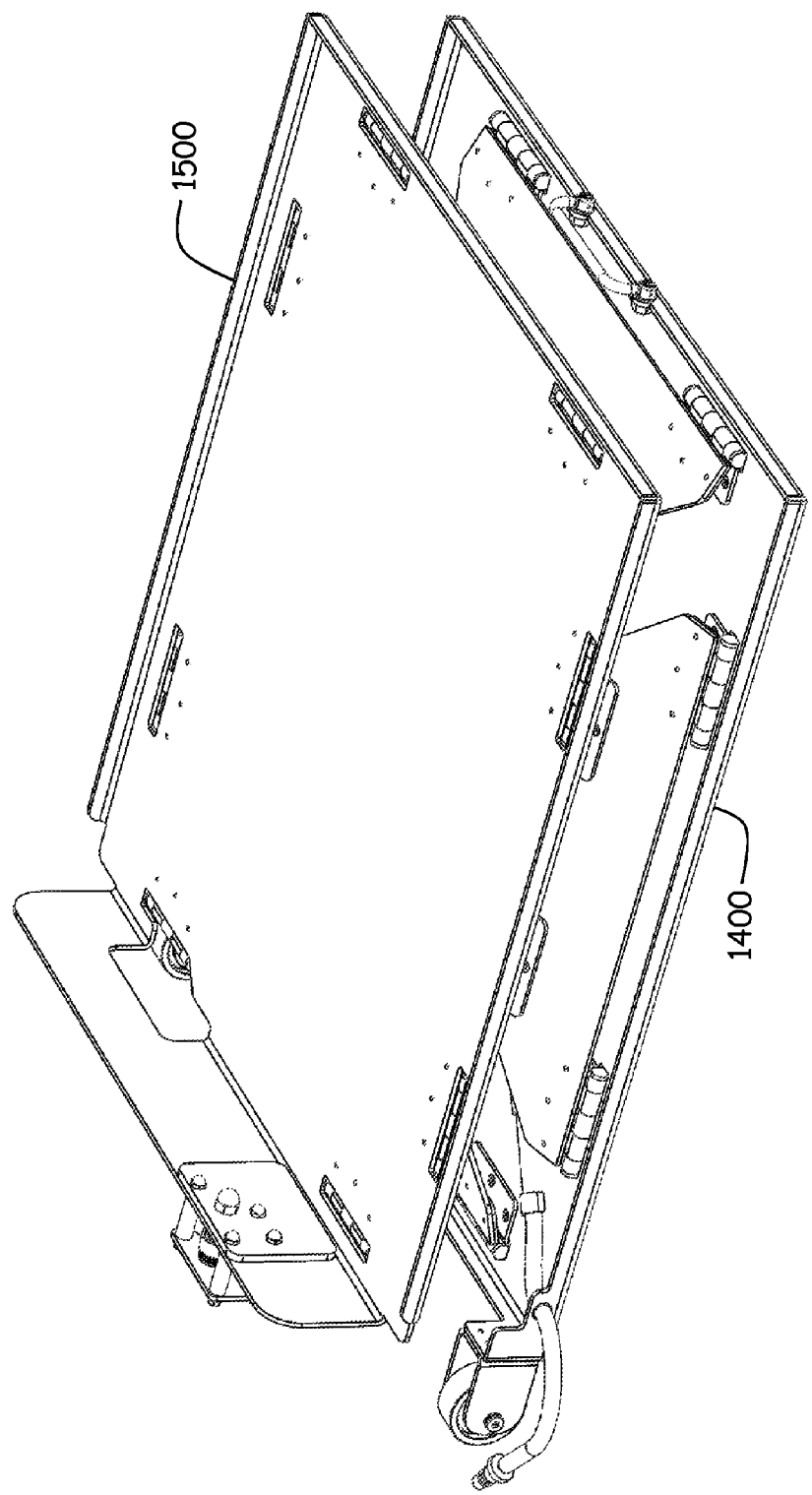

FIG. 26b illustrates a front perspective view of lifter assembly 1108 for the first intermediate position, described mathematically as $\theta=20°$.

FIG. 26c illustrates a front perspective view of lifter assembly 1108 for the second intermediate position, described mathematically as $\theta=50°$.

Figure 26D:
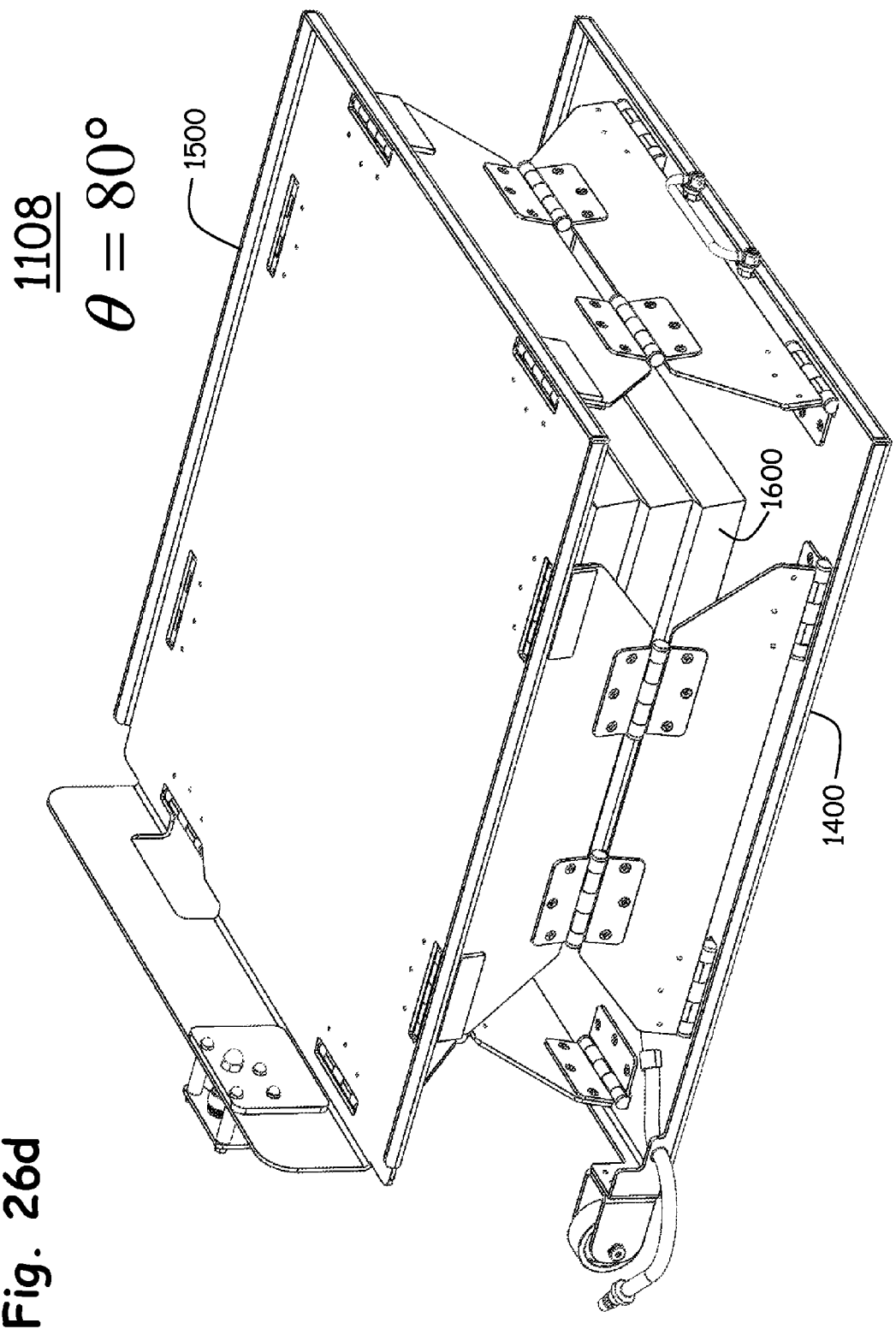

FIG. 26d illustrates a front perspective view of lifter assembly 1108 for the high position, described mathematically as $\theta=80°$.

FIG. 27a illustrates a rear perspective view of lifter assembly 1108 for $\theta=-0.75°$.

Figure 27B:
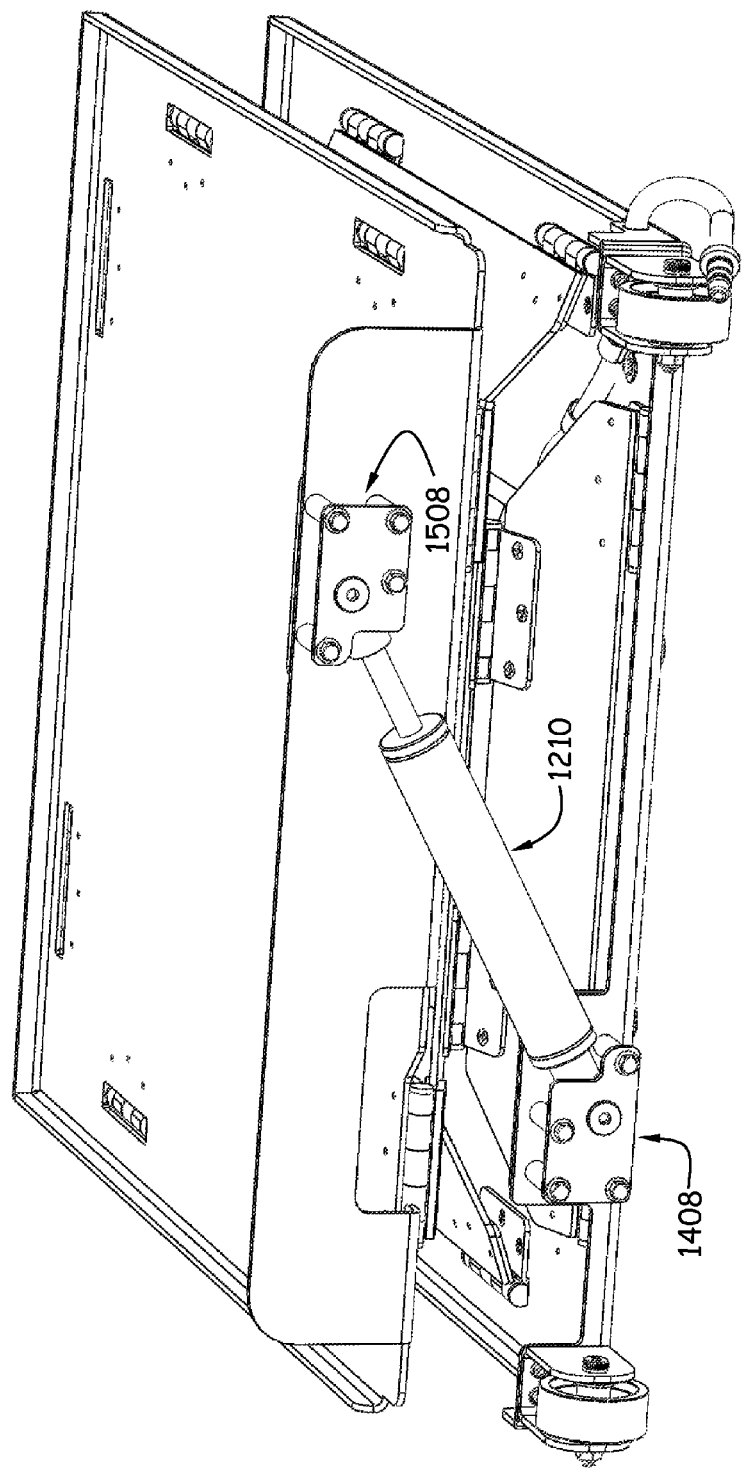

FIG. 27b illustrates a rear perspective view of lifter assembly 1108 for $\theta=20°$.

Figure 27C:
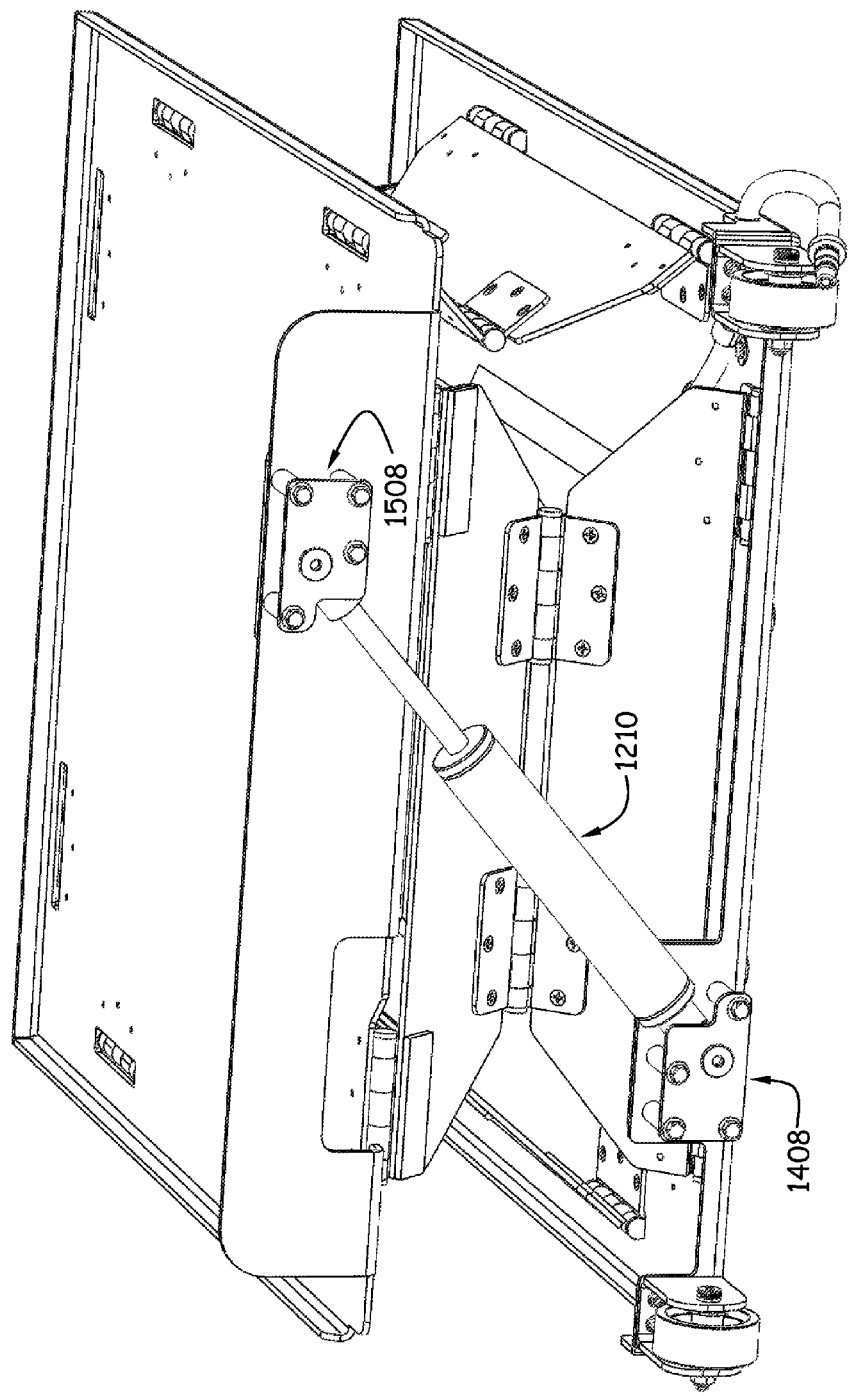

FIG. 27c illustrates a rear perspective view of lifter assembly 1108 for $\theta=50°$.

Figure 27D:
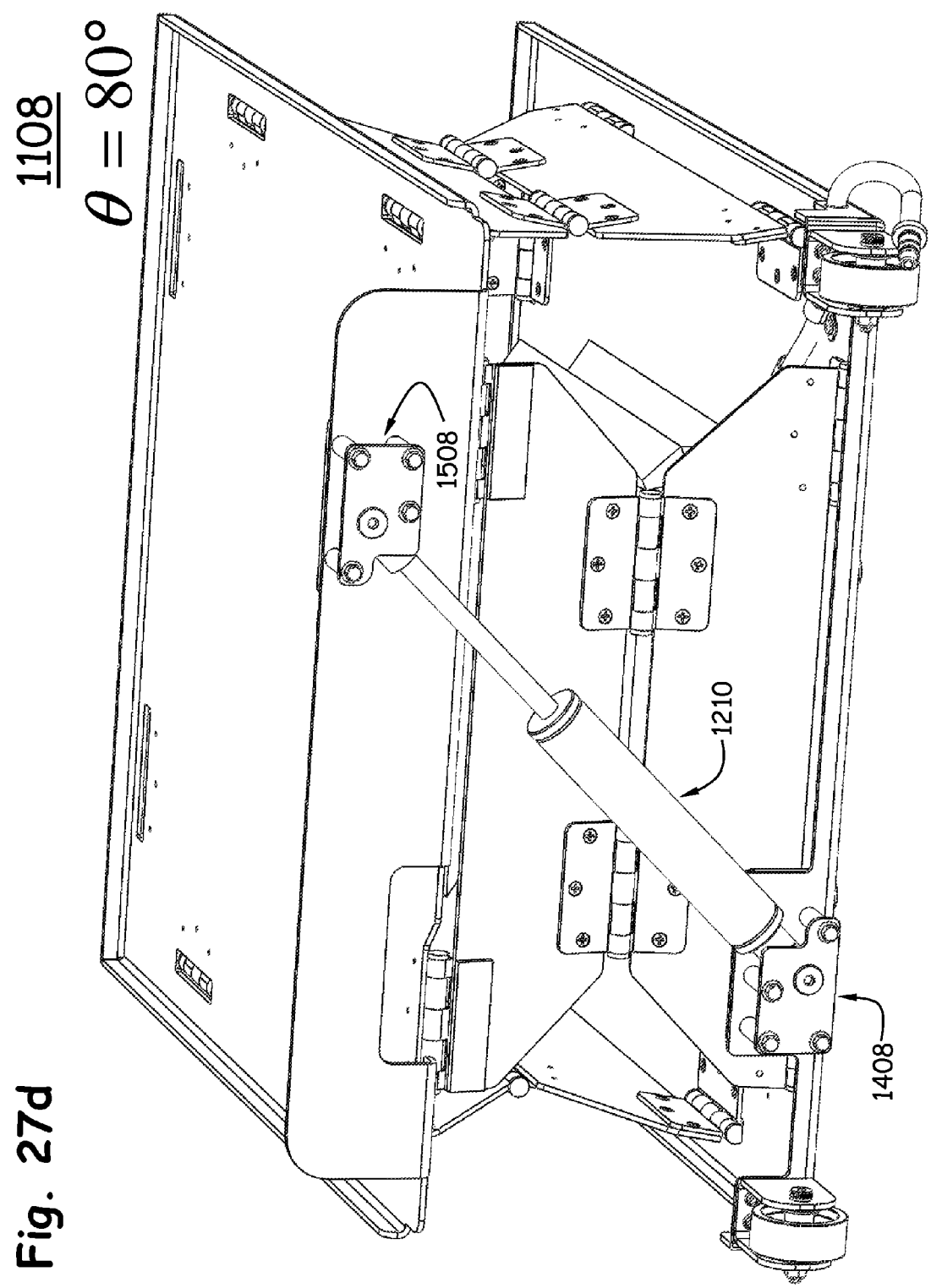

FIG. 27d illustrates a rear perspective view of lifter assembly 1108 for $\theta=80°$.

Figure 28:
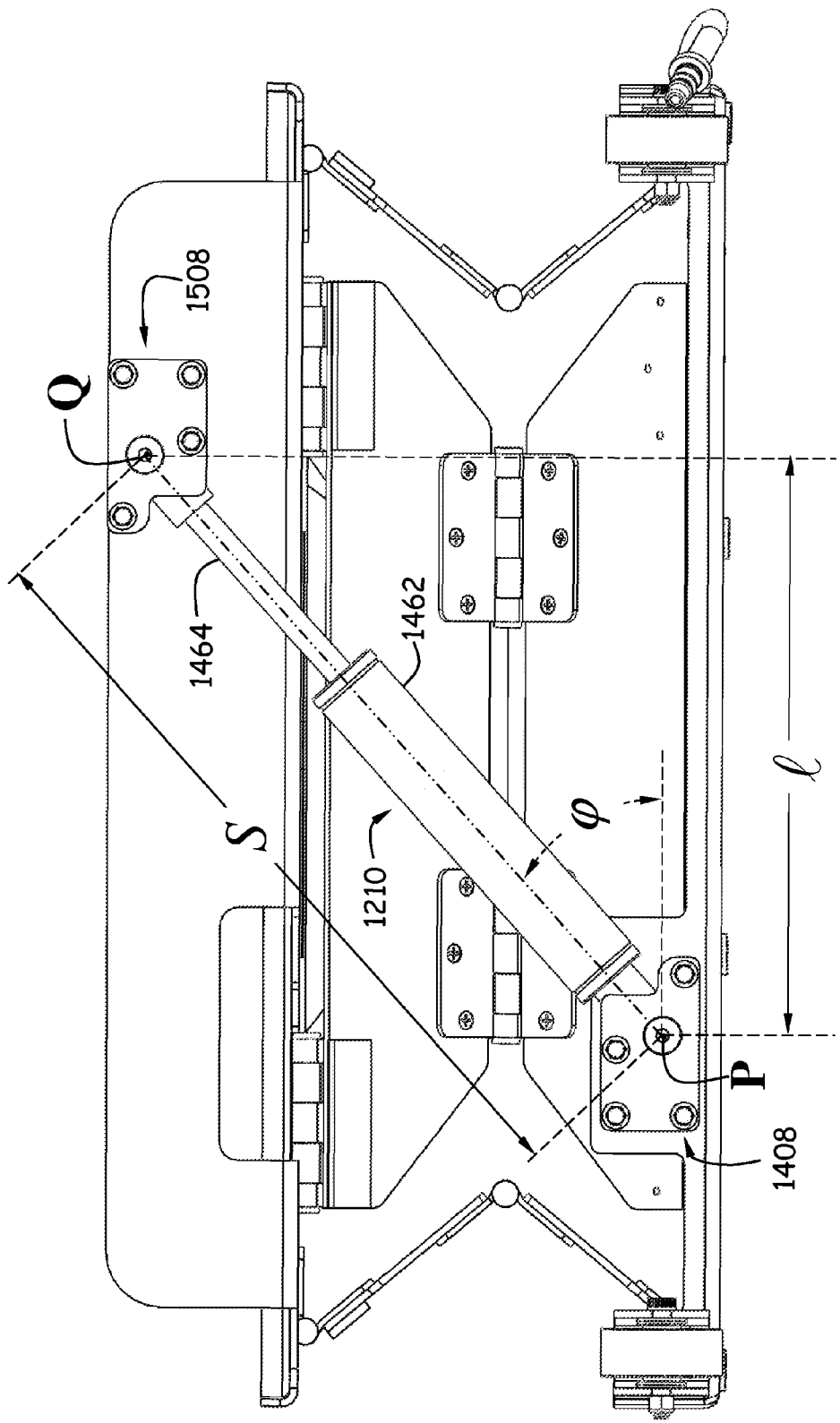

FIG. 28 illustrates a rear view of lifter assembly 1108, used for mathematical analysis.

Figure 29A:
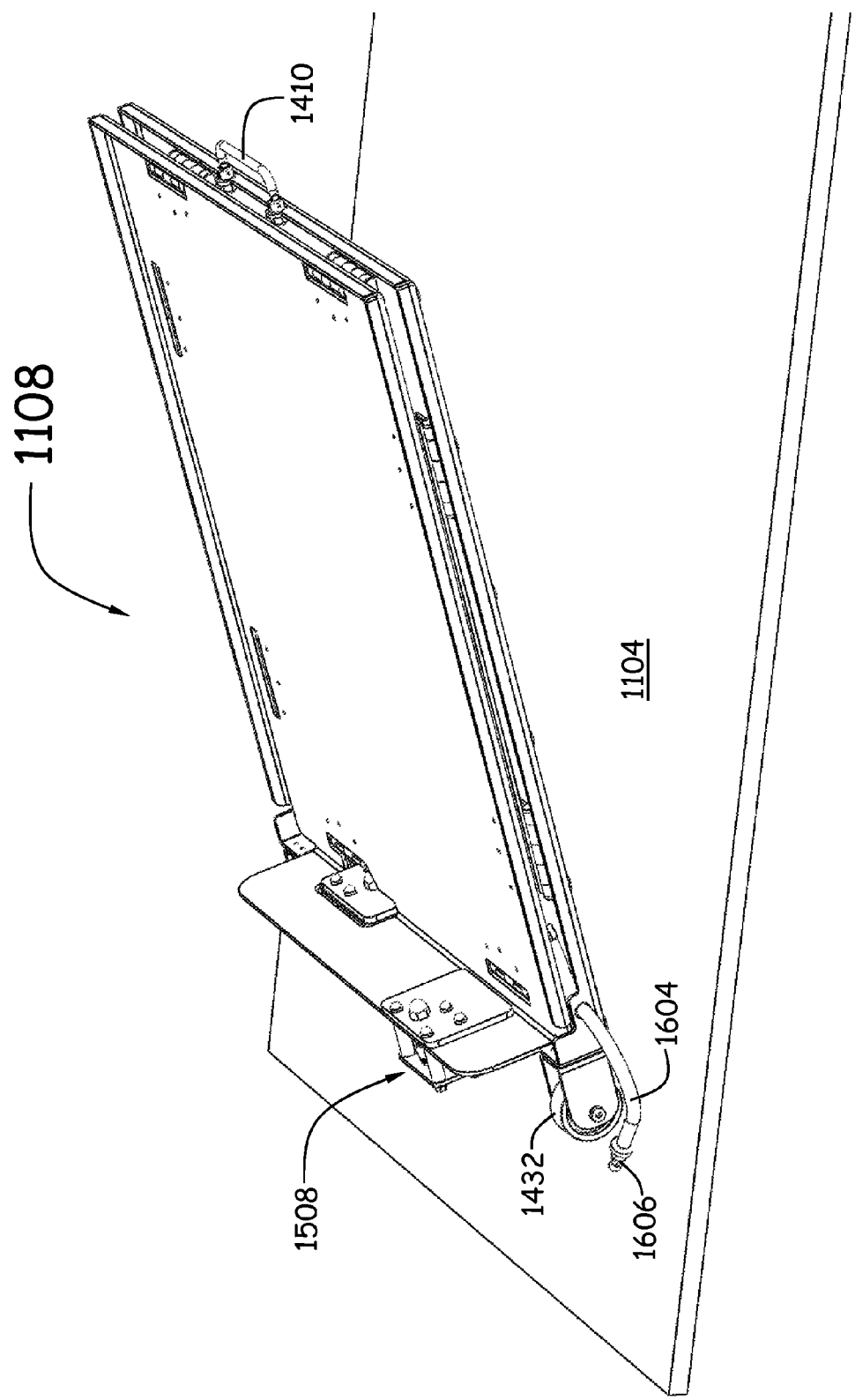

FIG. 29a illustrates how lifter assembly 1108 is transported.

Figure 29B:
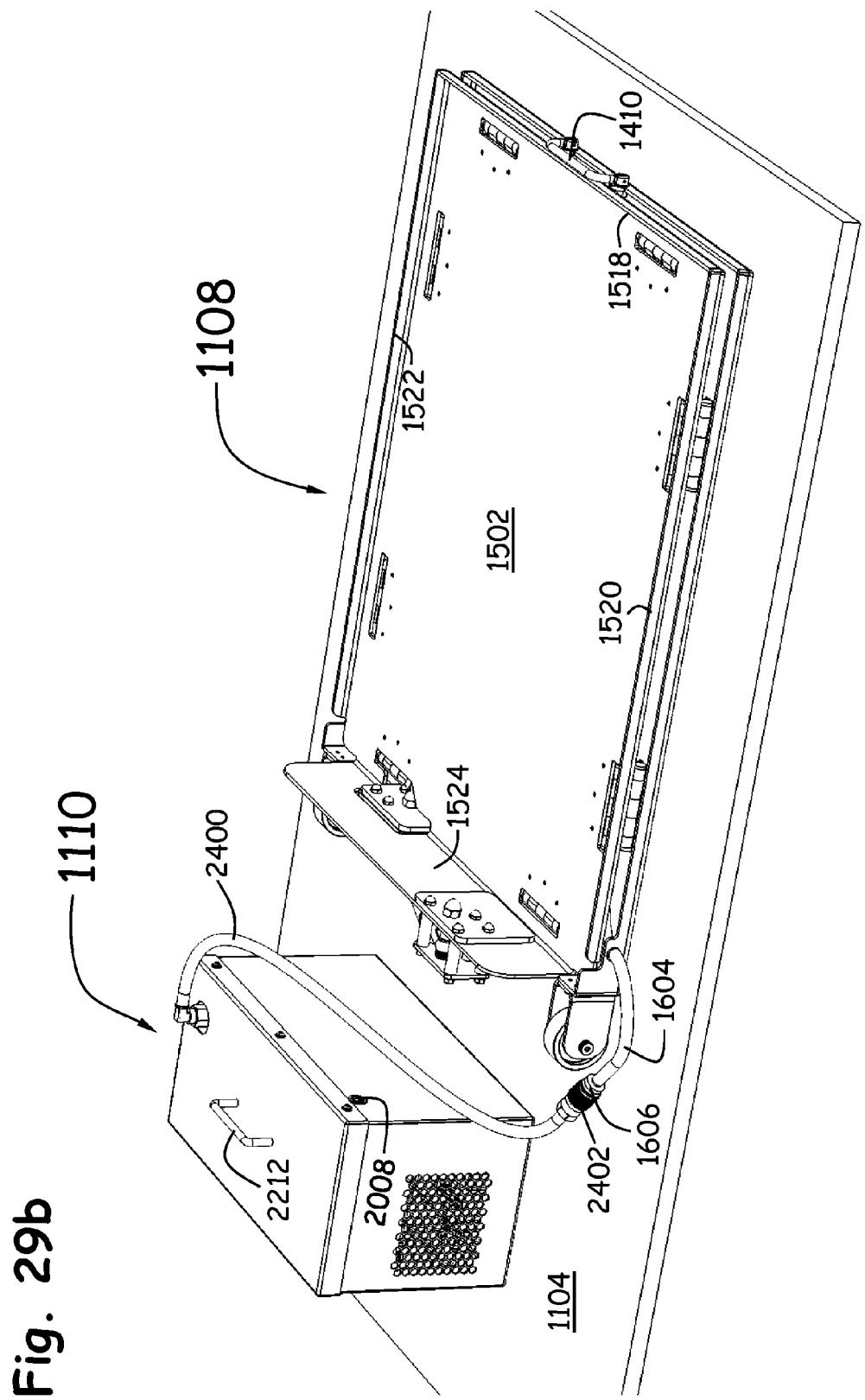

FIG. 29b illustrates how lifter assembly 1108 and hydraulic assembly 1110 are deployed.

Figure 29C:
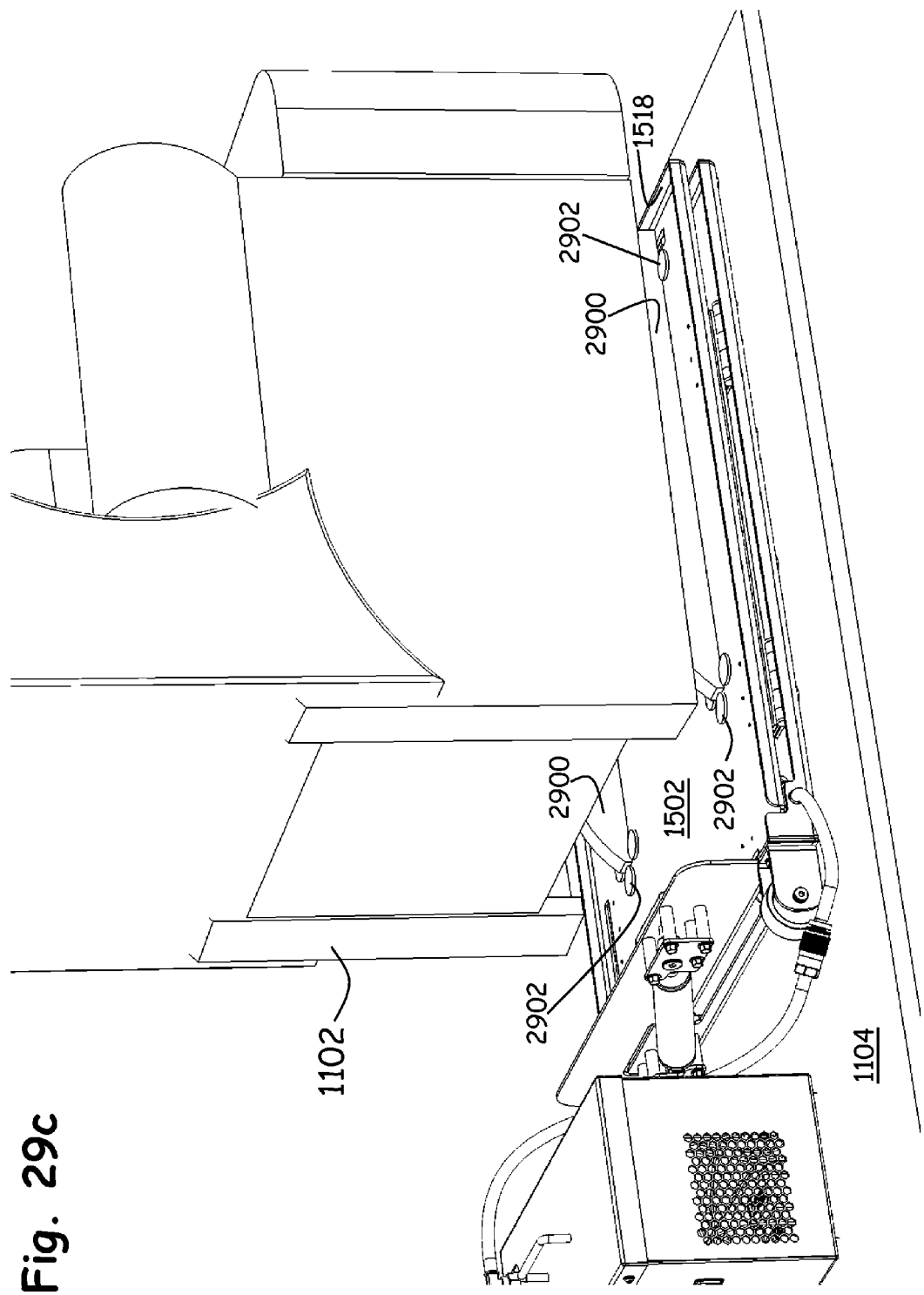

FIG. 29c illustrates how chair 1102 is positioned on platform 1500, and prevented from sliding.

Figure 30A:
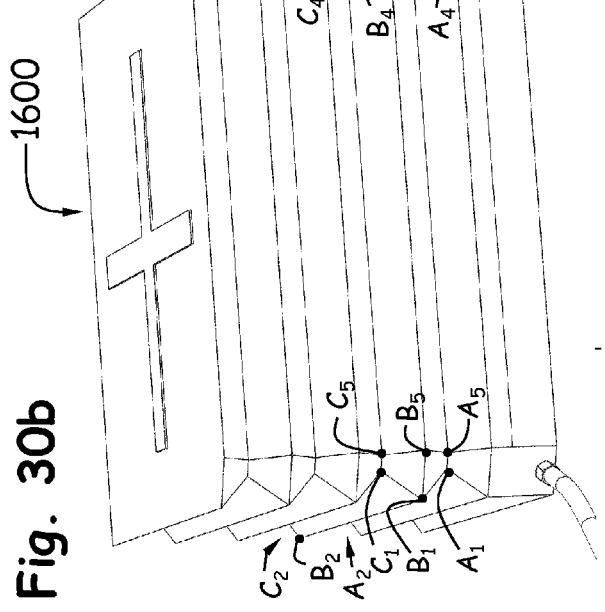

FIG. 30a illustrates a first view of inflatable bag 1600, with annotations for mathematical analysis.

Figure 30B:
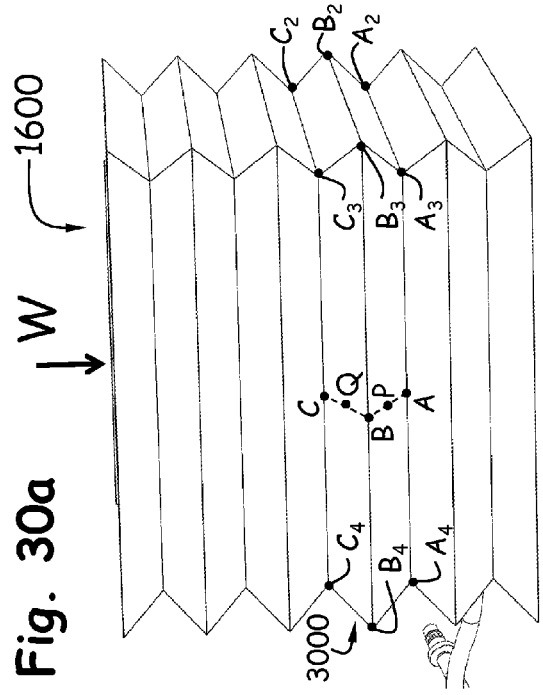

FIG. 30b illustrates a second view of inflatable bag 1600, with annotations for mathematical analysis.

Figure 30D:
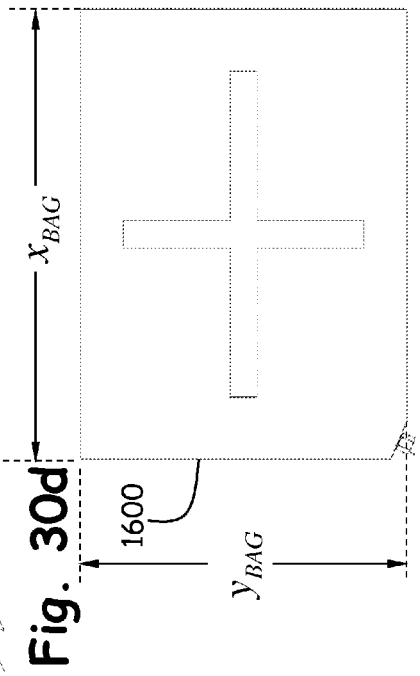
Figure 30C:
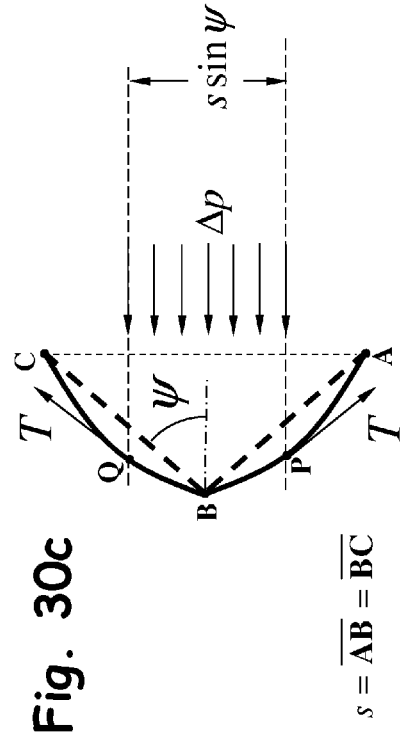

FIG. 30c illustrates a view of a portion of inflatable bag 1600, with annotations for mathematical analysis.

FIG. 30d illustrates a top view of inflatable bag 1600, with dimensions.

Figure 31A:
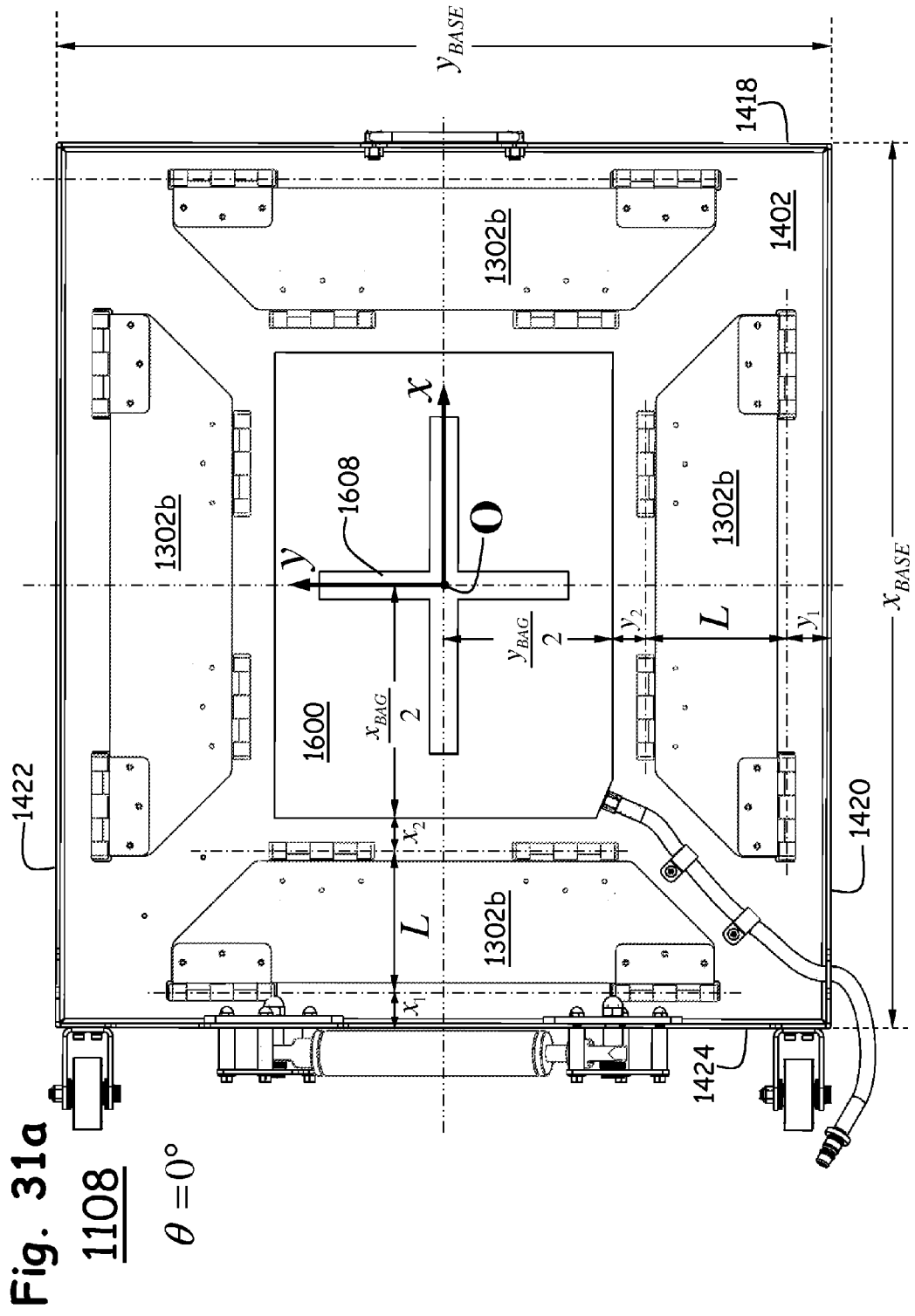

FIG. 31a illustrates a top view of lifter assembly 1108 for $\theta=-0.75°$.

Figure 31B:
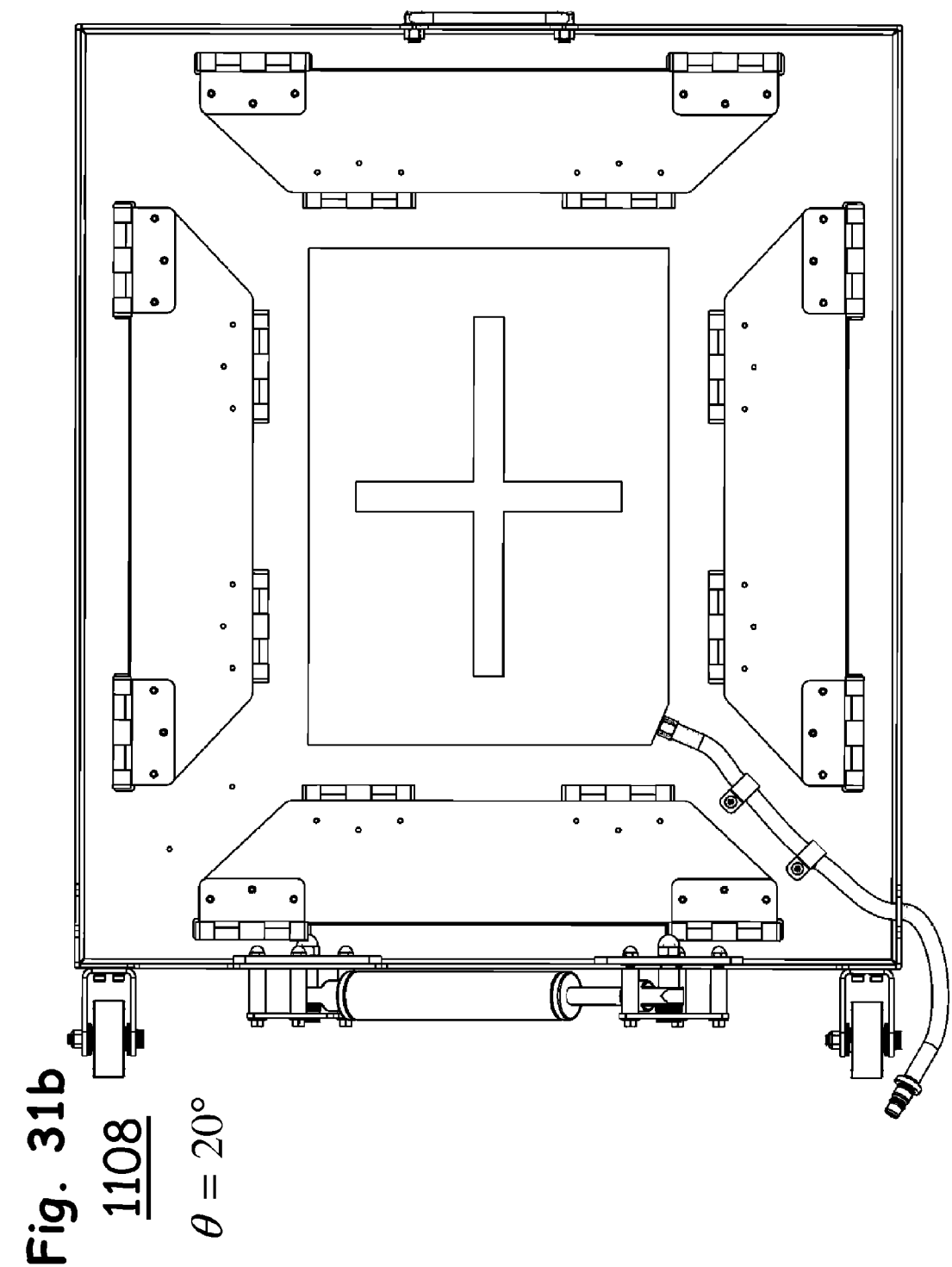

FIG. 31b illustrates a top view of lifter assembly 1108 for $\theta=20°$.

Figure 31C:
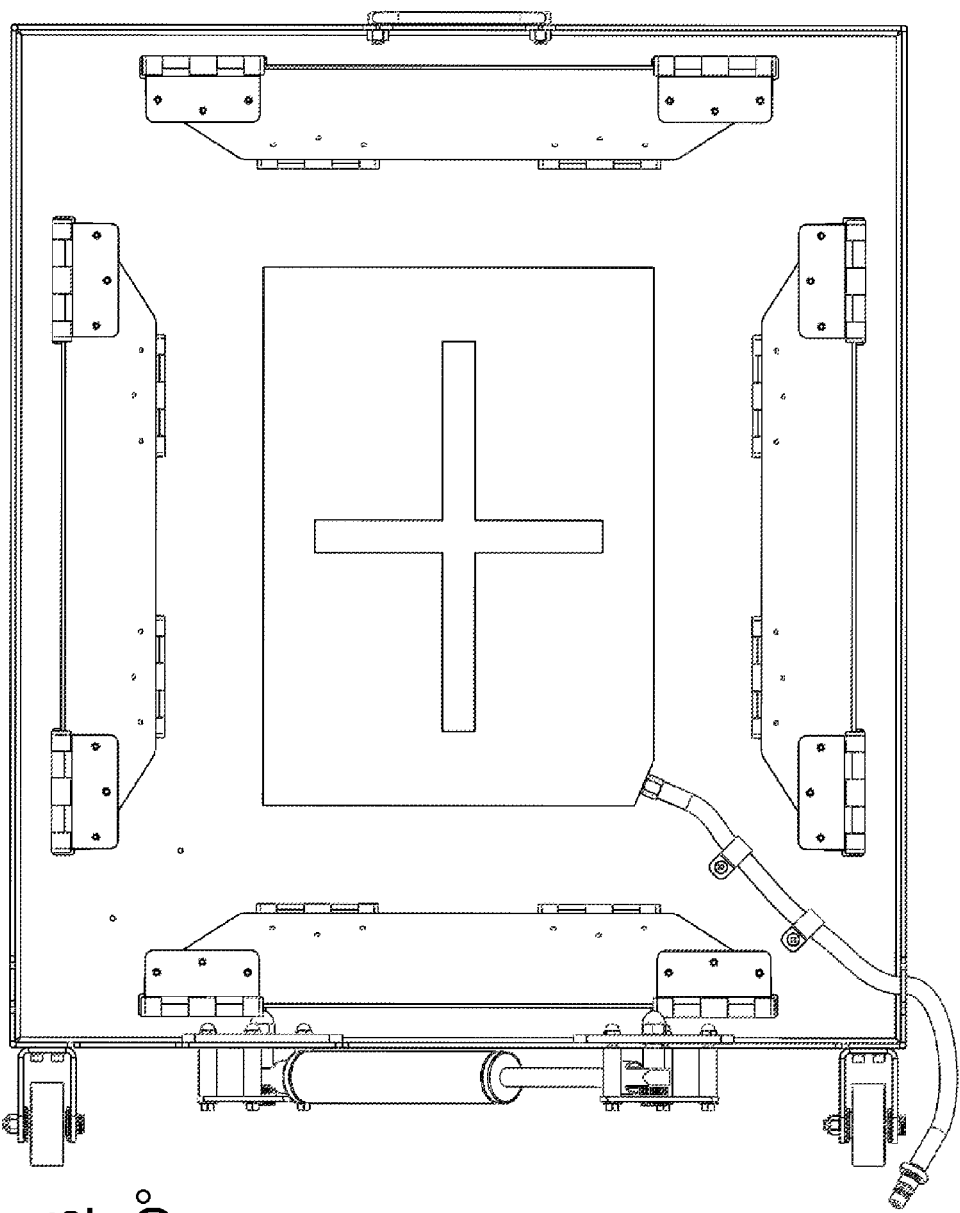

FIG. 31c illustrates a top view of lifter assembly 1108 for $\theta=50°$.

Figure 31D:
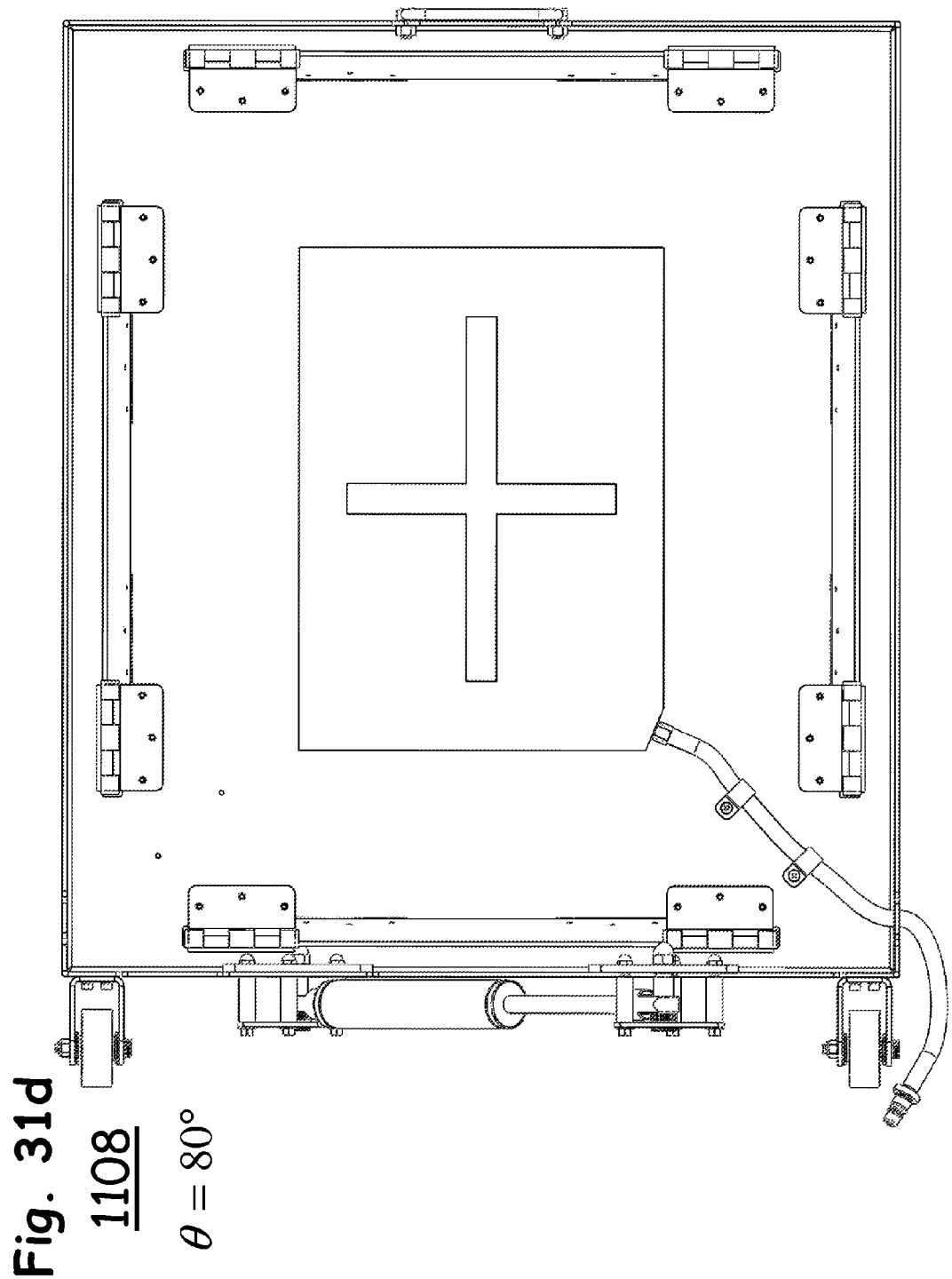

FIG. 31d illustrates a top view of lifter assembly 1108 for $\theta=80°$.

Figure 31E:
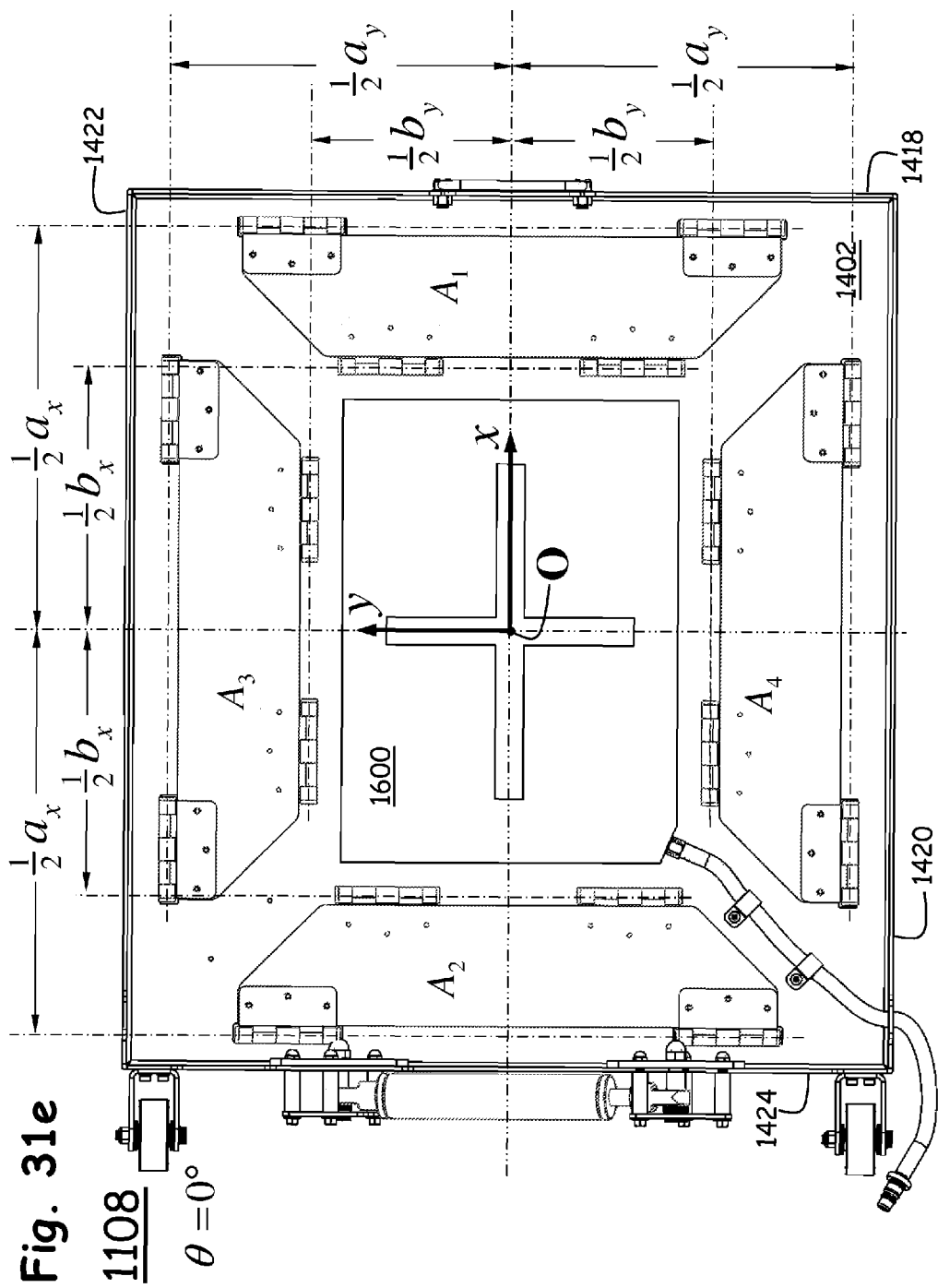

FIG. 31e illustrates a top view of lifter assembly 1108 for $\theta=0°$, used for mathematical analysis.

Figure 32:
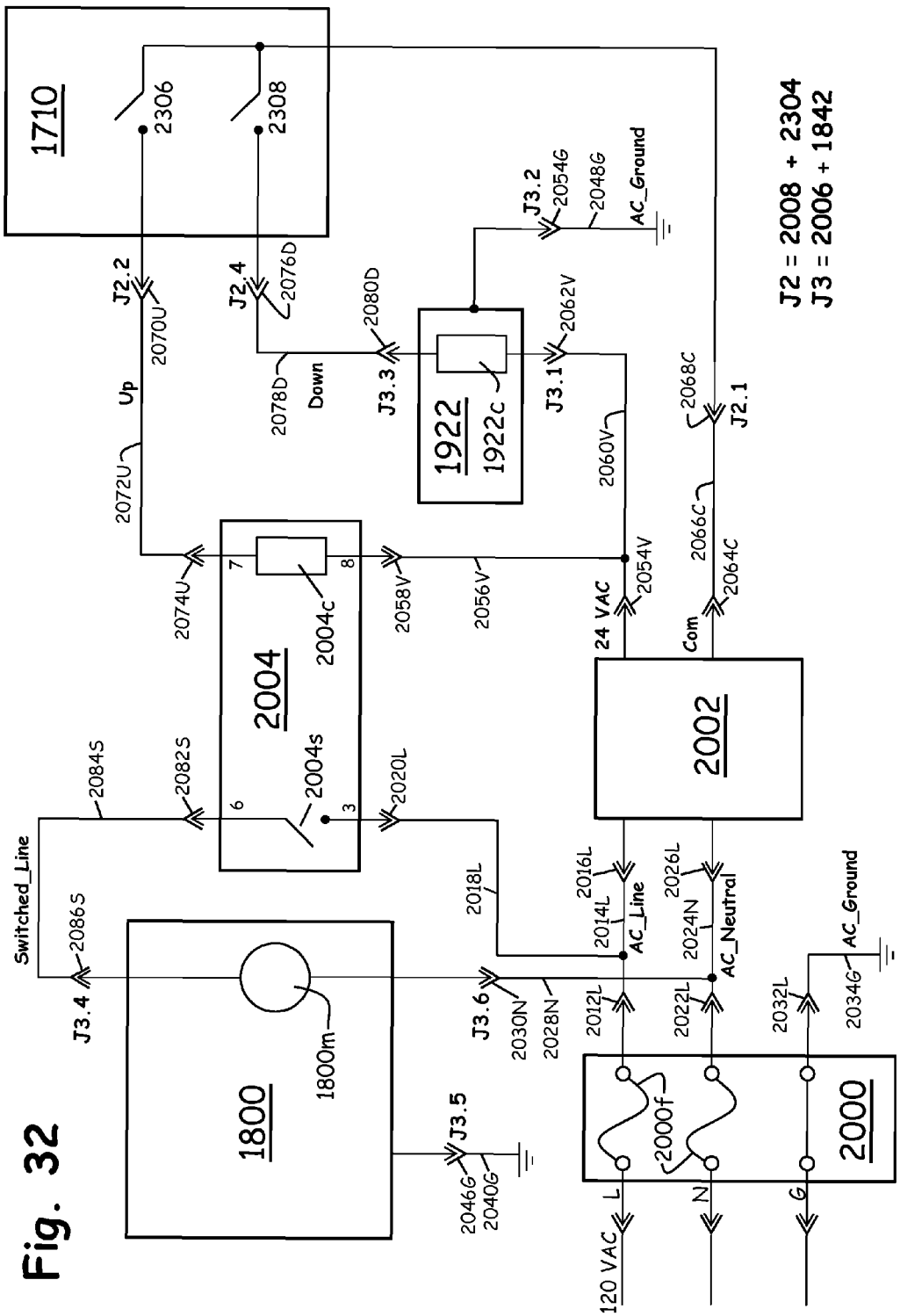

FIG. 32 illustrates an electrical schematic diagram for lifter apparatus 1100.

5. REFERENCE NUMERALS FOR FIG. 11A THROUGH FIG. 32

1100 Lifting apparatus
1102 Chair
1104 Reference surface, typically a floor
1106 Seat surface of chair 1102
1108 Lifter assembly
1110 Fluid-delivery assembly
1202 Base assembly
1204 Platform assembly
1206 Linkage assembly
1208 Inflatable-bag assembly
1210 Hydraulic-damper
1300a Lower hinge
1300b Center hinge
1300c Upper hinge
1302a Lower plate
1302b Upper plate
1304a Outer surface of lower plate 1302a
1304b Outer surface of upper plate 1302b
1306a Inner surface of lower plate 1302a
1306b Inner surface of upper plate 1302b
1308 Compliant pad
1310a First leaf of lower hinge 1300a
1310b First leaf of center hinge 1300b
1310c First leaf of upper hinge 1300c
1312a Second leaf of hinge 1300a
1312b Second leaf of center hinge 1300b
1312c Second leaf of upper hinge 1300c
1314a Interleaved knuckles of lower hinge 1300a
1314b Interleaved knuckles of center hinge 1300b
1314c Interleaved knuckles of upper hinge 1300c
1316a Fasteners such as flat-head screws for attaching first leaf 1310a of lower hinge 1300a
1316b Fasteners such as flat-head screws for attaching second leaf 1312a of lower hinge 1300a
1316c Fasteners such as flat-head screws for attaching first leaf 1310b of center hinge 1300b
1316d Fasteners such as flat-head screws for attaching second leaf 1312b of center hinge 1300b
1316e Fasteners such as flat-head screws for attaching second leaf 1312c of upper hinge 1300c
1318 Lower edge of lower plate 1302a
1320 Upper edge of lower plate 1302a
1322 Lower edge of upper plate 1302b
1324 Upper edge of upper plate 1302b
1400 Base plate 1402 Upper surface of base plate 1400
1404 Lower surface of base plate 1400
1406 Wheel assembly
1408 Lower clevis-pin assembly
1410 Articulating handle
1412 Hose constraint means
1414 First inflatable-bag fastening means, affixed to upper base-plate surface 1402
1416 Base-plate bumpers
1418 Front upturned flange of base plate 1400
1420 Right upturned flange of base plate 1400
1422 Left upturned flange of base plate 1400
1424 Rear upturned flange of base plate 1400
1426 Hose guide hole
1428 Hinge-knuckle cutout in base plate 1400
1430 Tapped holes for attaching lower hinge 1300a to base plate 1400
1432 Wheel
1434 Yoke
1436 Shoulder screw acting as axle for wheel 1432
1438 Lock nut securing shoulder screw 1436
1440 Attachment means for wheel assembly 1406
1442 Shoulder screw acting as clevis pin in lower clevis-pin assembly 1408
1444 Lower buttressing plate
1446 Large acorn nut, to secure shoulder screw 1442
1448 Shoulder-screw support plate
1450 Head of shoulder screw 1442
1452 Bolt to secure shoulder-screw support plate 1448
1454 Annular spacer to locate shoulder-screw support plate 1448
1456 Small acorn nut, to secure bolt 1452
1458 Inboard spacer, to locate clevis of hydraulic damper 1210
1460 Outboard spacer, to locate clevis of hydraulic damper 1210
1462 Body of hydraulic damper 1210
1464 Piston of hydraulic damper 1210
1466 Imaginary axis of hydraulic damper 1210
1468 Lower clevis of hydraulic damper 1210
1470 Hole in lower clevis 1468
1472 Upper clevis of hydraulic damper 1210
1474 Hole in upper clevis 1472
1500 Platform
1502 Upper platform surface
1504 Lower platform surface
1508 Upper clevis-pin assembly
1514 Second inflatable-bag fastening means, affixed to lower platform surface 1504
1518 Front upturned flange of platform 1500
1520 Right upturned flange of platform 1500
1522 Left upturned flange of platform 1500
1524 Rear upturned flange of platform 1500
1528 Hinge-knuckle cutout in platform 1500
1530 Tapped holes in platform 1500
1542 Upper clevis pin
1544 Upper buttressing plate
1550 Cutout in rear upturned flange 1524
1600 Inflatable bag
1602 Inflatable-bag fitting
1604 Lifter-side hose
1606 Male quick-connect
1608 Third inflatable-bag fastening means, affixed to top surface of inflatable bag 1600
1610 Fourth inflatable-bag fastening means, affixed to bottom surface of inflatable bag 1600
1700 Compressor assembly
1702 Plumbing assembly
1704 Electrical assembly
1706 Box assembly
1708 Lid assembly
1710 Manually operated controller
1712 Compressor-side hose assembly
1714 Line cord
1714a Female connector of line cord 1714
1714b Male connector of line cord 1714
1716 Metal box
1800 Air compressor
1800m Motor of air compressor (see FIG. 32)
1802 External running capacitor of air compressor
1804 Vibration damping mount
1806 Capacitor-mounting hardware
1808 Cabling-bracket assembly
1810 Air inlet of compressor 1800
1812 Compressed-air outlet of compressor 1800
1814 Mounting flanges of compressor 1800
1816 Power leads to compressor 1800
1818 Auxiliary leads of compressor 1800
1820 Wire nuts connecting leads 1818 to leads 1822
1822 Capacitor leads of capacitor 1802
1824 Compressor mounting screw
1826 Screw for attaching vibration-damping mount 1804 to box 1716
1828 Conduit hanger for holding capacitor 1802
1830 Fasteners for conduit hanger 1828
1832 Horizontal flange of cabling-bracket assembly 1808
1834 Long vertical flange of cabling-bracket assembly 1808
1836 Short vertical flange of cabling-bracket assembly 1808
1838 Fasteners to attach cabling-bracket assembly 1808 to compressor 1800
1840 Cable clip
1842 Male compressor connector
1900 Hex adapter
1902 First tee
1904 Bushing
1906 Pop-safety valve
1908 First nipple
1910 Second tee
1912 Adapter
1914 Barb elbow
1916 Second nipple
1918 Solenoid-valve assembly
1920 Valve of solenoid-valve assembly 1918
1922 Solenoid of solenoid-valve assembly 1918
1922c Coil of solenoid 1922 (see FIG. 32)
1924 Metal wiring box of solenoid-valve assembly 1918
1926 Drain nipple
1928 Wires to solenoid 1922
1930 Grommet
1932 Thread of hex adapter 1900
2000 Power-entry module
2000f Fuse of power-entry module 2000
2002 Transformer
2003 Fasteners to attach transformer 2002 to metal box 1716
2004 Relay
2004c Coil of relay 2004 (see FIG. 32)
2004s Switch of relay 2004 (see FIG. 32)
2005 Fasteners to attach relay 2004 to metal box 1716
2008 Female controller connector
2009 Nut for attaching connector 2008 to metal box 1716
2010 Port of power-entry module 2000 where line cord 1714 attaches
2012L First crimp terminal, at AC_Line connection of power-entry module 2000

2014L First wire, conveying signal AC_Line from terminal 2012L to terminal 2016L
2016L Second crimp terminal, at AC_Line connection of transformer 2002
2018L Second wire, conveying signal AC_Line from terminal 2012L to terminal 2020L
2020L Third crimp terminal, at AC_Line connection of relay 2004
2022N Fourth crimp terminal, at AC_Neutral connection of power-entry module 2000
2024N Third wire, conveying signal AC_Neutral from terminal 2022N to terminal 2026N
2026N Fifth crimp terminal, at AC_Neutral connection to transformer 2002
2028N Fourth wire, conveying signal AC_Neutral from terminal 2022N to first compressor-connector terminal 2030N
2030N First compressor-connector terminal of female compressor connector 2006
2032G Sixth crimp terminal, at AC_Ground connection to power-entry module 2000
2034G Fifth wire, conveying signal AC_Ground from terminal 2032G to terminal 2036G
2036G First ring terminal, at AC_Ground connection to metal box 1716
2038G Fastener that attaches terminal 2036G to metal box 1716
2040G Sixth wire, conveying signal AC_Ground from terminal 2042G to terminal 2046G
2042G Second ring terminal, at AC_Ground connection to metal box 1716
2044G Fastener that attaches terminal 2042G to metal box 1716
2046G Second compressor-connector terminal of female compressor connector 2006
2048G Seventh wire, conveying signal AC_Ground from terminal 2050G to terminal 2054G
2050G Third ring terminal, at AC_Ground connector to metal box 1716
2052G Fastener that attaches terminal 2050G to metal box 1716
2054G Third compressor-connector terminal of female compressor connector 2006
2055V Seventh crimp terminal, at 24 VAC connection of transformer 2002
2056V Eighth wire, conveying signal 24 VAC from terminal 2055V to terminal 2058V
2058V Eighth crimp terminal, at 24 VAC connection to relay 2004
2060V Ninth wire, conveying signal 24 VAC from terminal 2058V to terminal 2062V
2062V Fourth compressor-connector terminal of female compressor connector 2006
2064C Ninth crimp terminal, at Com connection to transformer 2002
2066C Tenth wire, conveying signal Com from terminal 2064C to terminal 2068C
2068C First controller-connector terminal of female controller connector 2008
2070U Second controller-connector terminal of female controller connector 2008
2072U Eleventh wire, conveying signal Up from terminal 2070U to terminal 2074U
2074U Tenth crimp terminal, at Up input to relay 2004
2076D Third controller-connector terminal of female controller connector 2008
2078D Twelfth wire, conveying signal Down from terminal 2076D to terminal 2080D
2080D Fifth compressor-connector terminal of female compressor connector 2006
2082S Eleventh crimp terminal at Switched_Line input to relay 2004
2084S Thirteenth wire, conveying signal Switched_Line from terminal 2082S to terminal 2086S
2086S Sixth compressor-connector terminal of female compressor connector 2006
2100 Base flange of metal box 1716
2102 Front flange of metal box 1716
2104 Rear flange of metal box 1716
2106 Left flange of metal box 1716
2108 Right flange of metal box 1716
2110 Bumper on outside of base flange 2100
2111 Bumper attachment means
2112 Lid-attachment means
2114 Vibration-mount attachment means
2116 Transformer-attachment means
2118 Relay attachment means
2120 First chassis-grounding attachment means
2122 Second chassis-grounding attachment means
2124 Third chassis-grounding attachment means
2126 Hole in base flange 2100 associated with each vibration-damping mount 1804
2128 Hole in base flange 2100 for attachment of conduit hanger 1828
2130 Hole in base flange 2100 to provide condensate drainage
2132 Cutout in front flange 2102 for mounting female controller connector 2008
2134 Cutout in rear flange 2104 for mounting power-entry module 2000
2200 Lid
2202 Top flange of lid 2200
2204 Front flange of lid 2200
2206 Left flange of lid 2200
2208 Rear flange of lid 2200
2210 Right flange of lid 2200
2212 Handle
2214 Lid-to-box attachment means
2216 Cutout for barb elbow 1914
2218 Pin in head of attachment means 2214
2220 Hexagonal socket in head of attachment means 2214
2300 Hand-held portion of manually operated controller 1710
2302 Cable of manually operated controller 1710
2304 Male controller connector of manually operated controller 1710
2306C First contact of connector 2304, which carries signal Com
2306D Second contact of connector 2304, which carries signal Down
2306U Third contact of connector 2304, which carries signal Up
2400 Compressor-side hose
2402 Female quick-connect
2404 Barb of quick-connect 2402
2406 Quick-connect fitting of female quick-connect 2402
2408 Release ring of female quick-connect 2402
2410 Proximal end of hose 2400
2412 Distal end of hose 2400
2900 Chair-base member 2902 Adhesive pad
3000 Protruding pleated portion of inflatable bag 1600

6. DETAILED DESCRIPTION

6.1 Top-Level-Assembly Views of the Lifting Apparatus 1100 (FIG. 11a Through FIG. 11d)

FIGS. 11a through 11d illustrate an embodiment of a lifting apparatus 1100, which comprises a lifter assembly 1108 and a fluid-delivery assembly 1110. Also illustrated in FIGS. 11a through 11d is a chair 1102 representing a payload that is lifted by the lifting apparatus as it executes an ascending motion from a low position (FIG. 11a), through various intermediate positions, including a first intermediate position (FIG. 11b) and a second intermediary position (FIG. 11e), to a high position (FIG. 11d). Lifting occurs with respect to a reference surface 1104, typically a floor, upon which the lifting apparatus 1100 rests. The chair has a seat surface 1106. The payload would typically comprise not only the chair 1102 but also a person (not shown) seated in the chair, hereafter called "the user". Other types of payloads are possible, such as materiel. When the payload is a chair and its user, the low position of the apparatus (FIG. 11a) is typically most comfortable for the user while sitting in the chair, whereas the high position of the apparatus (FIG. 11d) provides maximal assistance to help an infirm user to stand. After standing, the user may let the apparatus remain in the high position (FIG. 11d); when wishing to sit again, the user begins in the high position and, by virtue of the lifting apparatus 1100 executing a descending motion, proceeds to the low position (FIG. 11a). Thus, the lifting apparatus aids with both standing and sitting, although standing is typically a far-more-difficult task than sitting.

Lifting apparatus 1100 is described in Sections 6 and 7 in accordance with a prototype embodiment that has been reduced to practice as a working model. In this description, many dimensions, part numbers, and other details of the prototype embodiment are recited. However, these and other specifics are not meant to be limitations on the scope, but rather as an exemplification of one embodiment thereof.

6.2 Lifter Assembly 1108 (FIG. 12a Through FIG. 16c)

FIGS. 12a, 12b, and 12c illustrate three views of the lifter assembly 1108. Defining left and right from the viewpoint of the user seated in chair 1102 (FIG. 11a), FIG. 12a is viewed from top-front-right, FIG. 12b is viewed from top-rear-right, and FIG. 12c is viewed from bottom-rear-right. Referring to these figures, lifter assembly 1108 comprises a base assembly 1202, a platform assembly 1204, four instances of a linkage assembly 1206, an inflatable-bag assembly 1208, and a hydraulic-damper 1210 (visible on FIGS. 12b and 12c).

6.2.1 Linkage Assembly 1206 (FIG. 13)

Referring to FIG. 13, linkage assembly 1206 comprises, according to the first embodiment, two lower hinges 1300a, a lower plate 1302a having an outer surface 1304a and an inner surface 1306a, two center hinges 1300b (identical to lower hinges 1300a), an upper plate 1302b (identical to lower plate 1302a) having an outer surface 1304b and an inner surface 1306b, two upper hinges 1300c (identical to lower hinges 1300a), and two compliant pads 1308.

Hinges 1300a, 1300b, and 1300c may be, for example, butt hinges with non-removable pins, well known in the hinge-making art. Such hinges are often used on doors, and therefore are very inexpensive because they are manufactured in large quantity. The first and second leaves of each hinge are pivotally joined at interleaved knuckles thereof, such as 1314a, 1314b, and 1314c, via a cylindrical pin that passes through the interleaved knuckles, as is well known in the hinge-making art. For example, hinges used in the prototype embodiment are made by Stanley Black and Decker of New Britain, Conn.

First leaf 1310a of each lower hinge 1300a is affixed to base assembly 1202 using fasteners such as flat-head screws 1316a. Second leaf 1312a of each lower hinge 1300a is affixed to inner surface 1306a of lower plate 1302a, near a lower edge 1318 thereof, using fasteners such as flat-head screws 1316b. First leaf 1310b of each center hinge 1300b is affixed to outer surface 1304a of lower plate 1302a, near an upper edge 1320 thereof, using fasteners such as flat-head screws 1316c. Second leaf 1312b of each center hinge 1300b is affixed to outer surface 1304b of upper plate 1302b, near a lower edge 1322 thereof, using fasteners such as flat-head screws 1316d. First leaf 1310c of each upper hinge 1300c is affixed to inner surface 1306b of upper plate 1302b, near an upper edge 1324 thereof, using fasteners such as flat-head screws that are hidden in FIG. 13 by compliant pads 1308. Second leaf 1312c of each upper hinge 1300c is affixed to platform assembly 1204 using fasteners such as flat head screws 1316e. Compliant pads 1308, affixed to surface 1304b, provide a rotational "stop" such that, when lifting assembly 1108 is in the low position shown in FIG. 11a, center hinges 1300b are not damaged due to over-rotation as surface 1304b approaches surface 1304a.

6.2.2 Base Assembly 1202 and Hydraulic Damper 1210 (FIG. 14a Through FIG. 14d)

Referring to FIG. 14a, base assembly 1202 comprises a base plate 1400 having an upper base-plate surface 1402 and a lower base-plate surface 1404, two instances of a wheel assembly 1406 (whose details are shown in FIG. 14b), a lower clevis-pin assembly 1408 (whose details are shown in FIG. 14c), an articulating handle 1410, hose constraint means 1412, a first inflatable-bag fastening means 1414 (such as the loop portion of hook-and-loop fastener commonly known as Velcro®) for affixing inflatable-bag assembly 1208 where it abuts upper base-plate surface 1402 (see FIG. 12b), and a plurality of base-plate bumpers 1416 (shown on FIG. 12c) affixed to lower base-plate surface 1404 to protect floor 1104 from direct contact with surface 1404.

Base plate 1400, which may be made, for example, from folded sheet metal, comprises, as illustrated on FIG. 14a, a front upturned flange 1418, a right upturned flange 1420, a left upturned flange 1422, and a rear upturned flange 1424. All of these upturned flanges serve to stiffen base plate 1400. Front upturned flange 1418 comprises a front-flange profile to provide attachment for handle 1410. Rear upturned flange 1424 comprises a rear-flange profile to provide attachment surfaces for wheel assemblies 1406 (see more detail in FIG. 14b) and an attachment surface for lower clevis-pin assembly 1408 (see more detail in FIG. 14c). Right upturned flange 1420 and left upturned flange 1422 each comprises a side-flange profile, near wheel assembly 1406, that provides buttressing support for rear-upturned flange 1424, which may otherwise be too weak to withstand the load applied thereto by wheel assemblies 1406 (see more detail in FIG. 14b). Right upturned flange 1420 also provides an hose guide hole 1426. Base plate 1400 also comprises a plurality of hinge-knuckle cutouts 1428 to accommodate knuckles 1314a of lower hinges 1300a. Base plate 1400 also comprises, associated with each hinge-knuckle cutout 1428, a plurality of tapped holes 1430 for affixing lower leaves 1310a of lower hinges 1300a to base plate 1400 using fasteners 1316a.

Referring to FIG. 14b, wheel assembly 1406 comprises a wheel 1432, a yoke 1434, an axle comprising (for example) a shoulder screw 1436 and a lock nut 1438, and wheel-assembly-attachment means 1440 for attaching the wheel assembly to rear upturned flange 1424.

Referring to FIG. 14c, lower clevis-pin assembly 1408 comprises a lower clevis pin 1442 that may, for example, be a shoulder screw whose shoulder, abutting a lower buttressing plate 1444, is held thereto by a large acorn nut 1446. Lower buttressing plate 1444 reinforces rear upturned flange 1424 in the vicinity of the lower clevis-pin assembly 1408. Clevis-pin assembly 1408 further comprises a shoulder-screw support plate 1448 through which a head 1450 of shoulder screw 1442 passes with little clearance, thereby to prevent lateral deflection of the shoulder screw when a transverse load is applied thereto. Clevis-pin assembly 1408 further comprises a plurality of bolts 1452 and annular spacers 1454 that hold support plate 1448 at a fixed distance parallel to rear upturned flange 1424. Each bolt 1452 is secured with a small acorn nut 1456. Clevis-pin assembly 1408 further comprises an inboard spacer 1458 and an outboard spacer 1460.

Referring to FIG. 14d, hydraulic damper 1210 comprises a damper body 1462, a damper piston 1464 that is concentric to body 1462 on a common imaginary axis 1466, a lower clevis 1468 comprising a lower clevis hole 1470, and an upper clevis 1472 comprising an upper clevis hole 1474. Piston 1464 is free to execute a motion axially with respect to body 1462, thereby to modulate a distance D between the upper clevis hole 1474 and the lower clevis hole 1470. This motion is resisted by hydraulic fluid contained within hydraulic damper 1210. The force of this resistance is an increasing function of the time rate of change of D, such that, as illustrated in FIG. 12b, sudden vertical motions of platform assembly 1204 with respect to base assembly 1202 are resisted. The hydraulic damper used in the prototype embodiment is made by ACE Controls of Farmington Hills, Mich.

Referring now to both FIG. 14c and FIG. 14d, with lower clevis 1468 situated between flange 1424 and support-plate 1448, shoulder screw 1442 (FIG. 14c) is inserted through lower hole 1470 of lower clevis 1468 (FIG. 14d), as illustrated in FIG. 12b, thereby creating a pivotal connection of lower clevis 1468 to lower-clevis-pin assembly 1408. Spacers 1458 and 1460 (FIG. 14c) serve to locate lower clevis 1468 (FIG. 14d) axially on shoulder screw 1442 (FIG. 14c).

6.2.3 Platform Assembly 1204 (FIG. 15a and FIG. 15b)

Referring primarily to FIG. 15a, but also occasionally to FIG. 15b as noted, platform assembly 1204 comprises a platform 1500 having an upper platform surface 1502 and a lower platform surface 1504 (FIG. 15b), an upper clevis-pin assembly 1508, and a second inflatable-bag fastening means 1514 (FIG. 15b) (such as the loop portion of hook-and-loop fastener commonly known as Velcro®) for affixing inflatable-bag assembly 1208 where it abuts lower platform surface 1504 (see FIG. 12c). Platform 1500, which may be made, for example, from folded sheet metal, comprises a front upturned flange 1518, a right upturned flange 1520, a left upturned flange 1522, and a rear upturned flange 1524. All of these upturned flanges serve to stiffen base plate 1500, and also to provide safety by preventing chair 1102 from inadvertently sliding off surface 1502, upon which chair 1102 rests (FIG. 12a).

Rear upturned flange 1524 comprises a profile to provide an attachment surface for upper clevis-pin assembly 1508, which is identical to lower clevis-pin assembly 1408 previously described in connection with FIG. 14c, except that an upper buttressing plate 1544 may be somewhat different in height than lower buttressing plate 1444, inasmuch as rear upturned flange 1524 may be, where upper clevis-pin assembly 1508 attaches, somewhat taller than the portion of rear upturned flange 1424 where lower clevis-pin assembly 1408 attaches, to prevent axis 1466 of damper 1210 from getting too close to horizontal—and thus the axial force in the damper too large—as the lifter assembly approaches its low position 1108 (FIG. 11a). Upper clevis 1472 of hydraulic damper 1210 is pivotally attached to upper clevis-pin assembly 1508 by insertion of upper clevis pin 1542 through upper clevis hole 1474. Rear upturned flange 1524 also comprises a cutout 1550 to avoid interference with lower clevis assembly 1408 when the lifting apparatus 1100 is in the low position illustrated in FIG. 11a.

Platform 1500 also comprises a plurality of platform hinge-knuckle cutouts 1528 to accommodate knuckles 1314c of upper hinges 1300c (FIG. 13). Platform 1500 also comprises, associated with each cutout 1528, a plurality of tapped holes 1530 for affixing upper leaves 1312c of upper hinges 1300c to platform 1500 using fasteners 1316e.

Figure 16C:
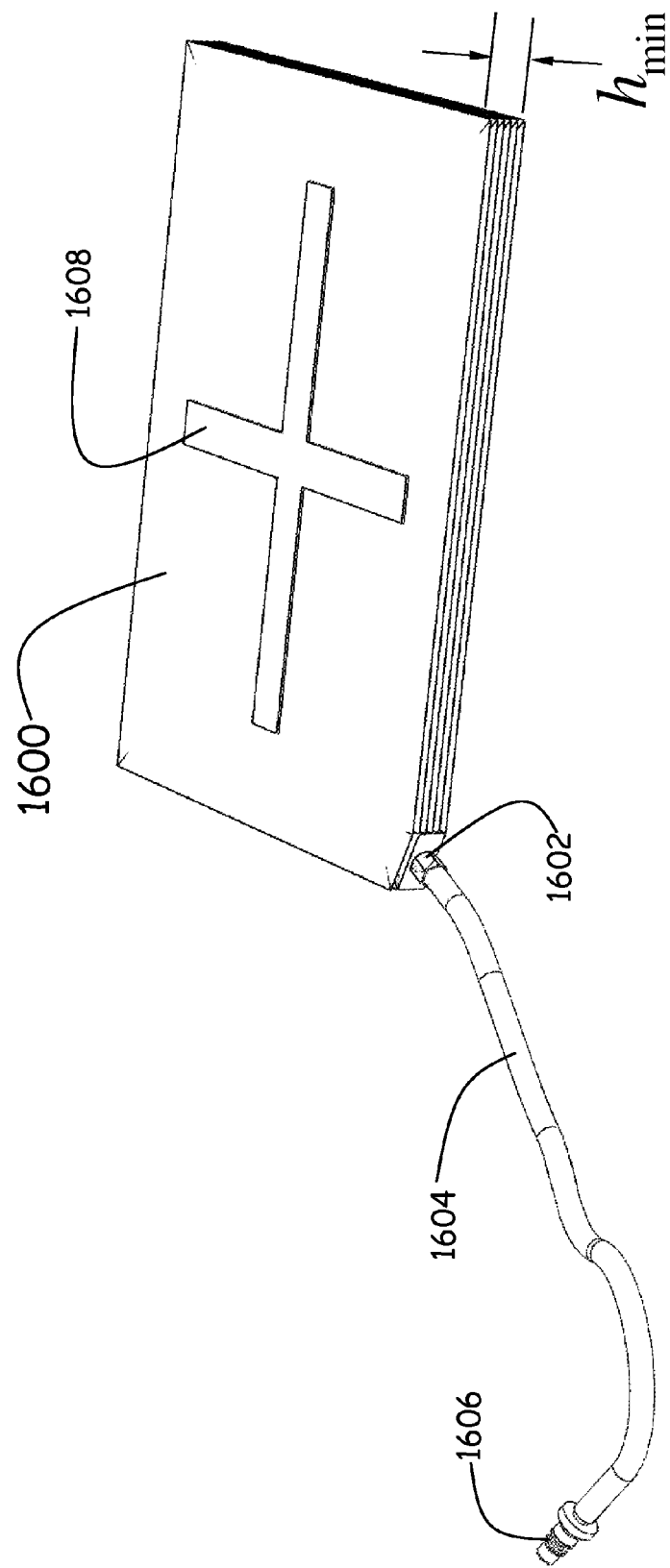

6.2.4 Inflatable-Bag Assembly 1208 (FIG. 16a Through FIG. 16c)

Referring to FIG. 16a and FIG. 16b, inflatable-bag assembly 1208 comprises an inflatable bag 1600, an inflatable-bag fitting 1602, a lifter-side fluid-carrying hose 1604, a male quick-connect 1606, a third inflatable-bag fastening means 1608, and a fourth inflatable-bag fastening means 1610 (FIG. 16b). Inflatable bag 1600, which is shown fully inflated in FIG. 16a and FIG. 16b, may comprise, like bellows, a plurality of folded pleats, such that, when inflatable bag 1600 is fully deflated as illustrated in FIG. 16c, its deflated vertical dimension $h_{min}$ is small. In the prototype embodiment, $h_{min} \approx 25$ mm.

Fitting 1602, hose 1604, and quick-connect 1606 are used to convey pressurized fluid to the bag to inflate it, and from the bag to deflate it. A proximal end of fitting 1602 is affixed to inflatable bag 1600. A distal end of fitting 1602 comprises, for example, a series of serrations known as "barbs", upon which hose 1604 is overlapped to produce a fluid-tight seal between hose and fitting, as is well known in the art. A proximal end of quick-connect 1606 likewise comprises barbs to provide a fluid-tight seal between hose 1604 and quick-connect 1606. A distal end of male quick-connect 1606 comprises means, well known in the art, for making quick-connection and disconnection to a mating female part described later in connection with fluid-delivery assembly 1110.

The third and fourth inflatable-bag fastening means, 1608 and 1610 respectively, are, for example, the hook portion of hook-and-loop fastener commonly known as Velcro®, whereby the third fastening means 1608 (FIG. 16a) mates with the second fastening means 1514 (FIG. 15b) located on bottom surface 1505 of platform 1500, and likewise the fourth fastening means 1610 (FIG. 16b) mates with the first fastening means 1414 (FIG. 14a) located on upper surface 1402 of base plate 1400.

As shown by comparison of FIG. 11d to FIG. 14a, lifter-side hose 1604 is guided on surface 1402 of base plate 1400 by conduit clips 1412, and is guided through flange 1420 by passage through hole 1426 therein.

In the prototype embodiment, hose 1604 has ⅜" internal diameter, and quick-connect 1606 is provided by McMasterCarr of Robbinsville, N.J. as part number 6534K780.

6.3 Fluid-Delivery Assembly 1110 (FIG. 17a Through FIG. 24b)

Fluid-delivery assembly 1110 delivers pressurized fluid to inflatable bag 1600 to inflate it, and allows pressurized fluid to flow out of inflatable bag 1600 to deflate it. In the embodiment described herein, the pressurized fluid is compressed air.

Referring to FIG. 17a, FIG. 17b and FIG. 17c, fluid-delivery assembly 1110 comprises, according to this embodiment, an air-compressor assembly 1700 (FIG. 17b), a plumbing assembly 1702, an electrical assembly 1704, a box assembly 1706 (FIG. 17a) that comprises a metal box 1716, a lid assembly 1708 that comprises a lid 1718, a manually operated controller 1710, a compressor-side hose assembly 1712, and a line cord 1714 having a female connector 1714a and a male connector 1714b (FIG. 17c). Box assembly 1706 and lid assembly 1708 are visible on FIG. 17a, but are hidden on FIG. 17b and FIG. 17c to reveal assemblies 1700, 1702, and 1704 that are otherwise obscured thereby. FIG. 17c is a magnified view of a portion of FIG. 17b.

6.3.1 Compressor Assembly 1700 (FIG. 18a and FIG. 18b)

Referring to FIG. 18a and FIG. 18b, compressor assembly 1700 comprises an air compressor 1800 that includes an internal motor 1800m (not shown on FIGS. 18a and 18b) and an external running capacitor 1802 that is typically provided as part of the compressor, a plurality of vibration-damping mounts 1804, a set of capacitor-mounting hardware 1806, and a cabling-bracket assembly 1808.

Compressor 1800 is typically commercially available; specifically, figures herein show a compressor known as Model MP5, manufactured by California Air Tools of San Diego, Calif. This compressor is used in the prototype embodiment. Such a compressor 1800 comprises an air inlet 1810 (FIG. 18a) where air at atmospheric pressure enters, a compressed-air outlet 1812 (FIG. 18b) where compressed air exits, a plurality of mounting flanges 1814, a set of power leads 1816, and a pair of auxiliary leads 1818 (FIG. 18a) that are connected via wire nuts 1820 to a pair of capacitor leads 1822 of capacitor 1802.

Referring to FIG. 18a, vibration-damping mounts 1804, made of a compliant material such as rubber, serve to minimize noise that would otherwise be created if mounting flanges 1814 were connected directly to a rigid surface. A compressor-mounting screw 1824 fastens each flange 1814 to the associated vibration-damping mount 1804, and a pair of screws 1826 fastens each vibration-damping mount 1804 to box assembly 1706. In the prototype embodiment, vibration-damping mounts 1804 are provided by McMaster-Carr of Robbinsville, N.J., as part number 64875K62.

Referring to FIG. 18b, capacitor-mounting hardware 1806 may comprise, for example, at least one conduit hanger 1828 such as size #3 conduit hanger, known as part number 67830, manufactured by Halex Corporation of Cleveland, Ohio. Capacitor-mounting hardware 1806 also comprises fasteners 1830 to secure conduit hanger 1828 to box assembly 1706.

Still referring to FIG. 18b, cabling-bracket assembly 1808 comprises a cabling bracket comprising a horizontal flange 1832, a long vertical flange 1834, and a short vertical flange 1836. Horizontal flange 1832 is used for attachment of cabling-bracket assembly 1808 to compressor 1800 via fasteners 1838. Long vertical flange 1834 is used to hold a plurality of cable clips 1840, which may be used for cable management, as illustrated in FIG. 17c. Short vertical flange 1836 is used for mounting a male compressor connector 1842, into which power leads 1816, as well as leads from plumbing assembly 1702, are terminated for connection to electrical assembly 1704, as illustrated on FIG. 17c.

6.3.2 Plumbing Assembly 1702 (FIG. 19a and FIG. 19b)

Referring to FIG. 19a and FIG. 19b, plumbing assembly 1702 comprises a hex adapter 1900, a first tee 1902, a bushing 1904, a pop-safety valve 1906, a first nipple 1908, a second tee 1910, an adapter 1912, a barb elbow 1914 that comprises a barb fitting 1915, a second nipple 1916, a solenoid-valve assembly 1918, a drain nipple 1926, and a set of three solenoid wires 1928. Solenoid-valve assembly 1918 comprises a valve 1920, a solenoid 1922 that controls valve 1920, and a metal wiring box 1924 into which wires 1928 pass through grommet 1930, and wherein two of the three wires are connected to solenoid 1922 and the third wire is connected to metal wiring box 1924 itself to provide chassis ground. Plumbing assembly 1702 is attached to compressor assembly 1700 at thread 1932 of hex adapter 1900; thread 1932 mates with a female pipe thread on compressed-air outlet 1812 (FIG. 18b) of compressor assembly 1700. This pipe-threaded connection may be made by spinning the entire plumbing assembly 1702 onto outlet 1812; the result is illustrated in FIG. 17c.

In the prototype of the first embodiment, plumbing components defined above are as follows:

Hex adapter 1900, ¼" NPT-M×⅜" NPT-M, is provided by McMaster-Can of Robbinsville, N.J., as part number 5485K320.

First tee 1902, ⅜"×⅜"×⅜" NPT-F, is provided by McMaster-Carr as part number 50785K730.

Bushing 1904, ⅜" NNPT-M×¼" NPT-F, is provided by McMaster-Carr as part number 54429K412.

Pop-safety valve 1906, which holds pressure up to 5 psi but releases pressure above 5 psi, is provided by Kingston Valves of Torrance, Calif., as part number 100SS-2-005.

First nipple 1908, ⅜" NPT×1" length, is provided by McMaster-Carr as part number 50785K153.

Second tee 1910 is identical to first tee 1902.

Adapter 1912, ⅜" NPT-M×¼" NPT-F, is provided by McMaster-Carr as part number 9151K260.

Barb elbow 1914, ¼" NPT-M×⅜" hose barb, is provided by McMaster-Carr as part number 53525K18.

Second nipple 1916, ⅜" NPT×1.5" length, is provided by McMaster-Can as part number 50785K130.

Solenoid-valve assembly 1918 is provided by Dema Engineering as part number 473P.3, providing valve 1920 with ⅜" NPT-F terminations, and 24-VAC solenoid 1922.

Drain nipple 1926, ⅜" NPT×3.5" length, is provided by McMaster-Carr as part number 4568K156.

Grommet 1930 is provided by McMaster-Can as part number 9600K21.

6.3.3 Electrical Assembly 1704 (FIG. 20a Through FIG. 20c)

Referring primarily to FIG. 20a but also occasionally to FIG. 20b and FIG. 20c as noted, electrical assembly 1704 comprises a fused power-entry module 2000 that snaps into a cutout in metal box 1716, a transformer 2002 that is fastened to metal box 1716 using fasteners 2003, a relay 2004 that is fastened to metal box 1716 using fasteners 2005, a female compressor connector 2006 that mates with male compressor connector 1842 (FIG. 18b), a female controller connector 2008 that passes through a hole in metal box 1716 and is secured thereto by a nut 2009, various wires that make electrical connections between elements 2000, 2002, 2004, 2006, and 2008, and various terminals that terminate the wires. Power-entry module 2000 comprises a pair of fuses 2000f. Relay 2004 comprises a coil 2004c and a normally open switch 2004s, neither of which is visible on FIG. 20a, 20b, or 20c.

The wires and terminals are best described in terms of a set of electrical signals that they carry; this set comprises signals denoted AC_Line, AC_Neutral, AC_Ground, 24 VAC, Com, Up, Down, and Switched_Line. In the ensuing description, a reference numeral may comprise a one-letter suffix to indicate one of the set of signals, as follows: L indicates AC_Line, N indicates AC_Neutral, G indicates AC_Ground, V indicates 24 VAC, C indicates Com, U indicates Up, D indicates Down, and S indicates Switched_Line.

Still referring to FIG. 20a except as indicated, signal AC_Line enters on line cord 1714 (FIG. 17c) at port 2010 of power-entry module 2000, and is conveyed therein to a first power-entry connection thereof, to which is connected a first crimp terminal 2012L. A first wire 2014L, crimped to terminal 2012L, conveys signal AC_Line to a second crimp terminal 2016L that is connected to a first transformer connection on a primary side of transformer 2002. A second wire 2018L, also crimped to terminal 2012L, conveys signal AC_Line to a third crimp terminal 2020L that is connected to a first relay connection of relay 2004.

Still referring to FIG. 20a except as indicated, signal AC_Neutral enters on line cord 1714 (FIG. 17c) at port 2010 of power-entry module 2000, and is conveyed therein to a second power-entry connection thereof, to which is connected a fourth crimp terminal 2022N. A third wire 2024N, crimped to terminal 2022N, conveys signal AC_Neutral to a fifth crimp terminal 2026N that is connected to a second transformer connection on the primary side of transformer 2002. A fourth wire 2028N, also crimped to terminal 2022N, conveys signal AC_Neutral to a first compressor-connector terminal 2030N (FIG. 20b) of female compressor connector 2006.

Still referring to FIG. 20a except as indicated, signal AC_Ground enters on line cord 1714 (FIG. 17c) at port 2010 of power-entry module 2000, and is conveyed therein to a third power-entry connection thereof, to which is connected a sixth crimp terminal 2032G. A fifth wire 2034G, crimped to terminal 2032G, conveys signal AC_Ground to a first ring terminal 2036G that is connected to metal box 1716 using a fastener 2038G. A sixth wire 2040G (best viewed on FIG. 20c) conveys signal AC_Ground from a second ring terminal 2042G, which is fastened to metal box 1716 by fastener 2044G, to a second compressor-connector terminal 2046G (FIG. 20b) of female compressor connector 2006. A seventh wire 2048G (best viewed on FIG. 20c) conveys signal AC_Ground from a third ring terminal 2050G, which is fastened to metal box 1716 by fastener 2052G, to a third compressor-connector terminal 2054G (FIG. 20b) of female compressor connector 2006.

Referring now to FIG. 20c except as indicated, signal 24 VAC emanates from a third transformer connection on a secondary side of transformer 2002, to which is connected a seventh crimp terminal 2055V. An eighth wire 2056V conveys signal 24 VAC to a eighth crimp terminal 2058V that is connected to a second relay connection of relay 2004. A ninth wire 2060V, also crimped to terminal 2058V, conveys signal 24 VAC to a fourth compressor-connector terminal 2062V (FIG. 20b) of female compressor connector 2006.

Referring again to FIG. 20a except as indicated, signal Com emanates from a fourth transformer connection on the secondary side of transformer 2002, to which is connected a ninth crimp terminal 2064C. A tenth wire 2066C conveys signal Com to a first controller-connector terminal 2068C (FIG. 20b) of female controller connector 2008.

Referring to FIG. 20b except as indicated, signal Up emanates from a second controller-connector terminal 2070U of female controller connector 2008. An eleventh wire 2072U, connected to terminal 2070U, conveys signal UP to a tenth crimp terminal 2074U (FIG. 20c), which is connected to a third relay connection of relay 2004.

Still referring to FIG. 20b, signal Down emanates from a third controller-connector terminal 2076D of female controller connector 2008. A twelfth wire 2078D, connected to terminal 2076D, conveys signal Down to a fifth compressor-connector terminal 2080D of female compressor connector 2006.

Referring again to FIG. 20a except as indicated, signal Switched_Line emanates from a fourth relay connection of relay 2004, to which is attached an eleventh crimp terminal 2082S. A thirteenth wire 2084S, crimped to terminal 2082S, conveys signal Switched_Line to a sixth compressor-connector terminal 2086S (FIG. 20b) of female compressor connector 2006.

In the prototype of the first embodiment, some of the electrical components defined above are as follows:

Fused power-entry module 2000 is provided by Schurter, Inc. of Santa Rosa, Calif., as part number GSF2.2011.01.

Transformer 2002 is provided by Triad Magnetics of Perris, Calif., as part number TCT50-01E07AB. For this device, primary-side voltage differential between AC_Line and AC_Neutral is approximately 120 volts AC, and secondary-side voltage between 24 VAC and Com is 24 volts AC.

Relay 2004 is provided by Panasonic Corp. of North America of Newark, N.J., as part number HL1-HTM-AC24V-F Female compressor connector 2006 is provided by Molex of Lisle, Ill., as part number 39-01-2065.

Female controller connector 2008 is provided by CUI, Inc. of Tualatin, Oreg., as part number SD-50LS.

6.3.4 Box Assembly 1706 (FIG. 21a and FIG. 21b)

Referring to FIG. 21a and FIG. 21b, box assembly 1706 comprises the metal box 1716, which comprises a base flange 2100, a front flange 2102, a rear flange 2104, a left flange 2106, and a right flange 2108. FIG. 21a is a view of the interior of box assembly 1706, as viewed from the top; FIG. 21b is a perspective view of the exterior of box assembly 1706, showing flanges 2100, 2102, and 2108.

Box assembly 1706 further comprises a plurality of bumpers 2110 (FIG. 21b) affixed to the exterior surface of base flange 2100, a plurality of bumper-attachment means 2111 (FIG. 21a), a plurality of lid-attachment means 2112 (FIG. 21a) that provide for attachment of lid assembly 1708 to box assembly 1706, a plurality of vibration-mount attachment means 2114 (FIG. 21b) that provide for attachment of vibration-damping mounts 1804 using screws 1826, a pair of transformer-attachment means 2116 (FIG. 21b) that provide for attachment of transformer 2002 using fasteners 2003, a pair of relay attachment means 2118 (FIG. 21b) that provide for attachment of relay 2004 using fasteners 2005, a first chassis-grounding attachment means 2120 that provides for attachment of signal AC_Ground to metal box 1716 using fastener 2038G, a second chassis-grounding attachment means 2122 that provides for attachment of signal AC_Ground to metal box 1716 using fastener 2044G, and a third chassis-grounding attachment means 2124 that that provides for attachment of signal AC_Ground to metal box 1716 using fastener 2052G. Attachment means 2111, 2112,

2114, 2116, 2118, 2120, 2122, and 2124 may be, for example, PEM® nuts provided by Penn Engineering of Danboro, Pa. PEM® nuts allow the use of threaded fasteners with thin sheet metal, of which metal box 1716 may be composed. Each PEM® nut is permanently swaged into a precise, pre-drilled hole in the sheet metal.

Referring to FIG. 21*b*, base flange 2100 comprises a hole 2126 associated with each vibration-damping mount 1804, to allow for insertion of screw 1824 therethrough for attachment to flange 1814 of compressor 1800 (FIG. 18*a*). Base flange 2100 also comprises a hole 2128 for each conduit hanger 1828 (FIG. 18*b*), to provide attachment thereof to base flange 2100. Base flange 2100 further comprises a hole 2130 to provide drainage, via nipple 1926 (FIG. 19*a*), of any condensate that accrues from air compression, as discussed further in Section 7.2.2.

Still referring to FIG. 21*b*, front flange 2102 comprises a cutout 2132 to provide mounting for female controller connector 2008 (FIG. 20*b*). Referring to FIG. 21*a*, rear flange 2104 comprises a cutout 2134 to provide for attachment of power-entry module 2000. Left flange 2106 and right flange 2108 each comprises a plurality of holes 2136 to provide for air entry to compressor 1800; holes 2136 in the right flange 2108 are best viewed on FIG. 21*b*.

6.3.5 Lid Assembly 1708 (FIG. 22*a* and FIG. 22*b*)

Referring to FIG. 22*a*, lid assembly 1708 comprises a lid 2200, which comprises a top flange 2202, a front flange 2204, a left flange 2206, a rear flange 2208, and a right flange 2210. Lid assembly 1708 also comprises a handle 2212, as well as a plurality of lid-to-box attachment means 2214. Attachment means 2214, shown for front flange 2204, are similarly provided in rear flange 2208. Top flange 2202 comprises a cutout 2216 to provide for protrusion therefrom of adapter 1912 and barb elbow 1914 (FIG. 19*a*); this protrusion may be seen on FIG. 17*a*.

Referring to FIG. 22*b*, each of the attachment means 2214 is preferably tamper resistant to discourage unauthorized access to hazardous electrical potential within box assembly 1706. For example, attachment means 2214 may be a screw whose head comprises a pin 2218 in a hexagonal socket 2220, which is well known to discourage unauthorized access because removal of the screw requires a special tool that is not generally available.

6.3.6 Manually Operated Controller 1710 (FIG. 23*a* Through FIG. 23*c*)

Referring to FIG. 23*a*, manually operated controller 1710 is a two-button device that allows the user to command the lifting apparatus 1100 to raise or lower the chair 1102 that rests upon the lifter assembly 1108. Controller 1710 comprises a hand-held portion 2300, a cable 2302 (some of which may be coiled as shown), and a male controller connector 2304. Referring to FIG. 23*b*, hand-held portion 2300 comprises an up button 2306 and a down button 2308. FIG. 23*c* is viewed from the distal end of connector 2304. Referring to FIG. 23*c*, connector 2304 comprises a first connector contact 2306C, a second connector contact 2306D, and a third connector contact 2306U, where the one-letter suffix on these reference numerals, "C", "D", and "U", refer respectively to the signals COM, DOWN, and UP discussed in Section 6.3.3. Male controller connector 2304 mates with female controller connector 2008 (FIG. 20*a*), as shown on FIG. 17*c*. When these two connectors are mated, contacts 2306C, 2306D, and 2306U of connector 2304 (FIG. 23*c*) make electrical connection to terminals 2068C, 2076D, and 2076U of connector 2008 (FIG. 20*b*), respectively, thereby conveying signals COM, DOWN, and UP, respectively, from controller 1710 to electrical assembly 1704.

Still referring to FIGS. 23*a*, and 23*c*, manually operated controller 1710 may be obtained commercially, because such controllers are widely used for the prior-art, specialty lift chairs described in Section 1.1. Because they are manufactured in large quantity, such commercially available controllers are relatively inexpensive. Such controllers typically use, for male controller connector 2304, a 5-pin DIN connector; such a connector is illustrated in FIG. 23*c*. According to the DIN standard, contacts are numbered 1 through 5 as shown on FIG. 23*c*. Contacts labeled "1", "4", and "2" are, respectively, the first, second and third contacts 2306C, 2306D, and 2306U. In lifting apparatus 1100, the contact labeled "5" and "3" on FIG. 23*c* are not used.

6.3.7 Compressor-Side Hose Assembly 1712 (FIG. 24*a* and FIG. 24*b*)

Compressor-side hose assembly 1712 conveys fluid from fluid delivery assembly 1110 to hose 1604 of lifter assembly 1108. For the embodiment described herein, the fluid is air.

Referring to FIG. 24*a*, compressor-side hose assembly 1712 comprises a compressor-side hose 2400 and a female quick-connect 2402. Referring to FIG. 24*b*, female quick-connect 2402 comprises a barb fitting 2404, a female quick-connect fitting 2406, and a release ring 2408. Hose 2400 comprises a proximal end 2410 that is pushed onto barb 1915 (FIG. 19*b*) of barb elbow 1914 to make a fluid-tight hose-to-barb connection illustrated in FIG. 17*c*. Hose 2400 further comprises a distal end 2412 that is pushed onto barb 2404 (FIG. 24*b*) to make a fluid-tight hose-to-barb connection illustrated in FIG. 24*a*. Female quick-connect 2402 mates, at female fitting 2406, with male quick-connect 1606 (FIG. 16*c*), as illustrated in FIG. 11*d*, thereby to convey, through a fluid-tight quick-connect connection, compressed air from fluid-delivery assembly 1110 to inflatable bag 1600 (FIG. 16*a*), and also to allow compressed air to vent from inflatable bag 1600, via fluid-delivery assembly 1110, to ambient air surrounding the lifting apparatus 1100. As is well known in the art, female quick-connect 2402 may be quickly disconnected from male quick-connect 1606 by pulling back (toward barb 2404) on release ring 2408. Likewise, male and female quick-connects 1606 and 2402 may be quickly connected. Lifter assembly 1108 and fluid-delivery assembly 1110 are thereby easily separated for transport, and easily joined for operation.

7. OPERATION 7.1 Mechanical Operation (FIG. 25 Through FIG. 29*c*)

7.1.1 Motion of Lifter Assembly 1108 (FIG. 25 Through FIG. 26*d*)

The ascending or descending motion of lifting assembly 1108, briefly discussed in Section 6.1 (FIG. 11*a* through FIG. 11*d*), is further illustrated and explicated in this section. The motion may be described as a continuous sequence of positions. A particular position—for example the position shown in FIG. 25, which is a partial front view of the lifter assembly 1108 resting on the floor surface 1104—may be defined by an angle θ subtended between lower plate 1302*a* and upper plate 1302*b* of any one of the linkage assemblies 1206. That is, $$\theta = \text{Angle between lower plate } 1302a \text{ and upper plate } 1302b. \tag{27}$$

Perspective views of four positions of the lifting assembly 1108, including θ=−0.75°, θ=20°, θ=50°, θ=80°, are shown as FIGS. 26*a*, 26*b*, 26*c*, and 26*d*, respectively. FIG. 26*a* illustrates the low position of the lifting assembly 1108, as described in Section 6.1; likewise, FIG. 26d illustrates the high position.

Referring to FIGS. 26a through 26d, it should be understood that, during the ascending or descending motion of platform 1500 with respect to base plate 1400, linkage assemblies 1206 insure that platform 1500 and base plate 1400 remain substantially parallel to each other, and moreover, do not substantially translate sideways with respect to each other in either horizontal direction. That is, linkage assemblies 1206 insure that the motion of platform 1500 with respect to base plate 1400 is constrained to be substantially vertical. Consequently, inflatable bag 1600 has no role in this constraint; its job is merely to provide, by means of fluid pressure therein, upward vertical force upon the platform to achieve the ascending motion, and upward vertical force upon the platform to resist (and thereby slow) the descending motion, as further described in Section 7.2.3.

Referring again to FIG. 25, let $A \equiv$ Rotational axis of lower hinge knuckle 1314a $B \equiv$ Rotational axis of center hinge knuckle 1314b $C \equiv$ Rotational axis of upper hinge knuckle 1314c. (28)

Using definitions (28), a particular position such as that shown in FIG. 25 may alternatively be defined by an angle β subtended between a first plane defined by axes A and B and a second plane defined by axes B and C. On FIG. 25, these two planes are represented by dash-dot lines $\overline{AB}$ and $\overline{BC}$, respectively. That is, on FIG. 25, $$\beta = \angle ABC. \quad (29)$$

Note that β>θ because of the thickness of plates 1302a and 1302b, and because of the geometry of the hinge leaves (1312a, 1310b, 1312b, and 1310c) and the hinge knuckles (1314a, 1314b, and 1314c). That is, the dash-dot lines $\overline{AB}$ and $\overline{BC}$ are not parallel to plates 1302a and 1302b, respectively. Angle θ is easier to visualize physically, whereas angle β is more important mathematically, as will be appreciated in the ensuing mathematical description. Note that, for a given embodiment, the difference between β and θ is constant—it does not depend on the position θ. Specifically, for the prototype embodiment, β=θ+5.27° (prototype embodiment). (30)

By inspection of FIG. 25, it follows that the distance R defined by equation (2)—from the floor surface 1104 to the upper platform surface 1502—is $$R = 2L \sin\left(\frac{\beta}{2}\right) + h_1 + h_2, \quad (31)$$

where, as indicated on FIG. 25, $L \equiv$ Distance $\overline{AB}$ = Distance $\overline{BC}$ $h_1 \equiv$ Vertical distance from floor surface 1104 to axis A $h_2 \equiv$ Vertical distance from axis C to upper platform surface 1502. (32)

For the prototype embodiment $L$=128.6 mm (5.06"), $h_1$=11.1 mm (0.44"), (prototype embodiment)

$h_2$=7.9 mm(0.31") (33)

In general, according to definition (8), the amount of rise of the chair seat 1106 (FIG. 11a) provided by the ascending motion of the lifting apparatus 1100 is, using equation (31), $$\Delta R = 2L\left\{\sin\left(\frac{\beta_{max}}{2}\right) - \sin\left(\frac{\beta_{min}}{2}\right)\right\}, \quad (34)$$

where $\beta_{min} \equiv$ Value of β in low position (Fig. 26a) (35)

$\beta_{max} \equiv$ Value of β in high position (Fig. 26d).

Moreover, according to definition (6), the overhead imposed by the lifting apparatus 1100 on the seated height in the low position is $$R_{SIT} = 2L \sin\left(\frac{\beta_{min}}{2}\right) + h_1 + h_2 \quad (36)$$

For the prototype embodiment, $\beta_{mm}$=4.5° (prototype embodiment). (37)

In practice, the value of $\beta_{max}$ is set by maximum inflation of inflatable bag 1600. It is wise to limit $\beta_{max}$ to somewhat less than 90°, so that linkage assemblies 1206 cannot over-rotate. Over-rotation would cause axis B (FIG. 25) to fall outboard of the plane defined by axes A and C, a configuration that must be avoided, because then the linkage assemblies 1206 would fold outward rather than inward. Consequently, for example, as shown in FIG. 26d, choose $\theta_{max}$=80°=>$\beta_{max}$=85.27° (prototype embodiment), (38)

where the latter equation follows from equation (30).

It is now possible to evaluate, for the prototype embodiment, the first and second desirable attributes discussed in Sections 1.3.1 and 1.3.2, respectively.

The first desirable attribute of a chair-lifting retrofit device, equation (18), stipulates ΔR≥229 [mm]=9.0 [in] (first desirable attribute) (39)

Substituting equations (33), (37) and (38) into (34), we find that for the prototype embodiment ΔR=236 [mm]=9.3 [in] (prototype embodiment), (40)

which, as desired, satisfies inequality (39) with a slight margin.

The second desirable attribute of a chair-lifting retrofit device, equation (19), stipulates $R_{SIT}$≤50 [mm]=1.97 [in] (second desirable attribute) (41)

Substituting equations (33) and (37) into equation (36) gives $R_{SIT}$=39.2 [mm]=1.54 [in] (prototype embodiment), (42)

which, as desired, satisfies inequality (41) with a slight margin.

7.1.2 Analysis of Hydraulic Damper 1210 (FIG. 27a Through FIG. 28)

FIGS. 27a, 27b, 27c, and 27d show rear perspective views of lifter assembly 1108 in configurations θ=−0.75°, θ=20°, θ=50°, and θ=80°, respectively, thus illustrating the motion of hydraulic damper 1210 during the vertical motion of platform assembly 1204 with respect to base assembly 1202.

Referring to FIG. 28, which is a rear view of lifter assembly 1108, let P denote the axis about which, as mentioned in Section 6.2.2, lower clevis hole 1470 (FIG.

14d) of hydraulic damper 1210 pivots with respect to shoulder screw 1442 (FIG. 14c) of lower clevis-pin assembly 1408. Likewise, let Q denote the axis about which, as mentioned in Section 6.2.3, upper clevis hole 1474 (FIG. 14d) of hydraulic damper 1210 pivots with respect to upper clevis pin 1542 (FIG. 15a) of upper clevis-pin assembly 1508.

As described in Section 6.2.2, the purpose of hydraulic damper 1210 is to resist sudden motions of platform assembly 1204 with respect to base assembly 1202. In particular, hydraulic damper 1210 resists sudden, dangerous downward motion that may occur if inflatable bag 1600 suddenly fails when platform assembly 1204 is in an elevated position. This resistance will now be analyzed; in particular, to judge the damper's effectiveness at resisting sudden motion, the time for platform assembly 1204 to fall from the high position to the low position will be calculated for a first case in which the damper is present and for a second case in which the damper is absent.

Consider the first case (damper present). Referring to FIG. 28, let $$S = \text{Distance } \overline{PQ}. \tag{43}$$

As platform assembly 1204 moves down, S is a function of time t, and the velocity v of damper piston 1464 retracting into damper body 1462 is $$v \equiv -\frac{dS}{dt}. \tag{44}$$

As shown on FIG. 28, let $l$≡Fixed, horizontal component of $\overline{PQ}$ $\varphi$≡Angle from horizontal to line $\overline{PQ}$ (45)

Then, by inspection of FIG. 28, $$S = \frac{l}{\cos\varphi} = l\sec\varphi, \tag{46}$$

whence, differentiating equation (46), the piston velocity v is $$v = -\frac{dS}{dt} = -l\sec\varphi\tan\varphi\frac{d\varphi}{dt}. \tag{47}$$

Let

F≡Compressive, axial force in damper, along line $\overline{PQ}$

W≡Vertical load normally applied to air-bag 1600, but in this analysis, in which the air-bag is assumed to have failed, is applied to Q. (48)

Load W will typically be the combined weight of the chair 1102, its occupant, and the platform assembly 1204. Applying static equilibrium to a top portion of piston 1464, it follows that the axial force F is always larger than the load W, by a factor that depends on angle $\varphi$:

$$F = \frac{W}{\sin\varphi} = W\csc\varphi. \tag{49}$$

A hydraulic damper such as 1210 is typically calibrated by its manufacturer, who provides a calibration curve relating axial force F to velocity v. Typically, the calibration curve may be adequately expressed as a fifth-order polynomial with zero intercept, denoted $v_{poly}(F)$:

$$v_{poly}(F) = a_1 F + a_2 F^2 + a_3 F^3 + a_4 F^4 + a_5 F^5. \tag{50}$$

Substituting equations (49) and (50) into equation (47) yields $$-l\sec\varphi\tan\varphi\frac{d\varphi}{dt} = v_{poly}(W\csc\varphi), \tag{51}$$

or $$dt = \frac{-l\sec\varphi\tan\varphi}{v_{poly}(W\csc\varphi)}d\varphi. \tag{52}$$

Let $t_{FALL\ WITH\ DAMPER}$≡Time required for platform assembly 1204 to fall, with the damper present, from the high position to the low position $\varphi_{max}$≡Value of $\varphi$ in the high position $\varphi_{min}$≡Value of $\varphi$ in the low position Then, integrating equation (52) between the limits $\varphi_{max}$ and $\varphi_{min}$ yields $$t_{FALL\ WITH\ DAMPER} = \int_{\varphi_{max}}^{\varphi_{min}} \frac{-l\sec\varphi\tan\varphi}{v_{poly}(W\csc\varphi)}d\varphi = \int_{\varphi_{min}}^{\varphi_{max}} \frac{l\sec\varphi\tan\varphi}{v_{poly}(W\csc\varphi)}d\varphi. \tag{54}$$

In the prototype embodiment, hydraulic damper 1210 is provided by ACE Controls Inc. of Farmington Hills, Mich. as part number HB40-150-AA-P. For this damper, the amount of damping is continuously adjustable from a minimum damping to a maximum damping.

When adjusted to provide maximum damping, ACE Control's calibration curve for compression, with F in Newtons and v in mm/s, is fit by the following values of the constants in equation (50):

$$a_1 = 4.73735 \times 10^{-2} \left[\frac{mm}{N \cdot s}\right] \tag{55}$$

$$a_2 = -2.37313 \times 10^{-5} \left[\frac{mm}{N^2 \cdot s}\right]$$

$$a_3 = 7.22092 \times 10^{-9} \left[\frac{mm}{N^3 \cdot s}\right]$$

$$a_4 = -1.06520 \times 10^{-12} \left[\frac{mm}{N^4 \cdot s}\right]$$

$$a_5 = 5.96822 \times 10^{-17} \left[\frac{mm}{N^5 \cdot s}\right]$$

(prototype embodiment, maximum damping)

For example, the values in equation (55) yield, in equation (50), $v_{poly}(1000[N]) = 29.9$ [mm/s] and $v_{poly}(5000[N]) = 67.0$ [mm/s].

For the prototype embodiment $$l=306 \text{ [mm]}$$

$$\varphi_{min}=15.33° \text{ (prototype embodiment)}$$

$$\varphi_{max}=46.27°. \tag{56}$$

For example, assume a vertical load $$W=1800 \text{ [N]}=405 \text{ [lb]}. \tag{57}$$

Numerically integrating equation (54) with the values in equations (55), (56), and (57) yields, for the prototype embodiment, $$t_{FALL \; WITH \; DAMPER}=2.33 \text{ [s] (prototype embodiment, with damper)} \tag{58}$$

Now consider the second case, in which the damper is absent. In this case, platform assembly 1204 falls unimpeded by force of gravity, so the time to fall is given by $$t_{FALL \; WITHOUT \; DAMPER} = \sqrt{\frac{2\Delta R}{g}}, \tag{59}$$

where, as defined by equation (8), ΔR is the vertical distance that the platform assembly falls, and g is the acceleration of gravity, $$g = 9800\left[\frac{\text{mm}}{\text{s}^2}\right]. \tag{60}$$

For the prototype embodiment, substituting equations (40) and (60) into (59) yields $$t_{FALL \; WITHOUT \; DAMPER}=0.22 \text{ [s] (prototype embodiment, no damper)} \tag{61}$$

In summary, it may be seen that the hydraulic damper 1210 is quite effective at preventing sudden falling of the platform assembly 1204 should the inflatable bag fail: it increases the time to fall from 0.22 seconds, given by equation (61), to 2.33 seconds, given by equation (58).

7.1.3 Transport and Deployment of Lifting Apparatus 1100 (FIG. 29a Through FIG. 29c)

Referring primarily to FIGS. 29a through 29c, but also occasionally to FIG. 26a, FIG. 11a and other figures, lifting apparatus 1100 is easily transported and deployed.

Specifically, lifter assembly 1108 is easily transported using the following procedure. First, with the lifter assembly in the low position (FIG. 26a), move lifter-side hose 1604 and male quick-connect 1606 so that they do not contact floor 1104. Although this step is not shown on FIG. 29a, it may easily be accomplished by inserting male quick-connect 1606 into an interstice of upper clevis-pin assembly 1508, as suggested on FIG. 29a by the arrow associated with reference numeral 1508. Second, rotate handle 1410 from its folded position shown in FIG. 29b to its unfolded position shown in FIG. 29a. Third, lift up on handle 1410, causing lifter assembly 1108 to rotate about an axis of wheels 1432 into a transport position, shown in FIG. 29a, in which only wheels 1432 are in contact with floor 1104. Fourth, roll lifter assembly 1108 on wheels 1432 to a desired location.

Referring to FIG. 29b, fluid-delivery assembly 1110 is transported using handle 2212.

Still referring to FIG. 29b, lifting apparatus 1100 is easily deployed using the following procedure. First, place fluid-delivery assembly 1110 on floor 1104 near lifter assembly 1108; this placement is flexible due to the flexibility of hoses 1604 and 2400. Second, join lifter assembly 1108 to fluid-delivery assembly 1110 by connecting male quick-connect 1606 to female quick-connect 2402. Third, referring to FIG. 29c, place chair 1102 upon top surface 1502 of platform 1500; no modification to the chair or the lifter assembly is required, inasmuch as top surface 1502 (FIG. 29b) of platform 1500 is entirely flat, and thus safely accommodates any chair that fits between platform flanges 1518, 1520, 1522, and 1524. Fourth, position the chair as desired. In many cases, it may be desirable, as illustrated in FIG. 29c, to position chair 1102 as far forward as possible, with at least one chair-base member 2900 abutting front flange 1518. Fifth, to prevent the chair from sliding backward or sideways, adhere a plurality of adhesive pads 2902 to top surface 1502 of platform 1500, abutting rear and side surfaces of chair-base members 2900 as shown. Such adhesive pads may be easily removed if lifter assembly is re-deployed later with a different chair.

Sixth, make electrical connections: insert male connector 2304 of manually operated controller 1710 (FIG. 23a) into female connector 2008 (FIG. 20a), insert female connector 1714a of line cord 1714 (FIG. 17c) into power-entry module 2000 (FIG. 20a), and insert male connector 1714b of line cord 1714 into a standard wall outlet that provides electrical power. When these steps are complete, lifter apparatus 1100 appears as in FIG. 11a, and is ready for use.

7.2 Pneumatic Operation (FIG. 30a Through FIG. 30d)

In general, fluid-delivery assembly 1110 may deliver a variety of fluids to inflate bag 1600. In the embodiment described herein, the fluid is air, so the following description uses words that refer to air, such as "air", "airflow", "airstream", "pneumatic" and "psychrometric". However, these words are not meant as limitations on the scope, but rather as an exemplification of one or more embodiments thereof.

7.2.1 Airflow in Three Pneumatic States: Off_State, Up_State, and Down_State

Lifting apparatus 1100 can be in any one of three pneumatic states depending on the state of controller 1710, which is described in Section 6.3.6. The three pneumatic states are as follow:

A first state, denoted Off_State, occurs when neither the up button 2306 (FIG. 23b) nor the down button 2308 of controller 1710 is depressed. In this state, no air flows through lifting apparatus 1100.

A second state, denoted Up_State, occurs when the user, wishing to raise platform assembly 1204, presses up button 2306 (FIG. 23b) of controller 1710. Pressing up button 2306 energizes air compressor 1800 (FIG. 18b) in a manner to be described further in Section 7.4. In the Up-State, a compressed-air stream flows from compressed-air outlet 1812 (FIG. 18b) of air compressor 1800. From outlet 1812, the compressed-air stream flows through the attached plumbing assembly 1702 (FIG. 17c and FIG. 19a); in particular, it flows through hex adapter 1900, first tee 1902, second tee 1910, adapter 1912, and barb elbow 1914. Whenever the pressure at pop-safety valve 1906 threatens to become larger than a pressure limit thereof, air it vented therethrough, thereby preventing pressure from exceeding the limit. From barb elbow 1914, the compressed-air stream flows through the attached compressor-side hose assembly 1712 (FIG. 17c and FIG. 24a); in particular, it flows through hose 2400 and female quick-connect 2402. From female quick-connect 2402, the airstream flows to the attached inflatable-bag assembly 1208 (FIG. 16a); in particular, it flows through male quick-connect 1606, hose 1604, and inflatable-bag fitting 1602, and thence enters inflatable bag 1600, which it inflates. Inflation of the inflatable bag lifts the platform assembly 1204 with respect to the base assembly 1202, thereby lifting the payload, which is typically chair 1102 and the user seated therein.

A third state, denoted Down_State, occurs when the user, wishing to lower platform assembly 1204, presses the down button 2308 (FIG. 23b) of controller 1710. Pressing down button 2308 energizes solenoid 1922 of solenoid-valve assembly 1918 in a manner to be described further in Section 7.4. Energizing solenoid 1922 opens valve 1920, which is otherwise closed. In the Down-State, air contained in inflatable bag 1600, being compressed by the weight of the platform assembly and the payload (e.g. chair 1102 and its user), flows as an exhaust airstream from the inflatable bag, through inflatable-bag fitting 1602, hose 1604, and male quick-connect 1606. From male quick-connect 1606, the exhaust airstream flow to the attached hose assembly 1712 (FIG. 17c and FIG. 24a); specifically, it flows through female quick-connect 2402 and hose 2400. From hose 2400, the exhaust airstream flows to attached plumbing assembly 1702 (FIG. 17c and FIG. 19a); specifically, it flows through barb elbow 1914, adapter 1912, second tee 1910, valve 1920, and drain nipple 1926, which is open to the atmosphere. The inflatable bag is thus deflated, thereby lowering the payload, which is typically chair 1102 and the user seated therein.

7.2.2 Psychrometric Analysis—Choice of Air Pressure

It is well known that compressed-air systems often develop condensate—liquid water that is condensed from ambient air—inside the pipes, fittings, and other elements of the system that are in contact with the compressed air. An objective of one or more embodiments herein is to use an air pressure that is low enough to substantially avoid condensation for expected operating conditions.

An understanding of how air pressure, ambient conditions, and condensation are related is provided by a paper entitled "Construction of a generalized psychrometric chart for different pressures" by He-Sheng Ren, *International Journal of Mechanical Engineering Education*, Vol. 32, Issue 3, July 2004, pages 212-222, which is included herein in its entirety by reference. Let ϕ=Relative humidity, expressed as a fraction ranging from 0 to 1. (62)

On a standard psychrometric chart, which applies for normal atmospheric pressure of $p_0 = 1.01325$ [bar]$=14.70$ [psi], (63)

condensation occurs if air reaches the humidity level ϕ=1. The paper cited above implies that if air in a first state, at atmospheric pressure $p_0$ and relative humidity $\phi_0$, is compressed to a second state at higher absolute pressure $p_0+\Delta p$, then condensation will occur in the second state if $$\phi_0 = \frac{p_0 + \Delta p}{p_0} \geq 1. \quad (64)$$

In other words, to avoid condensation, gauge pressure Δp must be limited so that $$\frac{\Delta p}{p_0} < \frac{1}{\phi_0} - 1. \quad (65)$$

Looking at this another way, if gauge pressure Δp is fixed, then to avoid condensation, relative humidity $\phi_0$ must be limited such that $$\phi_0 < \frac{1}{\frac{\Delta p}{p_0} + 1}. \quad (66)$$

For example, consider the pop-safety valve 1906 (FIG. 19a), specified in Section 6.3.2, that is used in the prototype embodiment to limit Δp. This device is available off-the-shelf with pressure-limiting values in increments of 5 pounds per square inch (psi):

$\Delta p=5$[psi], $\Delta p=10$[psi], $\Delta p=15$[psi], etc. (67)

Because atmospheric pressure is 14.7 [psi], the maximum-allowable value of ambient relative humidity $\phi_0$ that will successfully avoid condensation for each of these values of Δp is, according to equation (66), as follows:

if $\Delta p=5$ [psi]: $\phi_0<0.746$, else if $\Delta p=10$ [psi]: $\phi_0<0.595$, else if $\Delta p=15$ [psi]: $\phi_0<0.495$. (68)

Consequently, if lifting apparatus 1100 is deployed in air-conditioned environments, for which ϕ is typically held between 0.40 and 0.60, then Δp=5 [psi] is a safe choice, Δp=10 [psi] is a marginal choice, and Δp=15 [psi] is a poor choice. For this reason, design of the prototype embodiment is predicated on the choice $\Delta p=5$ [psi] (prototype embodiment). (69)

Despite this choice of air pressure, the lifter apparatus 1100 may occasionally operate in a high-relative-humidity environment where a small amount of condensation may occur. For this reason, the plumbing assembly 1702 comprises drain nipple 1926 (FIG. 19a), and metal box 1706 comprises drain hole 2130 (FIG. 21b), such that if condensation occurs, it is guided toward hole 2130 by drain nipple 1926, and drain out of box 1716 through hole 2130.

7.2.3 Analysis of Inflatable Bag 1600 (FIG. 30a Through FIG. 30d)

Inflatable bag 1600 may be constructed in a variety of ways. The embodiment described herein assumes that the bag is constructed with folded pleats, like a bellows; the analysis below assumes this construction. However, this is not meant to be a limitation on the scope, but rather an exemplification of one or more embodiments thereof.

Referring to FIGS. 30a and 30b, consider how much load W can be supported by inflatable bag 1600. A simplistic estimate is W=Δp $A_{BAG}$ where $A_{BAG}$ is a horizontal, cross-sectional area over which differential pressure Δp acts. However, this simplistic estimate does not say what area should be used for $A_{BAG}$, and it ignores internal stresses in the bag that can cause the simplistic estimate to be substantially too high.

Consequently, in search of a better estimate, consider a protruding pleated portion 3000 of inflatable bag 1600. According to this embodiment, the inflatable bag is composed of a thin material that folds where pleats meet. Pleated portion 3000 comprises a first concave cross section bounded by a first polygon whose vertices, enumerated clockwise looking from the top, are $A_1$, $A_2$, $A_3$, $A_4$, and $A_5$; a convex cross section bounded by a second polygon whose vertices are $B_1$, $B_2$, $B_3$, $B_4$, and $B_5$; and a second concave cross section bounded by a third polygon whose vertices are $C_1$, $C_2$, $C_3$, $C_4$, and $C_5$. Let A be a point midway between $A_3$ and $A_4$, B be a point midway between $B_3$ and $B_4$, and C be a point midway between $C_3$ and $C_4$, such that ABC defines a vertical plane. Referring to FIG. 30c, consider a vertical cross section of the inflatable bag through the vertical plane ABC. Although the three-dimensional figures, FIGS. 30a and 30b, have been drawn to imply that segments AB and BC of the inflatable bag are straight lines, as suggested by the bold dashed lines in FIG. 30c, in reality AB and BC are not necessarily straight lines. Instead, depending on the construction of the inflatable bag and the material of which it is composed, AB and BC are curves, as suggested by the bold solid lines in FIG. 30c. Let $s$≡Arc length of curved bag segment $\overset{\frown}{AB}$=Arc length of curved bag segment $\overset{\frown}{BC}$ $T$≡Tension per unit length in the bag material, directed as shown in FIG. 30c $\psi = \tfrac{1}{2} \angle ABC$.

$\Delta p$≡Difference between pressures inside and outside bag 1600 (as previously defined in Section 7.2.2) (70)

Further, let $P$≡Point on curve $\overset{\frown}{AB}$ such that the vertical distance between $B$ and $P$ is $\tfrac{1}{2}s \sin \psi$ $Q$≡Point on curve $\overset{\frown}{BC}$ such that the vertical distance between $B$ and $Q$ is $\tfrac{1}{2}s \sin \psi$ (71)

These definitions are motivated by the fact that, if curves $\overset{\frown}{APB}$ and $\overset{\frown}{BQC}$ were straight lines, P would be the midpoint of $\overline{APB}$, and Q would be the midpoint of $\overline{BQC}$. Consider, as a first free body, a unit length of the inflatable bag normal to the plane of FIG. 30c, but consider only the portion bounded by horizontal planes through P and Q. Assume that, due to pressure $\Delta p$, a tension T is induced in the bag material, and that at P and Q, tension T acts parallel to $\overline{AB}$ and $\overline{BC}$, respectively, as illustrated on FIG. 29c. In reality, tension T acts tangent to $\overset{\frown}{APB}$ and $\overset{\frown}{BQC}$, so the latter assumption is undoubtedly an approximation, but it is a very useful simplification.

Under this assumption, static equilibrium of the first free body in the horizontal direction of FIG. 30c demands $$\Delta p (s \sin \psi) = 2T \cos \psi, \qquad (72)$$

whence $$T = \tfrac{1}{2} \Delta p s \tan \psi. \qquad (73)$$

Referring to FIG. 30a, consider next, as a second free body, the entire upper portion of inflatable bag 1600 above a horizontal plane through Q. Let $\Lambda$≡Area enclosed by air bag at horizontal plane through $Q$ $\Omega$≡Perimeter of air bag at horizontal plane through $Q$ $W$≡Load applied at top of air bag; namely, payload weight plus platform-assembly weight (74)

Static equilibrium of the second free body in the vertical direction of FIG. 30a demands $$\Delta p \Lambda = (T \sin \psi) \Omega + W. \qquad (75)$$

In equation (75), the left-hand side is the pressure force acting upward on the second free body, and the right-hand side is the sum of forces acting downward thereon. Specifically, $(T \sin \psi)\Omega$ is the force exerted downward on the second free body by tension T in the material comprising inflatable bag 1600, and W is the force acting downward on the second free body at its top surface, where it abuts lower surface 1504 of platform 1500 (FIG. 15b and FIG. 12c).

Substituting equation (73) into equation (75) and rearranging yields $$W = \Delta p \Lambda \left\{ 1 - \left(\tfrac{s\Omega}{2\Lambda}\right) \tan\psi \sin\psi \right\}. \qquad (76)$$

Equation (76) says that the load W that is supportable by the inflatable bag is less than $\Delta p \Lambda$ (the simplistic estimate) by the fraction $$\left(\tfrac{s\Omega}{2\Lambda}\right)$$

$\tan \psi \sin \psi$ due to tension T in the inflatable-bag material.

As the inflatable bag is inflated, angle $\psi$ increases monotonically. Let $\psi_{max}$≡The largest value of $\psi$, when the air bag 1600 is fully inflated; that is, when the lifter assembly is in the high position. (77)

Then the load that can be lifted fully, from low position to high position, is $$W = \Delta p \Lambda \left\{ 1 - \left(\tfrac{s\Omega}{2\Lambda}\right) \tan\psi_{max} \sin\psi_{max} \right\} \qquad (78)$$

Two parameters appearing in equation (78)—cross-sectional area Λ and perimeter Ω—are numerically uncertain because they were defined in terms of the cross-section at Q, whose position is uncertain. However, as an approximation, referring to FIG. 30a, assume $\Lambda \approx \tfrac{1}{2}$(Cross-sectional area through $B$+Cross-sectional area through $C$)

$\Omega \approx \tfrac{1}{2}$(Perimeter through $B$+Perimeter through $C$). (79)

That is, we take the average of the convex and concave sections of the inflatable bag.

For example, using estimates (79), the prototype inflatable bag in the fully inflated configuration has the following characteristics:

$\Lambda \approx 112{,}350$ [mm$^2$]=174.1 [in$^2$]

$\Omega \approx 1{,}357$ [mm]=53.4 [in] (prototype embodiment)

$s = 35$ [mm]=1.38 [in]

$\psi_{max} = 47.48°$. (80)

Using these values, and adopting the value of Δp from equation (69), the load that can be lifted by the bag 1600 in the prototype embodiment is as follows:

$$W = \Delta p \Lambda \left\{ 1 - \left(\frac{s\Omega}{2\Lambda}\right) \tan\psi_{max} \sin\psi_{max} \right\} \quad (81)$$

$$= (5[psi])(174.1[in^2])$$

$$\left\{ 1 - \left(\frac{(1.38[in])(53.4[in])}{(2)(174.1[in^2])}\right)(1.09)(0.737) \right\}$$

$$= (870.5[lb])\{0.830\}$$

$$= 722.5[lb]$$

$$= 3214[N]$$

(prototype embodiment)

That is, the lifting capability of the prototype inflatable bag is about 722 [lb], which, due to the correction factor in curly braces in equation (81), is only 83% of the lifting capacity that would have been predicted by the simplistic estimate Δp Λ.

7.3 Lifter-Assembly Footprint (FIG. 31a Through FIG. 31e)

Viable operation of the pneumatically driven lifting apparatus 1100 depends on achieving simultaneously several competing objectives, including:

- limiting air pressure Δp to a modest level that avoids condensation under typical ambient conditions, as discussed in Section 7.2.2;
- providing an inflatable bag 1600 that is large enough to lift a target load W despite the modest pressure Δp (as discussed in Section 7.2.3), yet is small enough to avoid interfering with the inward-folding linkage assemblies 1206;
- providing an overall footprint of lifter assembly 1108 that does not substantially exceed the footprint of typical chairs that the lifting apparatus 1100 is intended to lift, and that easily rolls through standard-width doors using the procedure outlined in connection with FIG. 29a, despite the fact that the lifter-assembly footprint must accommodate both the inflatable bag 1600 and the linkage assemblies 1206, and the linkages must be large enough to meet seat-rise criterion (18), as discussed in Section 7.1.1.

These competing objectives may be further illustrated referring to the sequence of figures including FIGS. 31a through 31d, which are top views of lifter assembly 1108 for angles θ=−0.75°, θ=20°, θ=50°, and θ=80°, respectively, where θ is defined in connection with FIG. 25. In each of FIGS. 31a-31d, platform assembly 1204 is hidden to reveal upper surface 1402 of base plate 1400, the top surface of inflatable bag 1600, and the upper plates 1302b of linkage assemblies 1206. This sequence of figures, FIG. 31a through FIG. 31d, illustrates how the linkage assemblies 1206 and the hydraulic damper 1210 move as angle θ varies. Clearly, θ=0° is the position that dictates the footprint of the lifter assembly 1108, inasmuch as plates 1302b of linkage assemblies 1206 lie flat in this position and thus occupy greater footprint area than for any other value of θ. Referring to FIG. 31a, let $O$=The origin of an xy Cartesian coordinate system centered on base plate 1400

$x$=Horizontal coordinate in the xy coordinate system, in the direction from rear flange 1424 to front flange 1418.

$y$=Vertical coordinate in the xy coordinate system, in the direction from right flange 1420 to left flange 1422. (82)

$x_{BASE}$=x dimension of base plate 1400

$y_{BASE}$=y dimension of base plate 1400

$x_{BAG}$=x dimension of inflatable bag 1600 (see also FIG. 30d)

$y_{BAG}$=y dimension of inflatable bag 1600 (see also FIG. 30d) (83)

$x_1$=Clearance in x direction from base-plate rear edge to centerline of hinge knuckles)

$y_1$=Clearance in y direction from base-plate right edge to centerline of hinge knuckles $x_2$=Clearance in x direction from centerline of hinge knuckles to air bag $y_2$=Clearance in y direction from centerline of hinge knuckles to air bag (84)

By inspection of FIG. 31a, assuming that the inflatable bag is also centered on origin O, and that linkage assemblies 1206 are symmetrically disposed about O in both the x and y directions, $$x_{BASE}=2(L+x_1+x_2)+x_{BAG}$$

$$y_{BASE}=2(L+y_1+y_2)+y_{BAG}. \quad (85)$$

Equation (85) makes clear mathematically how the footprint of lifter assembly 1108, which is characterized by the dimensions $x_{BASE}$ and $y_{BASE}$, depends on linkage dimension L and inflatable-bag dimensions $x_{BAG}$ and $y_{BAG}$. As explained in Section 7.1.1, dimension L is sized to achieve adequate rise of platform 1500 from low position to high position. As explained in Section 7.2.3, inflatable-bag cross-sectional area A is chosen to achieve adequate lifting capacity (i.e. sufficiently large load W), given the desire to keep pressure Δp low to avoid condensation, as explained in Section 7.2.2.

For example, in the prototype embodiment, $x_{BASE}$=800 [mm]=31.50 [in]

$y_{BASE}$=700 [mm]=27.56 [in]

$x_{BAG}$=421 [mm]=16.57 [in]

$y_{BAG}$=305 [mm]=12.01 [in]

$L$=128.6[mm]=5.06[in] (prototype embodiment)

$x_1$=31.69 [mm]=1.25 [in]

$y_1$=39.64 [mm]=1.56 [in]

$x_2$=29.65 [mm]=1.17 [in]

$y_2$=29.65 [mm]=1.17 [in] (86)

The size of the prototype base, 800×700 mm, accommodates a wide variety of chairs without being too wide. In fact, the dimension $y_{BASE}$ is narrower than the footprint of most comfortable chairs, whose widest point is typically the arms. Moreover, note that $y_{BASE}$ is nearly 2.5 inches less than 30 inches. This implies that the lifter assembly will easily roll, on its wheels 1432, through residential doors, which is an important practical consideration.

Referring to FIG. 31e, it is convenient also to define symbols that directly specify, for each linkage assembly, x and y locations of the axes of lower hinges 1300a and center hinges 1300b. For this purpose, as illustrated on FIG. 31e, let $A_1$=Linkage assembly 1206 near front flange 1418, $A_2$=Linkage assembly 1206 near rear flange 1424, $A_3$=Linkage assembly 1206 near left flange 1422, $A_4$=Linkage assembly 1206 near right flange 1420. (87)

Further, let $x_{1L}$=For linkage assembly $A_1$, an x coordinate of its lower-hinge axis, $x_{1C}$=For linkage assembly $A_1$, an x coordinate of its center-hinge axis, $x_{2L}$=For linkage assembly $A_2$, an x coordinate of its lower-hinge axis, $x_{2C}$=For linkage assembly $A_2$, an x coordinate of its center-hinge axis, $y_{3L}$=For linkage assembly $A_3$, a y coordinate of its lower-hinge axis, $y_{3C}$=For linkage assembly $A_3$, a y coordinate of its center-hinge axis, $y_{4L}$=For linkage assembly $A_4$, a y coordinate of its lower-hinge axis, $y_{4C}$=For linkage assembly $A_4$, a y coordinate of its center-hinge axis. (88)

In FIG. 31e, which depicts the particular position θ=0°, these coordinates are as follows:

$x_{1L}=+\frac{1}{2}a_x, x_{1C}=+\frac{1}{2}b_x,$ $x_{2L}=-\frac{1}{2}a_x, x_{2C}=-\frac{1}{2}b_x,$ $y_{3L}=+\frac{1}{2}a_y, y_{3C}=+\frac{1}{2}b_y,$ $x_{4L}=+\frac{1}{2}a_y, y_{4C}=+\frac{1}{2}b_y,$ (89)

That is, the hinge-axis coordinates define, at θ=0°, an outer rectangle having x and y dimensions $a_x$ and $a_y$ respectively, as well as an inner rectangle having x and y dimensions $b_x$ and $b_y$ respectively.

Referring to FIGS. 31a through 31d, it is clear that coordinates $x_{1L}$, $x_{2L}$, $y_{3L}$, $y_{4L}$ of the lower-hinge axes are fixed, whereas coordinates $x_{1C}$, $x_{2C}$, $y_{3C}$, $y_{4C}$ of the center-hinge axes vary with angle θ. In general, over the full range of θ described herein, coordinates $x_{1C}$, $x_{2C}$, $y_{3C}$, $y_{4C}$ are constrained within the inner and outer rectangles, as follows:

$+\frac{1}{2}b_x \leq x_{1C} \leq +\frac{1}{2}a_x,$ $-\frac{1}{2}a_x \leq x_{2C} \leq -\frac{1}{2}b_x,$ $+\frac{1}{2}b_y \leq y_{3C} \leq +\frac{1}{2}a_y,$ $-\frac{1}{2}a_x \leq x_{4C} \leq +\frac{1}{2}b_x,$ (90)

For example, in the prototype embodiment, the dimensions of the outer rectangle are $a_x$=736.6 [mm]; $a_y$=620.6 [mm] (prototype embodiment), (91)

and the dimensions of the inner rectangle are $b_x$=480.3 [mm]; $b_y$=364.3 [mm] (prototype embodiment). (92)

7.4 Electrical Operation (FIG. 32)

FIG. 32 is a schematic representation of electrical components described earlier in Sections 6.3.1, 6.3.2, 6.3.3, and 6.3.6. Principle elements on this schematic diagram, all previously introduced, include power entry module 2000, which comprises fuses 2000f; transformer 2002; relay 2004, which comprises coil 2004c; air compressor 1800, which comprises motor 1800m; solenoid 1922, which comprises coil 1922c and operates valve 1920; and manually operated controller 1710. Controller 1710 comprises a first single-pole-single-throw (SPST) switch operated by up button 2306, and a second SPST switch operated by down button 2308.

Both of the switches controlled by buttons 2306 and 2308 are normally open. Consequently, when neither button is pressed, neither coil 1922c nor coil 2004c is energized, so no current flows in the circuit depicted in FIG. 31. This corresponds to the Off_State defined in Section 7.2.1.

When up button 2306 is depressed, coil 2004c of relay 2004 is energized with 24 VAC, causing switch 2004s to close, thereby powering motor 1800m of compressor 1800, and causing compressed air to be delivered to inflatable bag 1600. This corresponds to the Up_State defined in Section 7.2.1.

When down button 2308 is depressed, coil 1922c of solenoid 1922 is energized with 24 VAC, causing valve 1920 to open, and allowing air to be exhausted from inflatable bag 1600. This corresponds to the Down_State defined in Section 7.2.1.

FIG. 32 includes conventional "J" notation for connectors, often used in the art of electronics. Specifically, "J2" on FIG. 32 refers to the controller connector, which comprises female controller connector 2008 (FIG. 20b) and male controller connector 2304 (FIG. 23c), which are mated to each other. Likewise, "J3" refers to the compressor connector, which comprises female compressor connector 2006 (FIG. 20b) and male compressor connector 1842 (FIG. 18b), which are mated to each other. These definitions are indicated on FIG. 32 by the notations

J2=2008+2304

J3=2006+1842. (93)

Specific pin numbers on the connectors J2 and J3, as employed in the prototype embodiment, are indicated on FIG. 32 by a decimal point followed by a pin number. Thus:

J2.1 connects signal Com from transformer 2002 to controller 1710

J2.2 connects signal Up from controller 1710 to relay 2004

J2.4 connects signal Down from controller 1710 to solenoid 1922

J3.1 connects signal 24 VAC from transformer 2002 to solenoid 1922

J3.2 connects signal AC_Ground from metal box 1716 to solenoid 1922

J3.3 connects signal Down from controller 1710 to solenoid 1922

J3.4 connects signal Switched_Line from relay 2004 to compressor 1800

J3.5 connects signal AC_Ground from metal box 1716 to compressor 1800

J3.6 connects signal AC_Neutral from power-entry module 2000 to compressor 1800. (94)

7.5 Realization of Advantages

From the above description of the structure, operation, transport, and deployment of the lifting apparatus 1100 described herein, it is clear that, for a chair-lifting application illustrated in FIGS. 11*a* through 11*d*, the advantages stated in Section 3 are realized, as demonstrated by the prototype embodiment.

Advantage (a)—satisfaction of requirement (18)—is realized as described in Section 7.1.1, and as summarized by equations (39) and (40) therein.

Advantage (b)—satisfaction of requirement (19)—is likewise realized as described in Section 7.1.1, and as summarized by equations (41) and (42) therein.

Advantage (c)—universal applicability as a retrofit for all types of chairs—is achieved by the first embodiment because the chair rests simply on the substantially planar platform surface 1502 (e.g. FIG. 29*b*), rather than on struts or bars as in prior-art retrofits. The platform is a surrogate floor for the chair, so no engineering is necessary to adapt the chair to the retrofit or vice versa. The chair is simply placed upon the platform. The platform is designed to remain level rather than tilt forward, so no chair-specific engineering is required to secure the chair to the retrofit for the sake of safety, as in the prior art. At most, shifting of the chair on the platform in the x and y directions may be eliminated by simple adhesive pads, as explained in Section 7.1.3 and shown on FIG. 29*c*. The chair is not altered in any way. Moreover, for reclining and rocking chairs, the lifter apparatus does not interfere with the reclining or rocking operation thereof.

Advantage (d)—making no limiting assumption about available space under the chair seat—is also achieved because the lifting apparatus has a substantially flat platform.

Advantage (e)—easy transportability and deployability—is achieved partially for reasons discussed in connection with advantage (c), but also because the lifting apparatus has been designed to disassemble with great ease (the separation of just one fluid quick connect) into just two main subassemblies—a lifter assembly and a fluid-delivery assembly, each of which may be easily transported and stored as explained in Section 7.1.3 and illustrated by FIG. 29*a* and FIG. 29*b*.

An additional advantage of the lifter assembly is that its footprint is compact. For the prototype embodiment, for example, referring to equation (86), the lifter-assembly base-plate depth is $x_{BASE}$=800[mm]=31.5 [in] (prototype embodiment), (95)

and the lifter assembly base-plate width is $y_{BASE}$=700 [mm]=27.56 [in] (prototype embodiment). (96)

Regarding width, the base plate width $y_{BASE}$=700 mm is wide enough to accommodate the base members of a vast array of comfortable chairs, such as popular reclining models, yet is narrower than the upholstered bodies of such chairs, which are typically widest at the arms. For example, reviewing all recliner-chair models currently sold by La-Z-Boy®, it is found that the average width (at the arms) is 963 mm (37.9 inches), the standard deviation of width is 112 mm (4.4 inches) and the minimum width is 724 mm (28.5 inches). Consequently, the prototype lifter apparatus, with a width of 700 mm, incurs no width overhead for any of La-Z-Boy's recliners, even the narrowest ones.

Moreover, the width given in equation (96) is nearly 2.5 inches narrower than 30 inches, so the lifter assembly easily rolls, on its wheels 1432, through standard, 30-inch-wide residential doors.

Regarding depth, although the base-plate depth $x_{BASE}$=800 mm may be deeper than some straight-backed chairs, it is not deeper than the reclined footprint of a recliner chair, which is typically 1500 mm or greater. Consequently, for such chairs, the lifter assembly incurs no additional footprint beyond that already required by the chair itself.

8. CONCLUSIONS, RAMIFICATION, SCOPE

Thus the reader will see that at the embodiment of the lifter apparatus described above provides several advantages for the purpose of raising and lowering a payload, in particular a chair and a user seated therein, thereby helping the user to stand and to sit. The user's comfort is enhanced by providing an apparatus capable of lifting the user's own, favorite chair. The user's comfort is further enhanced because the apparatus does not interfere with a comfortable seat height when the apparatus is configured in the low position that is used while the user is sitting. That is, the chair's seat height in the low position is similar to what it would be if the apparatus were absent; for example, in the prototype of the embodiment described herein, the difference is only 39 mm (1.5"). The user is also provided with a full measure of sit-to-stand assistance, because the apparatus is capable of raising the seat height by a large amount. For example, in the prototype embodiment, the seat height may be raised by as much as 236 mm (9.3"), which is ample even for demanding users according to clinical studies. These advantages are provided in an apparatus that is easily and safely retrofittable to a wide variety of chairs, including popular recliner chairs, without requiring modification thereof, without interfering with the internal mechanism thereof, and without interfering with the reclining or rocking operation thereof. Moreover, the apparatus is easily transportable, deployable, and storable, comprising only two subassemblies that are easy to manage and trivially easy to assemble and disassemble. Finally, the footprint of the lifter assembly is no wider than typical chairs, and no deeper than the reclined footprint of typical recliner chairs. Consequently, it is easily accommodated in typical living spaces. Moreover, it is easily passable through residential doors.

While the above description contains much specificity, this should not be construed as limitations on the scope, but rather as an exemplification of embodiments thereof. Many other variations are possible. As a first example, the hinges used in linkage assemblies 1206, shown in the described embodiment as comprising discrete hinges, may alternatively comprises continuous hinges such as piano hinges. As a second example, a greater number of linkages, or fewer, may be employed. As a third example, the cross-sectional shape of the inflatable bag, shown in the described embodiment as rectangular, may alternatively be round, oval, or otherwise. As a fourth example, the air-entry location on the inflatable bag, shown in the described embodiment as being on the side, may be instead be on the top of the bottom, although such a location may undesirably entail a larger value of $R_{SIT}$. As a fourth example, the source of compressed fluid, shown to be an air compressor in the described embodiment, may alternatively be a tank of pre-compressed air or other suitable fluid. As a fifth example, the manually operated controller, shown in the described embodiment to be a device comprising wires, may alternatively be a wireless device. As a sixth example, the controller, shown in the described embodiment to be manually operated, may alternatively be actuated by voice or by other suitable means. As a seventh example, the lifting apparatus may be employed to lift a payload other than a chair and its user.

Accordingly, the scope should be determined not by the embodiment illustrated, but by the appended claims and their legal equivalents.

I claim:

1. A lifting apparatus for raising and lowering a payload comprising:
   a base, having a top surface and having x and y dimensions $x_{base}$ and $y_{base}$, respectively;
   a platform having a bottom surface and being spaced above the top surface of the base;
   a plurality of linkage assemblies that couple the platform to the base such that the platform can be controllably raised and lowered relative to the base, each linkage assembly comprises a lower plate and an upper plate, the lower plate being pivotally coupled to the base, the upper plate being pivotally coupled to the platform and the lower plate and upper plate being pivotally coupled to one another, each linkage assembly being disposed along one edge of the base and a corresponding edge of the platform, each linkage assembly being movable between a collapsed position and an extended position, the linkage assemblies being arranged so as to define an interior space that is located internal to all of the linkage assemblies;
   an inflatable bag that is defined by a bag footprint; the inflatable bag being disposed between the base and the platform, wherein the bag footprint is located entirely within the interior space such then even when the linkage assemblies are in the collapsed positions, the inflatable bag is spaced from the collapsed linkage assemblies; and
   a fluid delivery device operatively coupled to the inflatable bag for delivering pressurized fluid to the inflatable bag;
   wherein the number of linkage assemblies is four, wherein the four linkage assemblies, denoted $A_1$, $A_2$, $A_3$, and $A_4$, are arranged to define a rectangle having x and y dimensions being $a_x$ and $a_y$ around the perimeter of the base lying in an xy plane, with $a_x < X_{base}$ and $a_y < y_{base}$, and with the base's center at $(x,y)=(0,0)$, and the base's x and y dimensions being $a_x$ and $a_y$ respectively such that, to within mechanical tolerances,
   an x coordinate of a lower-hinge axis of $A_1$, denoted $x_{1L}$, satisfies $x_{1L}=+\frac{1}{2}a_x$,
   an x coordinate of a lower-hinge axis of $A_2$, denoted $x_{2L}$, satisfies $x_{2L}=-\frac{1}{2}a_x$,
   a y coordinate of a lower-hinge axis of $A_3$, denoted $y_{3L}$, satisfies $y_{3L}=+\frac{1}{2}a_y$, and
   a y coordinate of a lower-hinge axis of $A_4$, denoted $y_{4L}$, satisfies $y_{4L}=-\frac{1}{2}a_y$.

2. A lifting apparatus as in claim 1 wherein the inflatable bag expands and contracts by virtue of folded elements in the style of bellows.

3. A lifting apparatus as in claim 1 wherein the footprint of the bag is substantially rectangular.

4. A lifting apparatus as in claim 1 wherein the inflatable bag includes a fluid-entry port located in a lateral surface thereof.

5. A lifting apparatus as in claim 1 wherein the lifting apparatus supports a payload that is in the form of a chair.

6. A lifting apparatus as in claim 1 that further comprises a damper connected between the base and the platform for the purpose of providing a resistance to the downward motion, the damper being disposed external to the plurality of linkage assemblies.

7. A lifting apparatus as in claim 1 wherein the pressurized fluid is compressed air.

8. A lifting apparatus as in claim 7 wherein the fluid delivery device comprises a pressure-limiting device to limit the maximum pressure of compressed air therein, thereby to reduce the likelihood that water vapor within the air will condense to form liquid water within the fluid-delivery device and within the inflatable bag.

9. A lifting apparatus as in claim 1 wherein the plates of each linkage fold inward, toward the base's center at $(x,y)=(0,0)$, whereby, throughout the upward and downward motions, the axis of the center hinges of each linkage assembly lies between the base and a concentric inner rectangle having x and y dimensions $b_y$ and $b_y$, respectively, where $b_x < a_x$ and $b_y < a_y$, such that, throughout the upward and downward motions, to within mechanical tolerances,
   an x coordinate of a center-hinge axis of $A_1$, denoted $x_{1C}$, satisfies $+\frac{1}{2}b_x \leq x_{1C} < +\frac{1}{2}a_x$,
   an x coordinate of a center-hinge axis of $A_2$ denoted $x_{2C}$, satisfies $-\frac{1}{2}a_x < x_{2C} \leq -\frac{1}{2}b_x$,
   a y coordinate of a center-hinge axis of $A_3$ denoted $y_{3C}$, satisfies $+\frac{1}{2}b_y \leq y_{3C} < +\frac{1}{2}a_y$,
   a y coordinate of a center-hinge axis of $A_4$, denoted $y_{4C}$, satisfies $-\frac{1}{2}a_y < y_{4C} \leq -\frac{1}{2}b_y$.

10. A lifting apparatus as in claim 9 wherein the bag footprint lies within the inner rectangle.

11. A lifting apparatus as in claim 1 wherein there are four linkage assemblies arranged in a set of two pairs with one pair being opposite one another and another pair being opposite one another and at right angles to the one pair.

12. A lifting apparatus as in claim 1 wherein the inflatable bag footprint is either square shaped or rectangular shaped.

13. A lifting apparatus as in claim 1 wherein the base has a pair of wheels located along and extending radially outward from one edge of the base, the pair of wheels being positioned such that a bottom surface of the base lies flush with a ground surface when the base is positioned in an in-use position along the ground surface.

14. A lifting apparatus as in claim 1 wherein the base includes a first flange formed along one edge thereof and the platform includes a second flange formed along one edge thereof that is disposed above the one edge of the base, wherein a damper is coupled at one end to an exterior surface of the first flange and is coupled at an opposite end to an exterior surface of the second flange.

15. A lifting apparatus as in claim 14 wherein the first and second flanges are located in a plane that is perpendicular to a plane that contains the top surface of the base and perpendicular to a plane that contains a bottom surface of the platform.

16. A lifting apparatus as in claim 1 wherein each of the plurality of linkage assemblies has the same size.

17. A lifting apparatus as in claim 1 wherein each linkage further including a first hinge that hingedly couples the upper plate to the platform, a second hinge that hingedly coupled the upper and lower plates together and a third hinge that hingedly couples the lower plate to the base.

18. A lifting apparatus as in claim 1 wherein the inflatable bag includes a fluid-entry port that is coupled to a fluid-delivery conduit that is disposed along and affixed to the top surface of the base, the fluid-delivery conduit terminating in a free end that is external to the base.

19. A lifting apparatus as in claim 1 wherein each of the lower plate and an upper plate has a pair of chamfered edges at opposing ends thereof.

20. A lifting apparatus for raising and lowering a payload comprising:
a base having a top surface;
a platform having a bottom surface and being spaced above the top surface of the base;
a plurality of linkage assemblies that couple the platform to the base such that the platform can be controllably raised and lowered relative to the base, each linkage assembly comprises a lower plate and an upper plate, the lower plate being pivotally coupled to the base, the upper plate being pivotally coupled to the platform and the lower plate and upper plate being pivotally coupled to one another each linkage assembly being disposed along one edge of the base and a corresponding edge of the platform, each linkage assembly being movable between a collapsed position and an extended position, the linkage assemblies being arranged so as to define an interior space that is located internal to all of the linkage assemblies;
an inflatable bag that is defined by a bag footprint; the inflatable bag being disposed between the base and the platform, wherein the bag footprint is located entirely within the interior space such then even when the linkage assemblies are in the collapsed positions, the inflatable bag is spaced from the collapsed linkage assemblies; and
a fluid delivery device operatively coupled to the inflatable bag for delivering pressurized fluid to the inflatable bag;
wherein the base includes a first flange formed along one edge thereof and the platform includes a second flange formed along one edge thereof that is disposed above the one edge of the base, wherein a damper is coupled at one end to an exterior surface of the first flange and is coupled at an opposite end to an exterior surface of the second flange;
wherein the second flange includes a first cutout that receives the first flange when the linkage assemblies are in the collapsed positions.

21. A lifting apparatus for raising and lowering a payload comprising:
a base having a top surface;
a platform having a bottom surface and being spaced above the top surface of the base;
a plurality of linkage assemblies that couple the platform to the base such that the platform can be controllably raised and lowered relative to the base, each linkage assembly comprises a lower plate and an upper plate, the lower plate being pivotally coupled to the base, the upper plate being pivotally coupled to the platform and the lower plate and upper plate being pivotally coupled to one another, each linkage assembly being disposed along one edge of the base and a corresponding edge of the platform, each linkage assembly being movable between a collapsed position and an extended position, the linkage assemblies being arranged so as to define an interior space that is located internal to all of the linkage assemblies;
an inflatable bag that is defined by a bag footprint; the inflatable bag being disposed between the base and the platform, wherein the bag footprint is located entirely within the interior space such then even when the linkage assemblies are in the collapsed positions, the inflatable bag is spaced from the collapsed linkage assemblies; and
a fluid delivery device operatively coupled to the inflatable bag for delivering pressurized fluid to the inflatable bag;
wherein each linkage further including a first hinge that hingedly couples the upper plate to the platform, a second hinge that hingedly coupled the upper and lower plates together and a third hinge that hingedly couples the lower plate to the base;
wherein the base has a set of first openings formed therein for receiving knuckles of each first hinge, and the platform has a set of second openings formed therein for receiving knuckles of each second hinge.

22. A lifting apparatus for raising and lowering a payload comprising:
a base having a top surface;
a platform having a bottom surface and being spaced above the top surface of the base;
a plurality of linkage assemblies that couple the platform to the base such that the platform can be controllably raised and lowered relative to the base, each linkage assembly comprises a lower plate and an upper plate, the lower plate being pivotally coupled to the base by at least one first hinge, the upper plate being pivotally coupled to the platform by at least one second hinge and the lower plate and upper plate being pivotally coupled to one another by at least one third hinge, each linkage assembly being disposed along one edge of the base and a corresponding edge of the platform, each linkage assembly being movable between a collapsed position and an extended position, wherein the base has a set of first openings formed therein for receiving knuckles of each first hinge and the platform has a set of second openings formed therein for receiving knuckles of each second hinge, thereby to permit the base and platform to assume a compact position when the linkage assemblies are in the collapsed positions;
an inflatable bag disposed between the base and the platform; and
a fluid delivery device operatively coupled to the inflatable bag for delivering pressurized fluid to the inflatable bag for inflation thereof.

23. A lifting apparatus as in claim 22 wherein each of the lower plate and an upper plate has a pair of chamfered edges at opposing ends thereof.

24. A lifting apparatus as in claim 22 wherein the bag footprint is located entirely within the interior space such then even when the linkage assemblies are in the collapsed positions, the inflatable bag is spaced from the collapsed linkage assemblies.

* * * * *